1 VARIABLE SPEED CYCLE, Figs. 1-7

INVENTOR.
VLADIMIR H. PAVLECKA
BY
Nicholas T. Vohr
ATTORNEY.

INVENTOR.
VLADIMIR H. PAVLECKA
BY
Nicholas T Volvic
ATTORNEY.

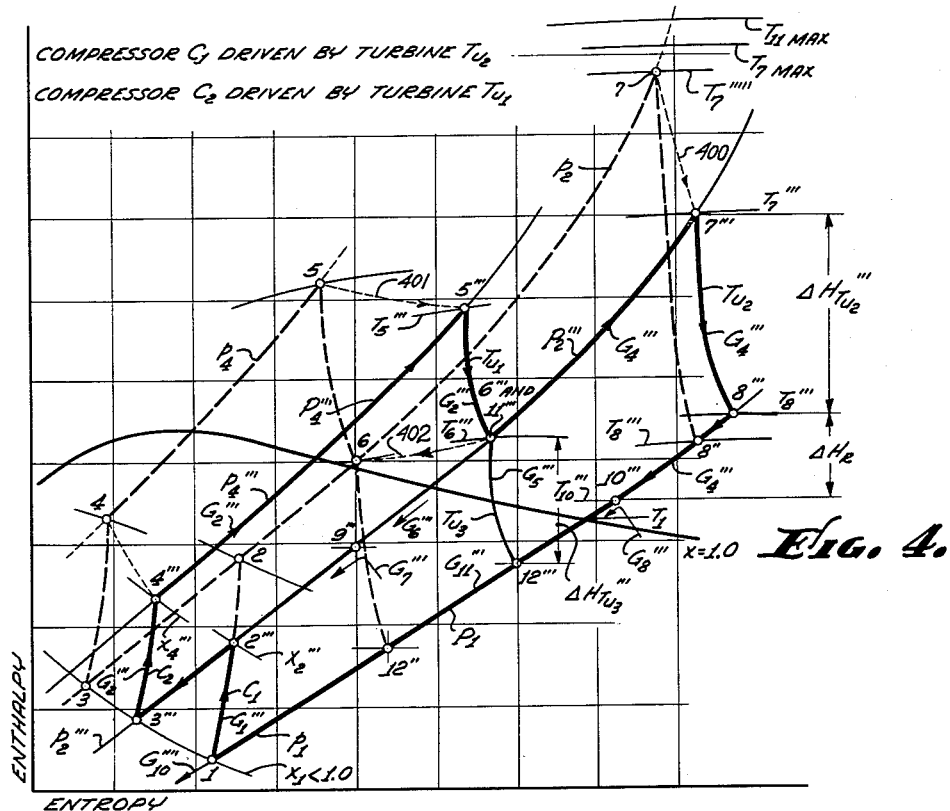
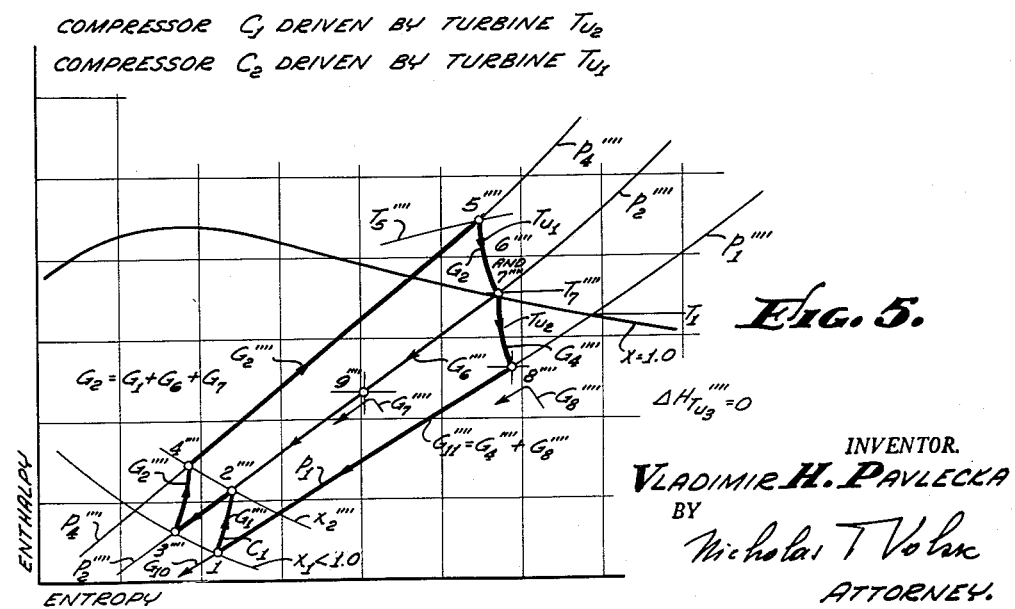

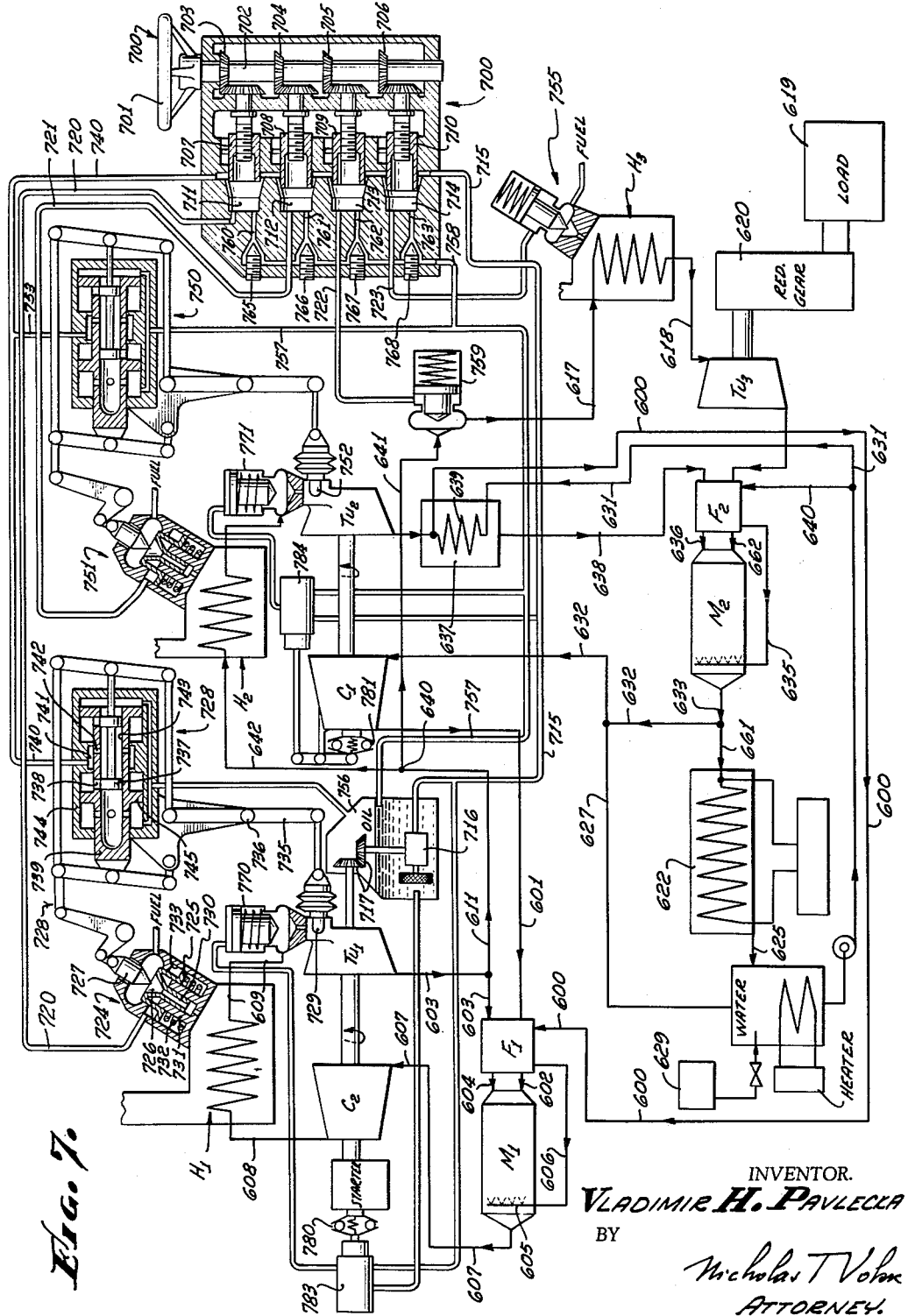

June 7, 1960  V. H. PAVLECKA  2,939,286
DYNAMIC STEAM CYCLE
Filed March 15, 1957  25 Sheets-Sheet 5
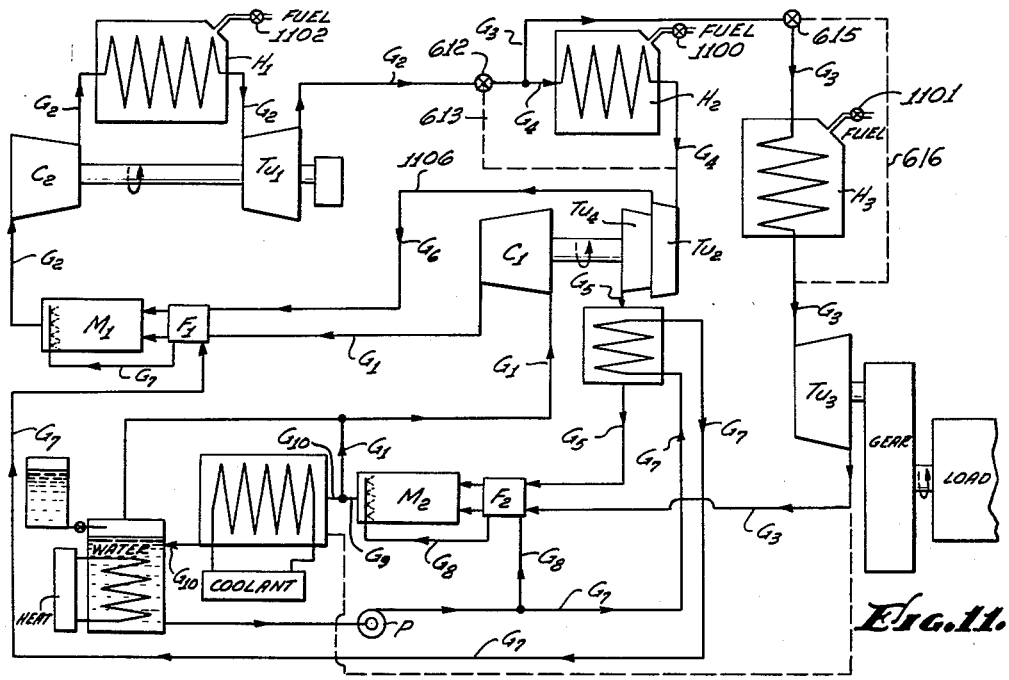
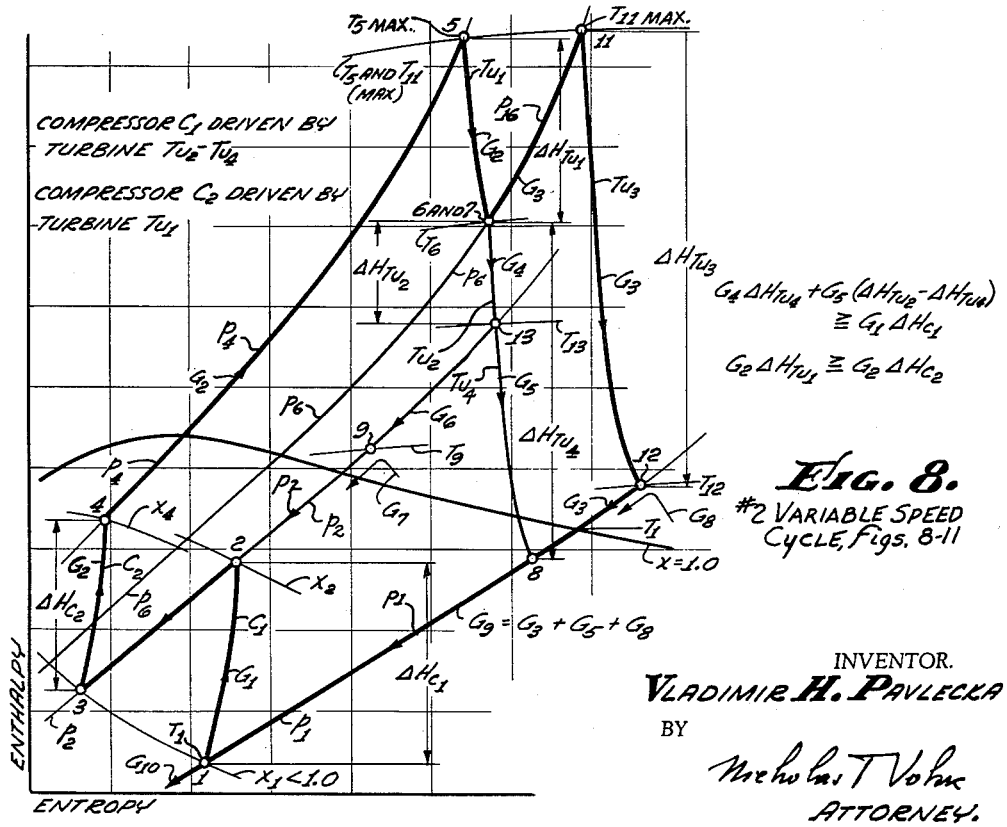
INVENTOR.
VLADIMIR H. PAVLECKA
BY
Nicholas T. Volk
ATTORNEY.

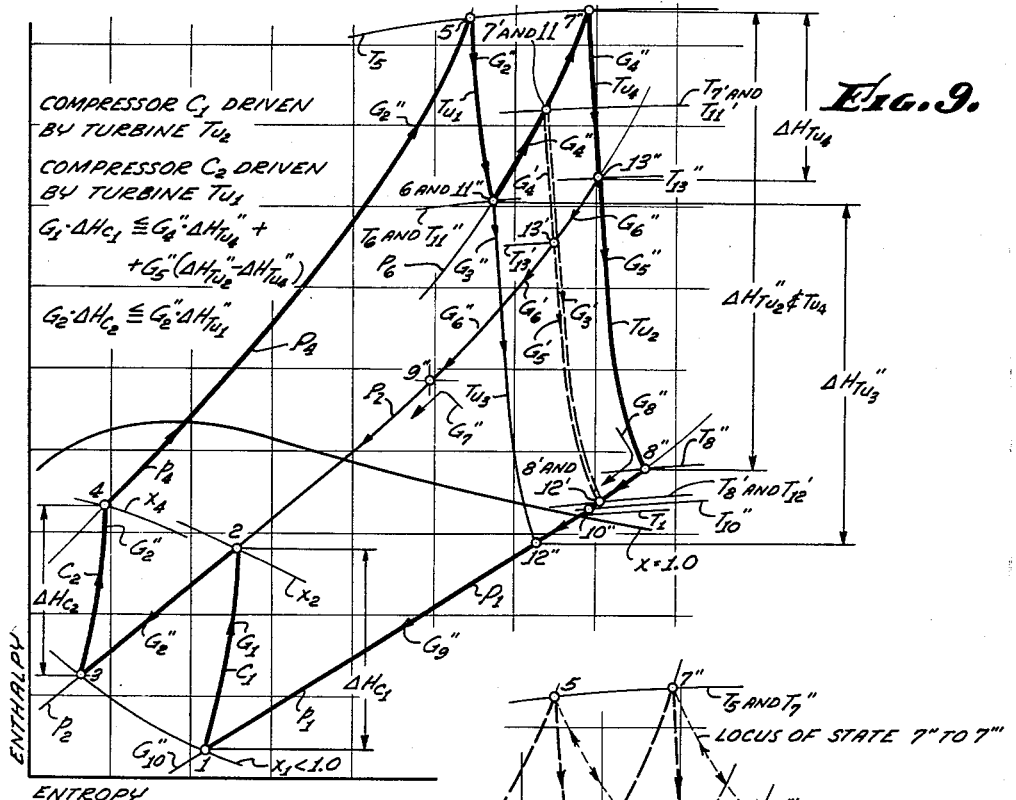
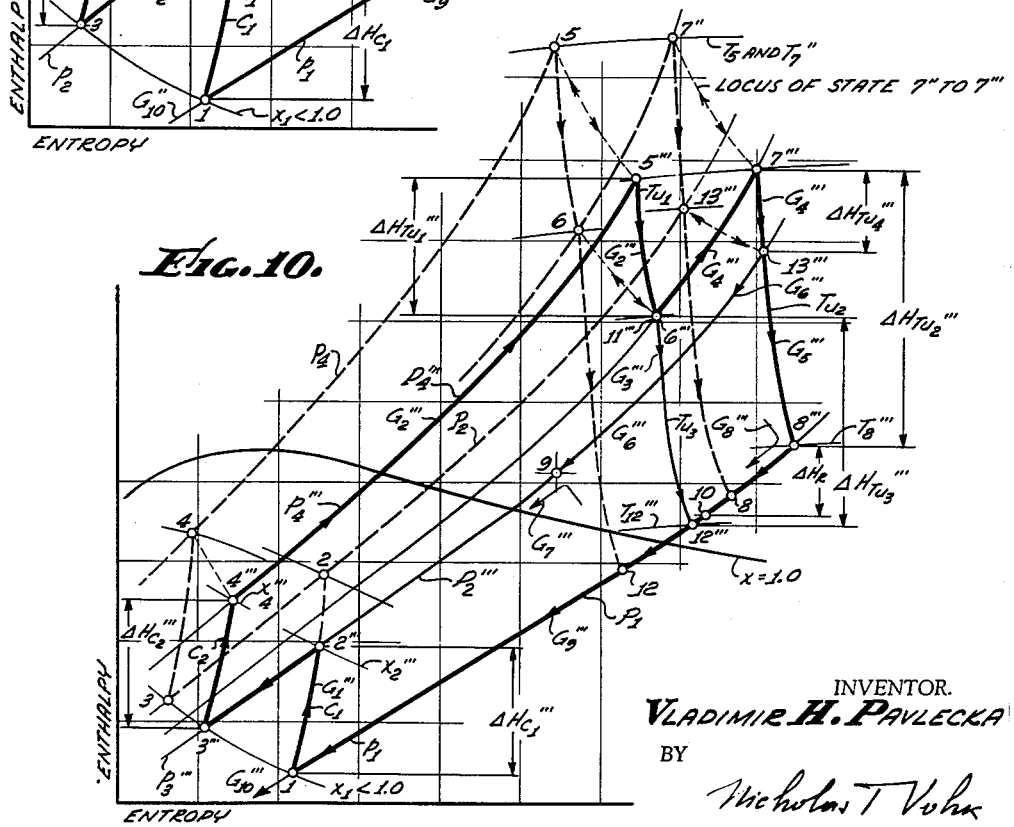

June 7, 1960 V. H. PAVLECKA 2,939,286
DYNAMIC STEAM CYCLE
Filed March 15, 1957 25 Sheets-Sheet 7
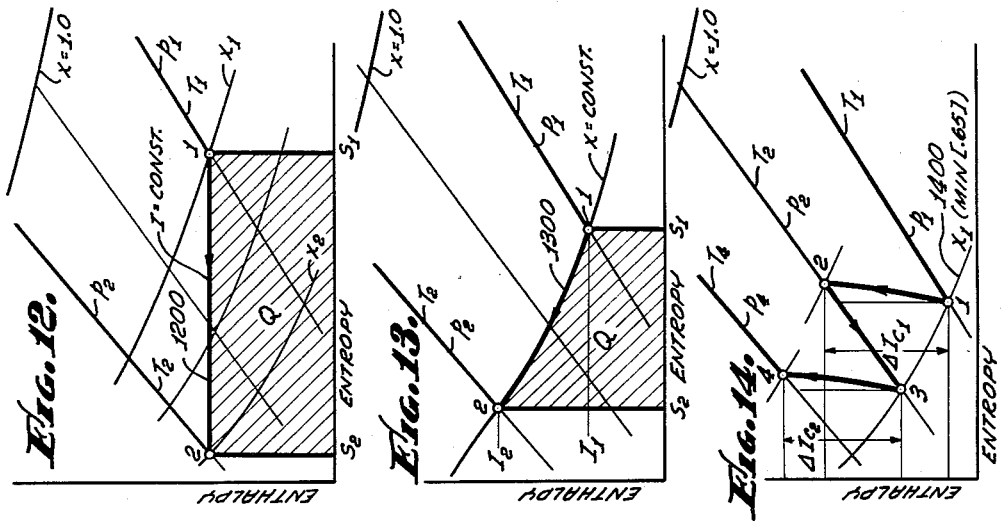
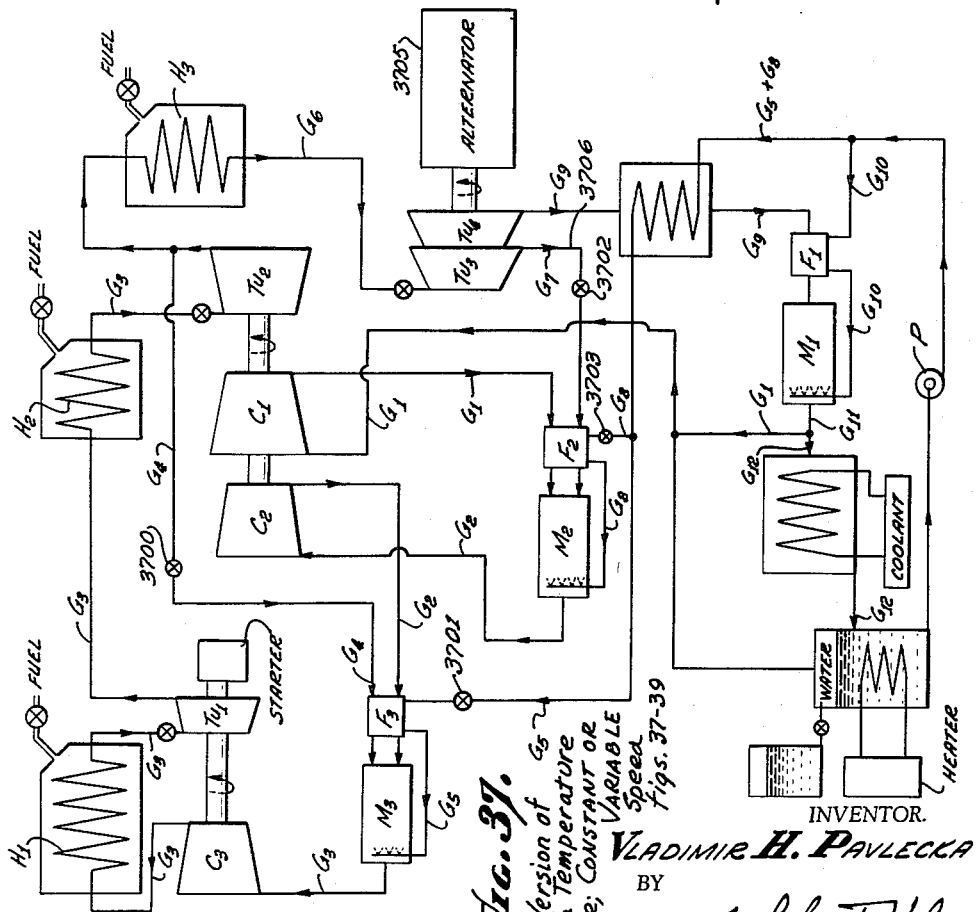
INVENTOR.
VLADIMIR H. PAVLECKA
BY
Nicholas T. Vohr
ATTORNEY.

June 7, 1960  V. H. PAVLECKA  2,939,286
DYNAMIC STEAM CYCLE
Filed March 15, 1957  25 Sheets-Sheet 8
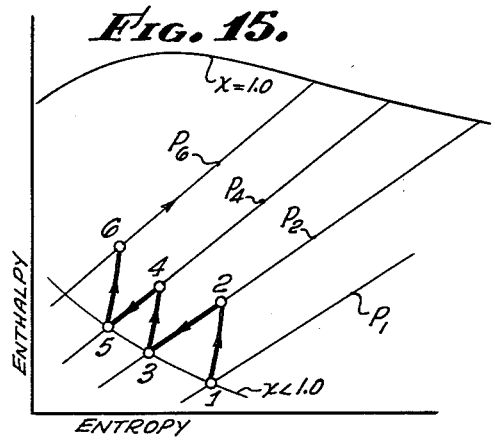
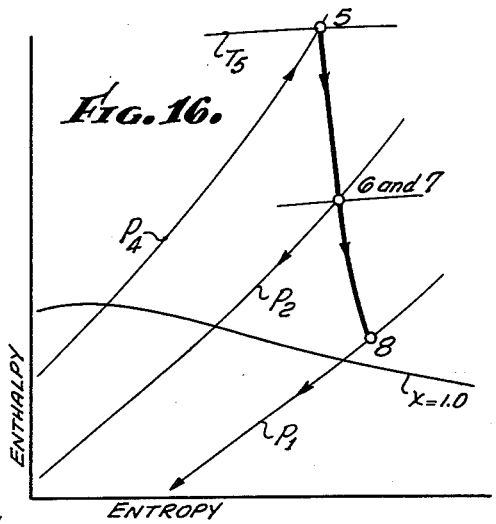
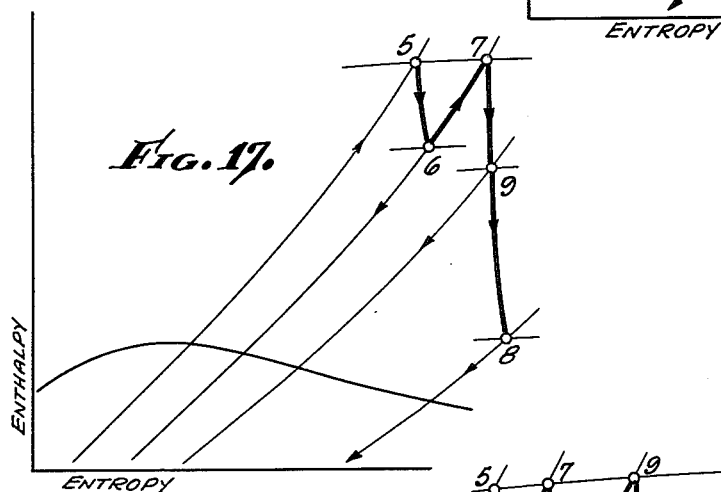
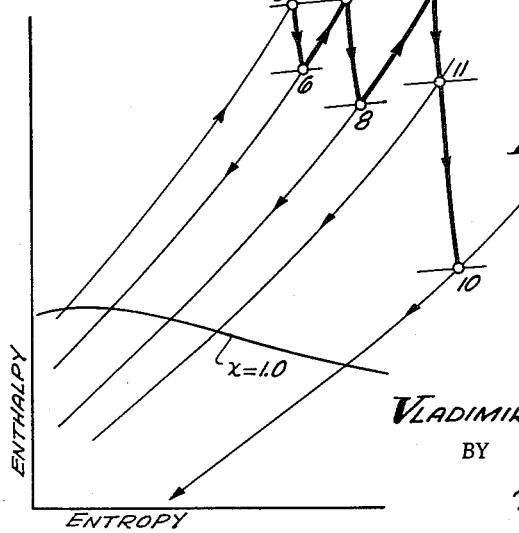
INVENTOR.
VLADIMIR H. PAVLECKA
BY
Nicholas T Vohr
ATTORNEY.

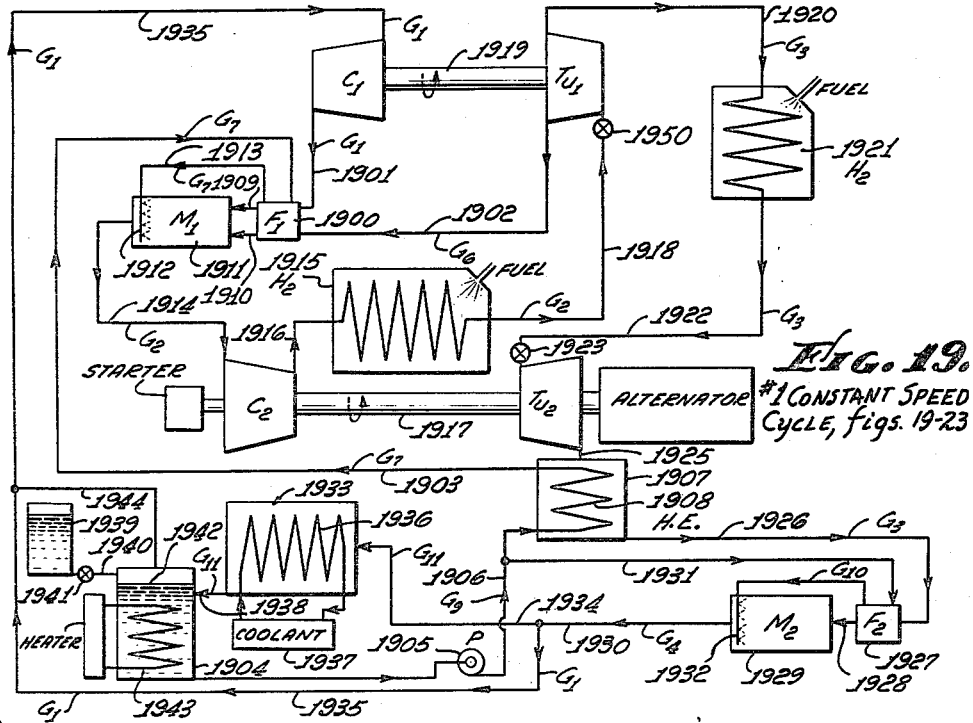
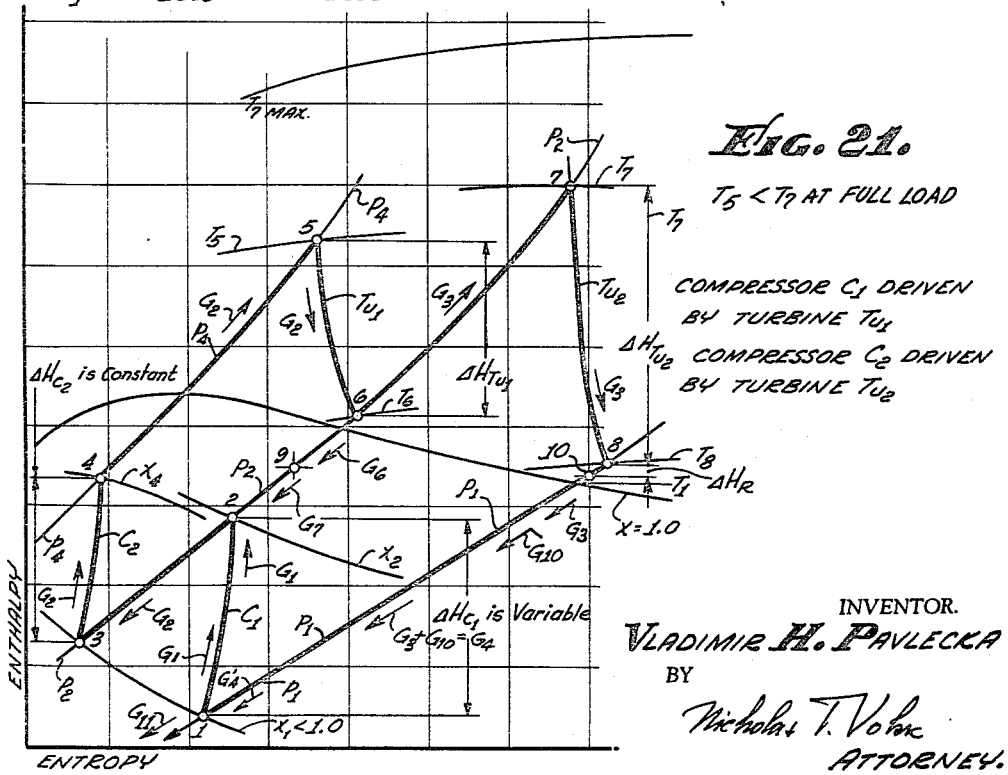

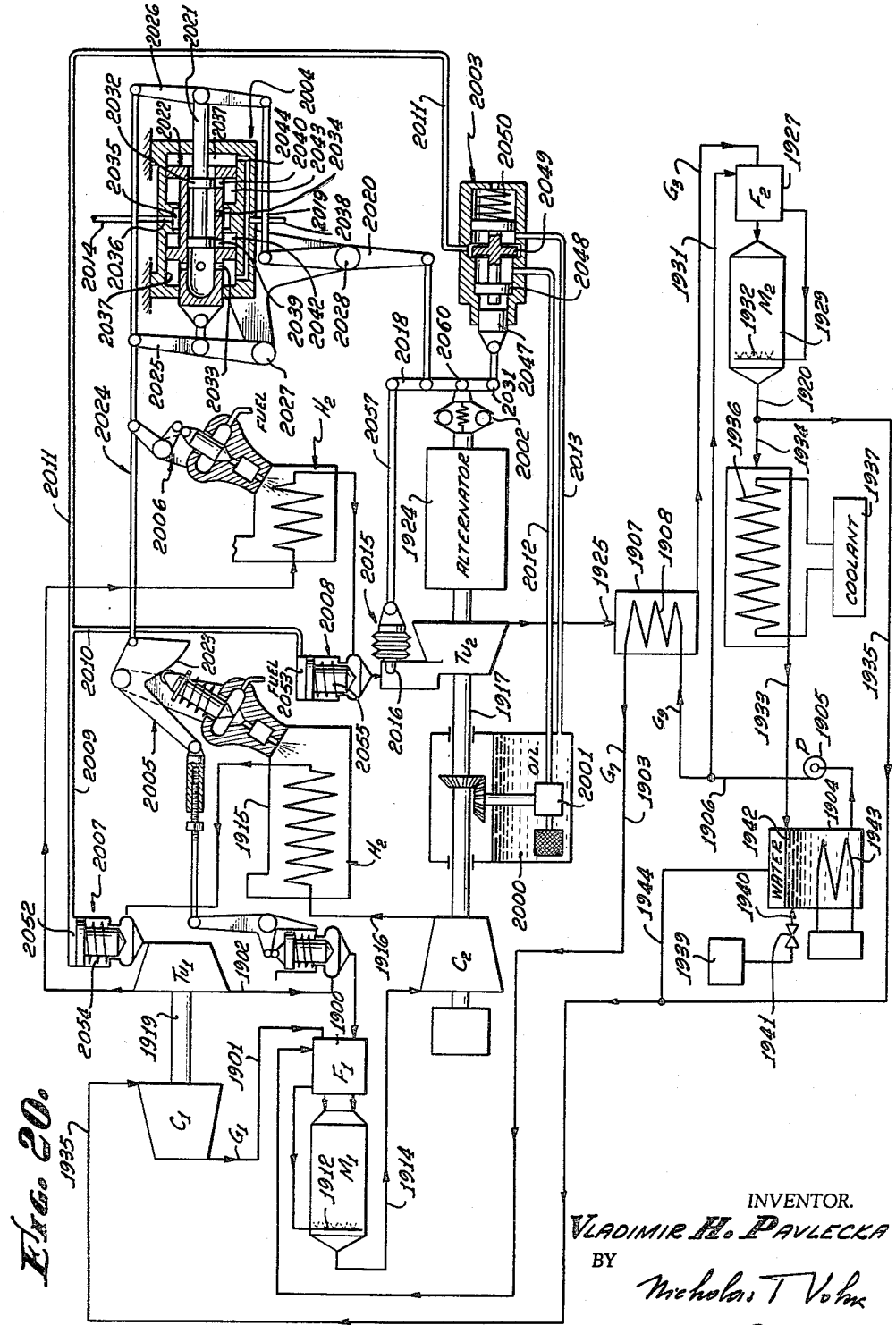

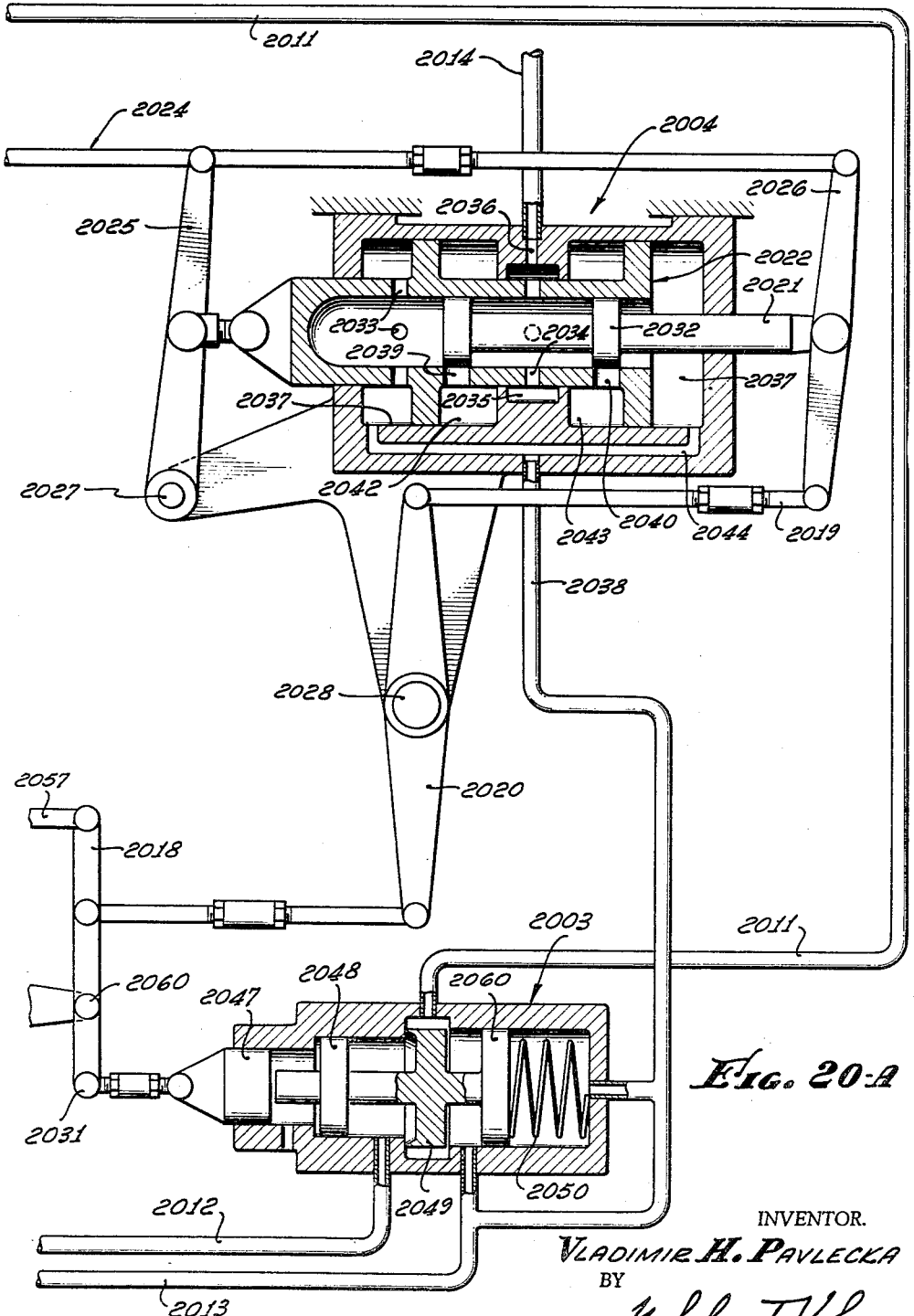

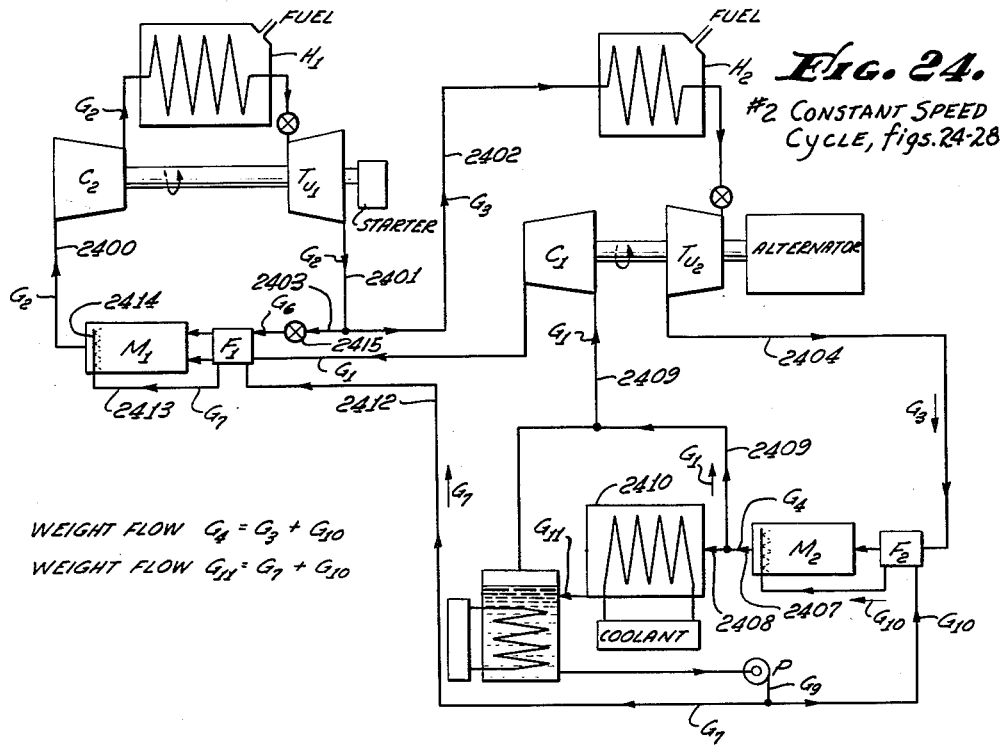
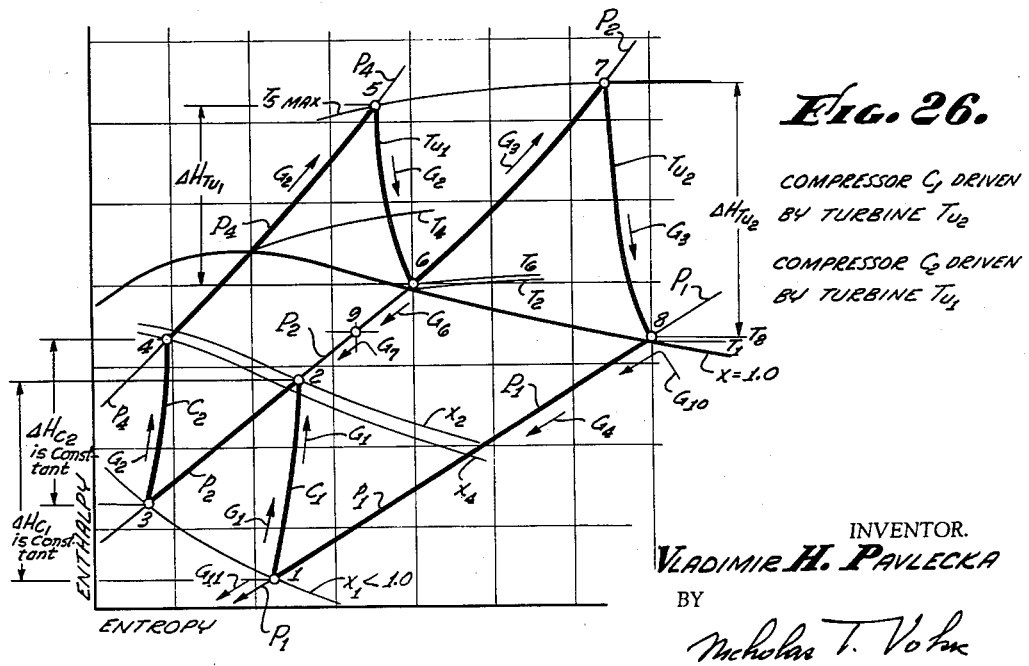

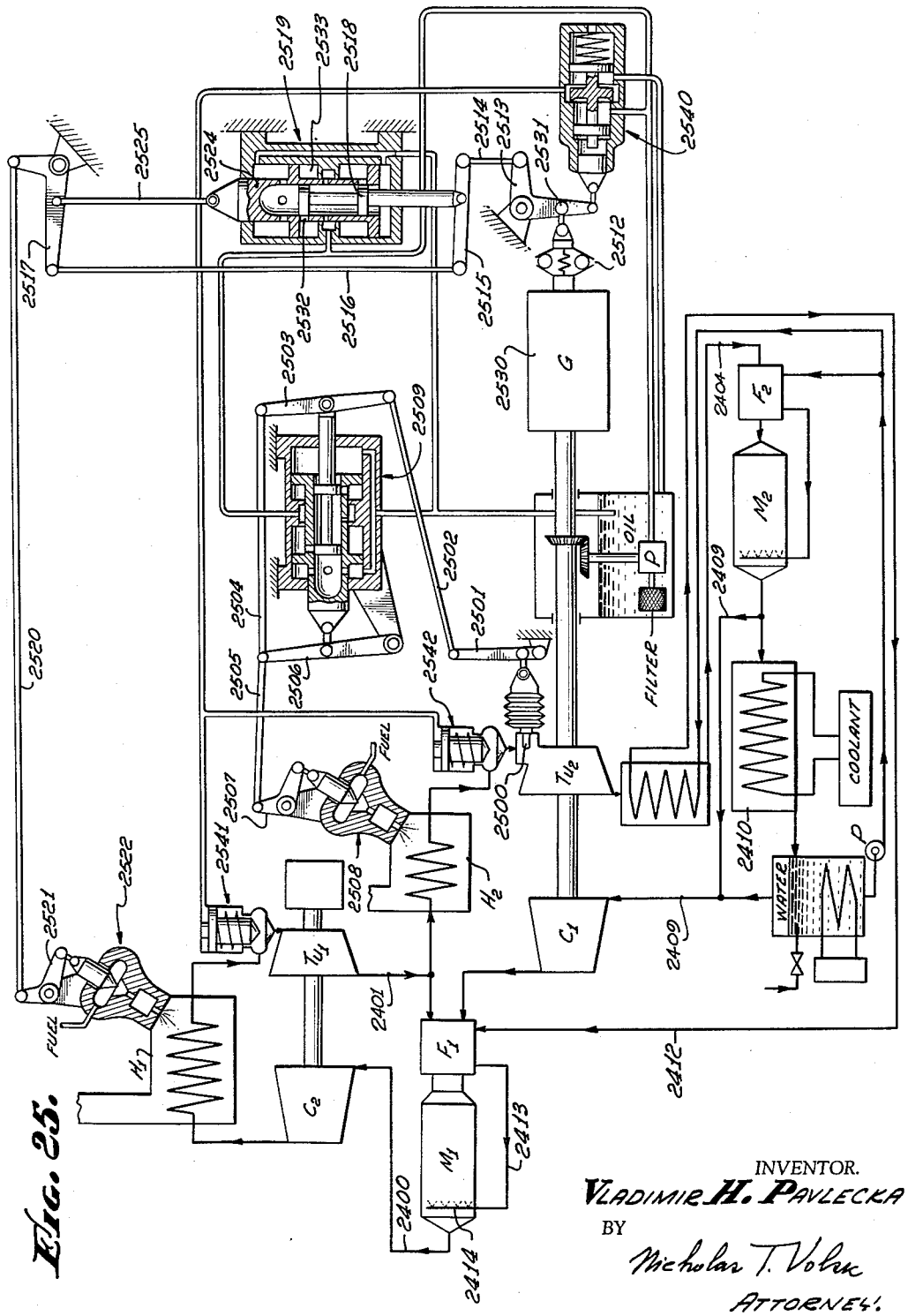

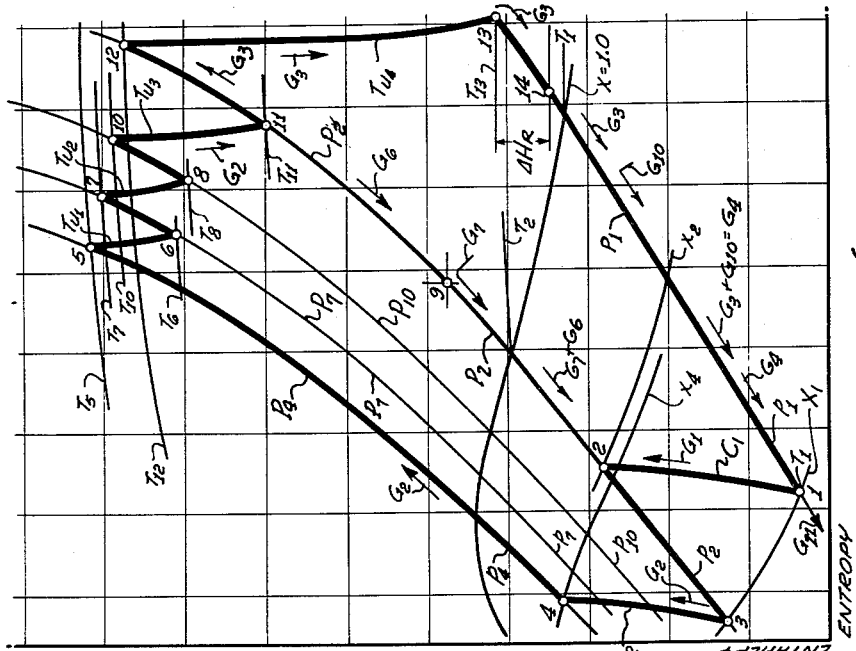
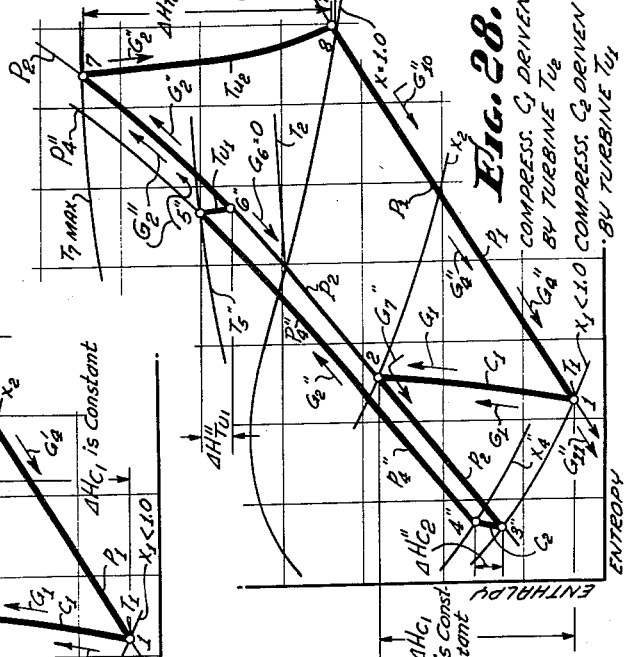
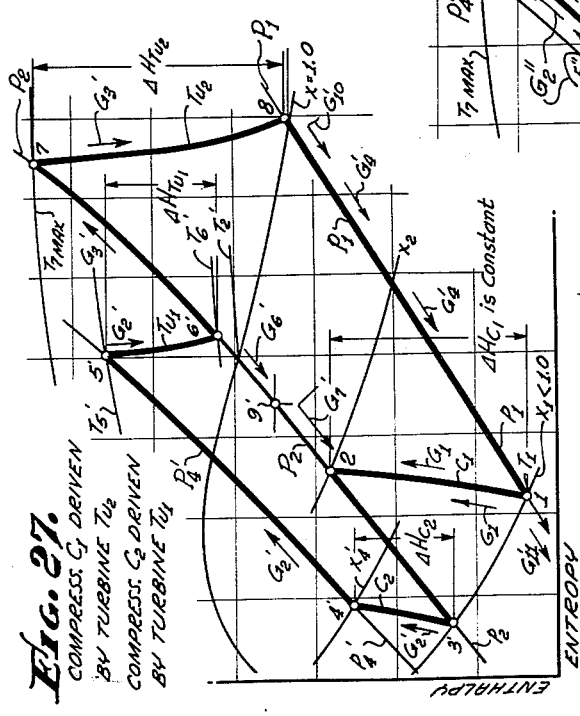
INVENTOR.
VLADIMIR H. PAVLECKA
BY
Nicholas T. Volm
ATTORNEY.

June 7, 1960 V. H. PAVLECKA 2,939,286
DYNAMIC STEAM CYCLE
Filed March 15, 1957 25 Sheets-Sheet 16
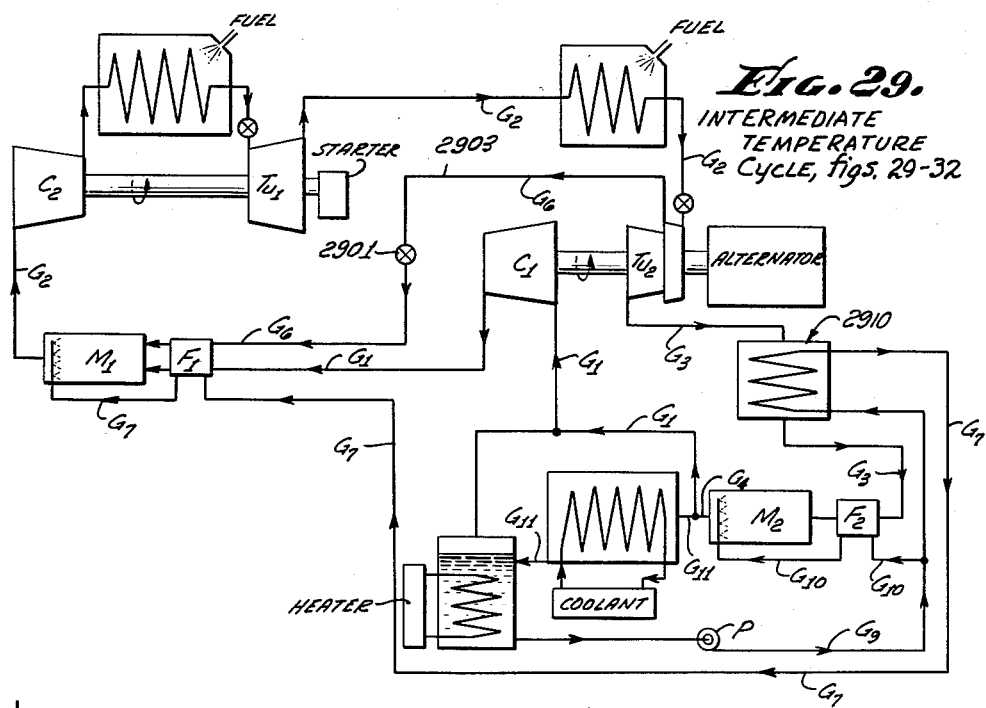
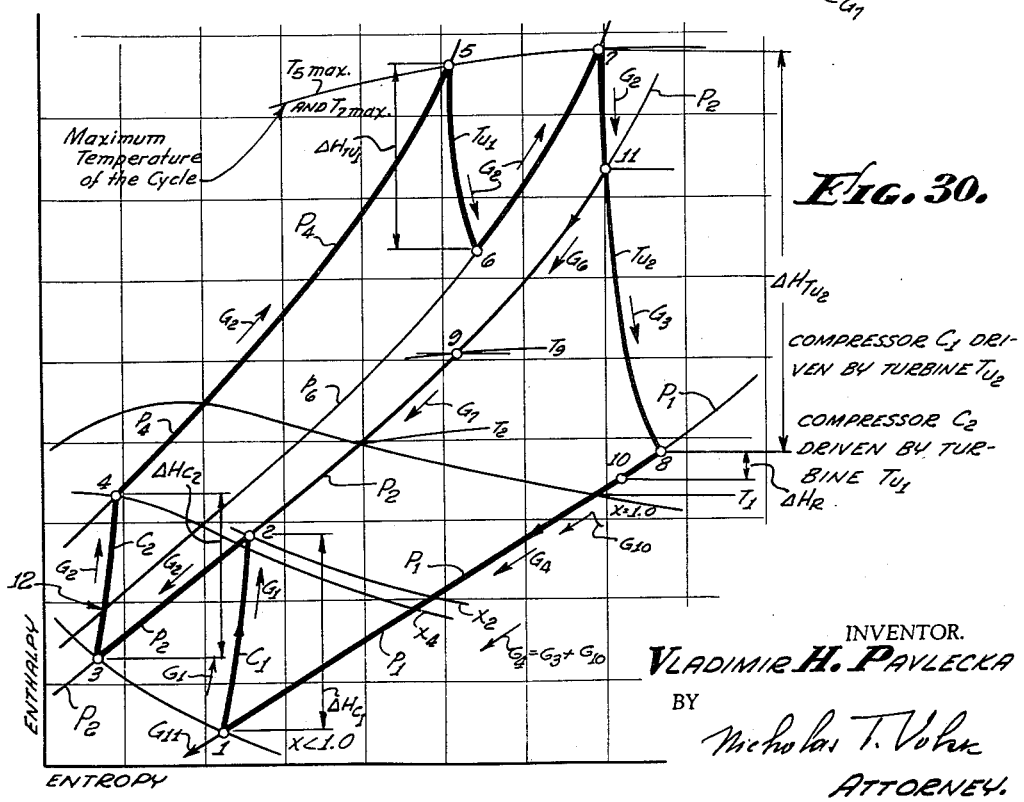
INVENTOR.
VLADIMIR H. PAVLECKA
BY
Nicholas T. Volk
ATTORNEY.

Compressor $C_1$ driven by turbine $T_{U_2}$
Compressor $C_2$ driven by turbine $T_{U_1}$ Compressor $C_1$ driven by turbine $T_{U_2}$
Compressor $C_2$ driven by turbine $T_{U_1}$

INVENTOR.
VLADIMIR H. PAVLECKA
BY
ATTORNEY.

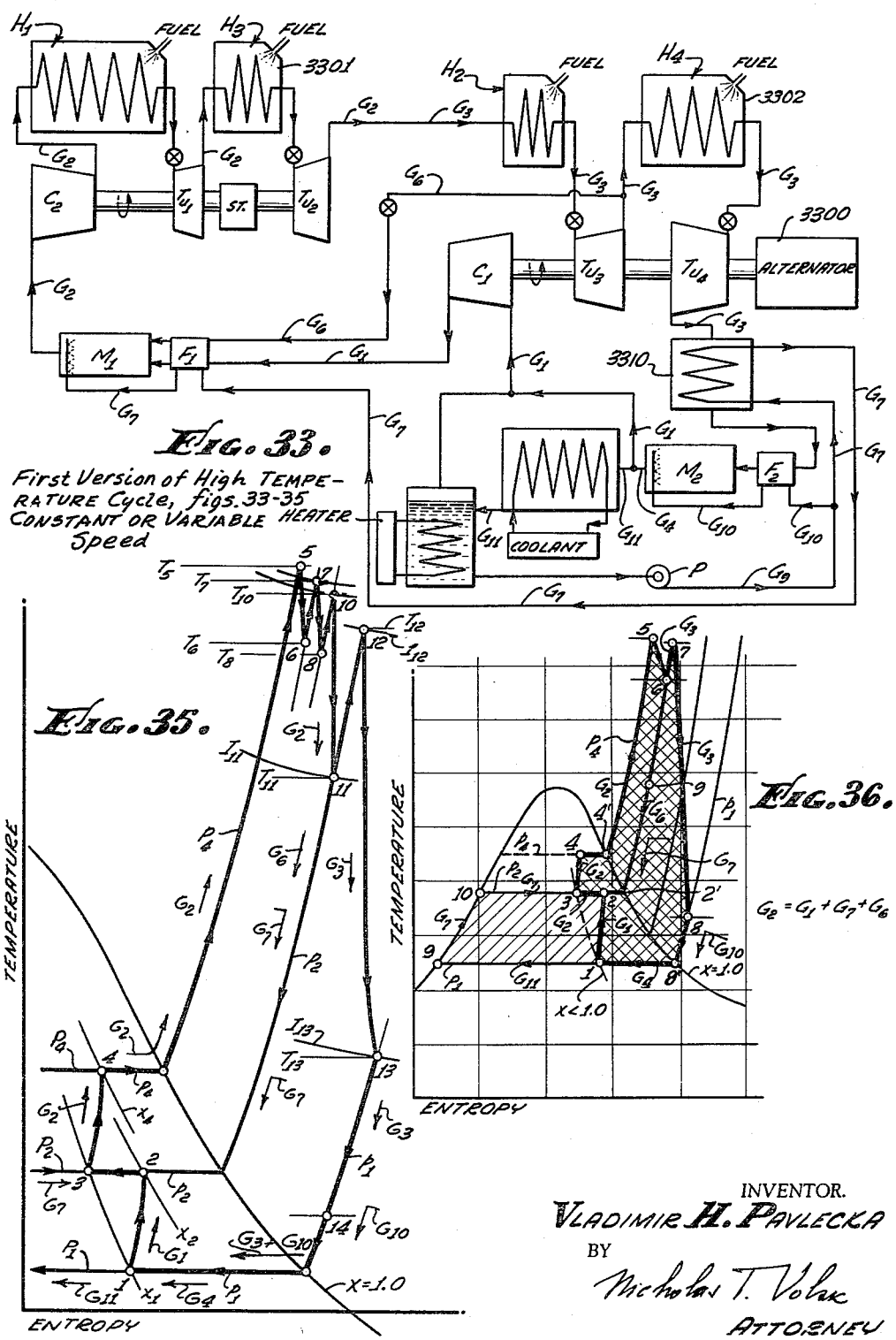

June 7, 1960 V. H. PAVLECKA 2,939,286
DYNAMIC STEAM CYCLE
Filed March 15, 1957 25 Sheets-Sheet 19

A = 1-2-6-1
B = 6-2-3-7-6
C = 7-3-4-5-7
D = 8-1-2-6-9-8
E = 9-6-2-3-7-10-9
F = 10-7-3-4-5-11-10

INVENTOR.
VLADIMIR H. PAVLECKA
BY
Nicholas T Vohr
ATTORNEY.

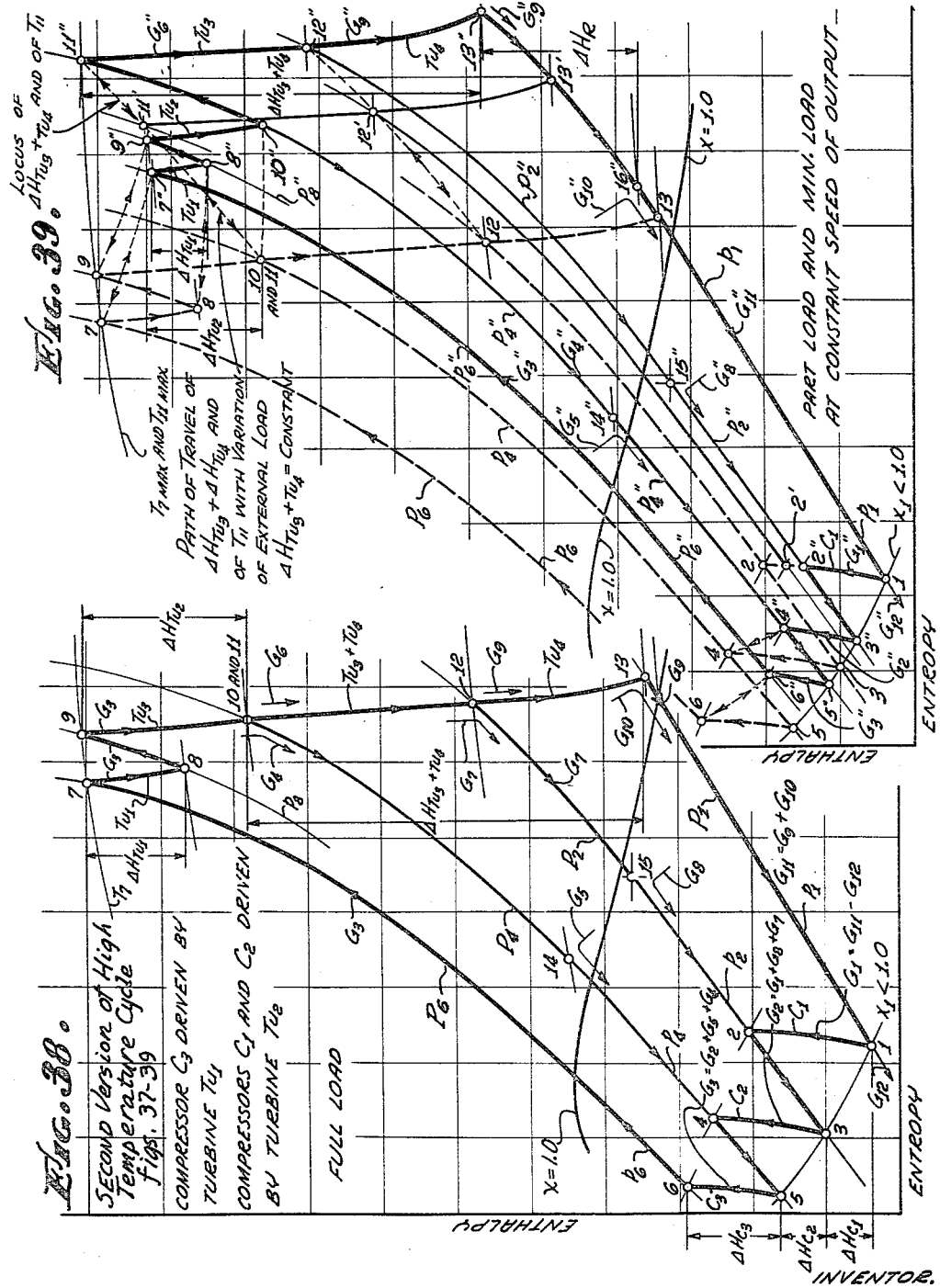

Power Plant with One Load Turbine $Tu_2$ and One Compressor Turbine $Tu_1$; figs. 40-42 Constant Speed Cycle

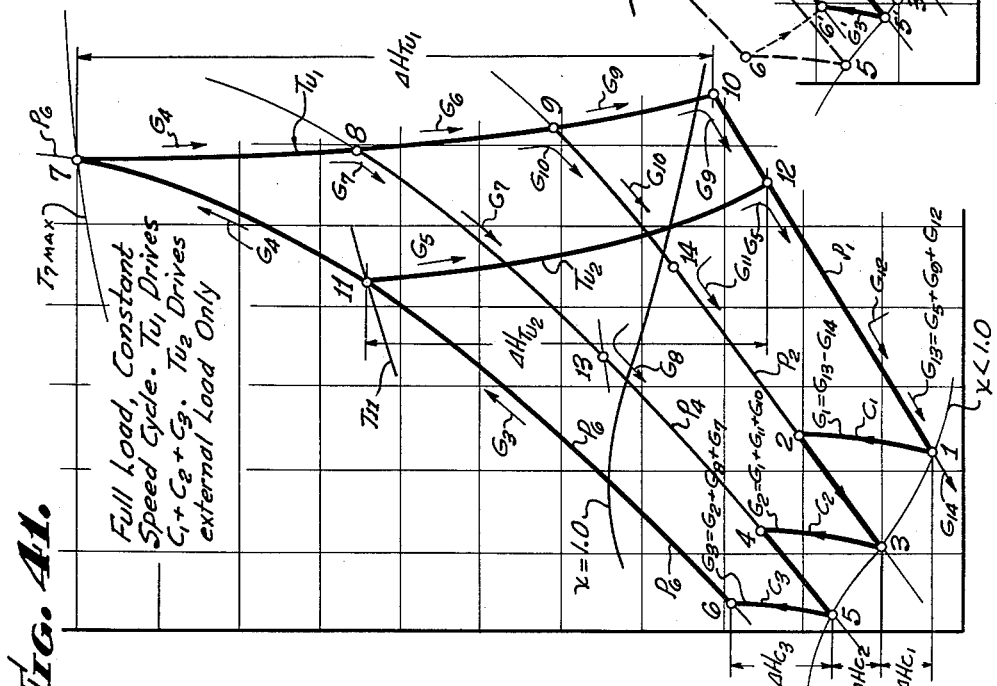

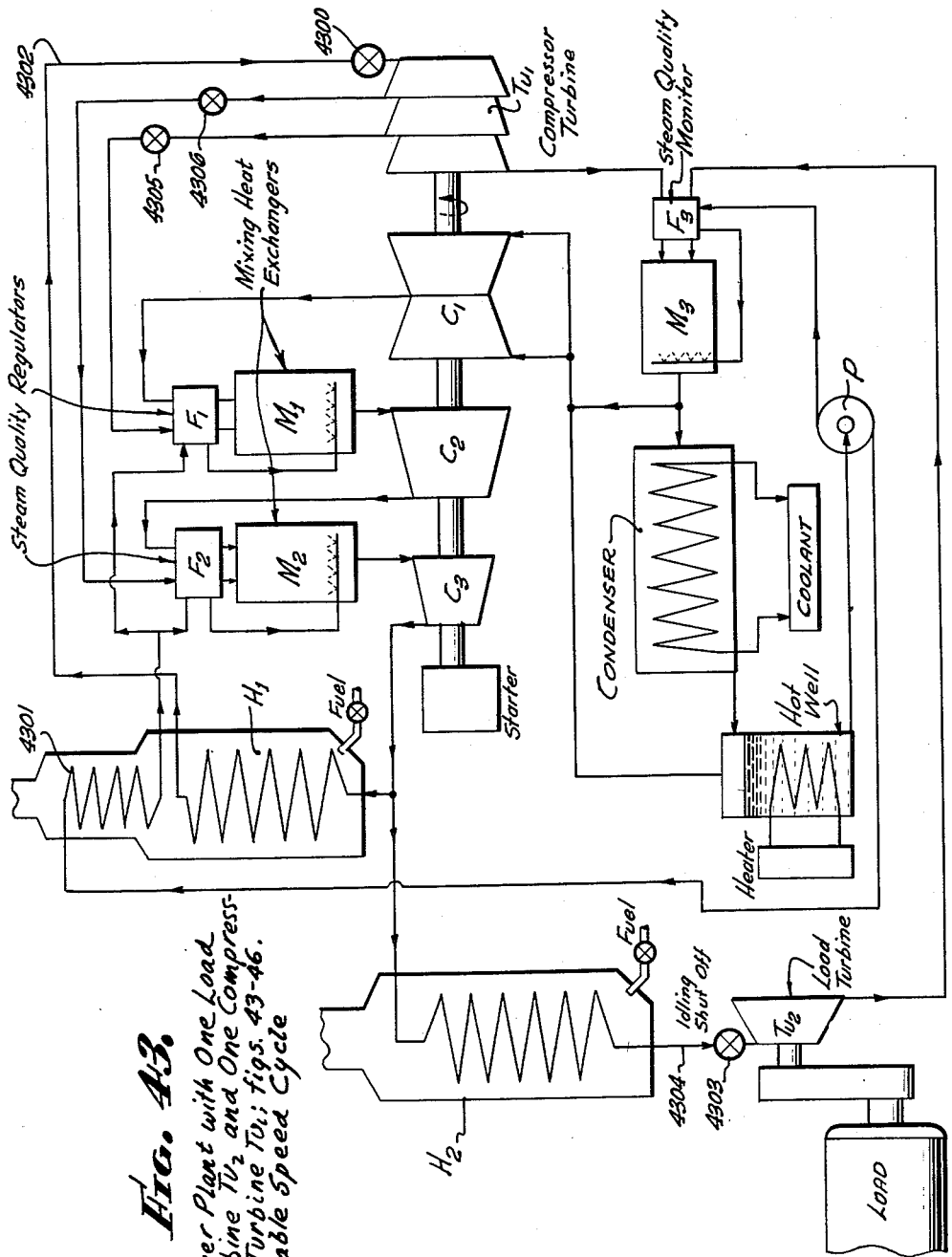

Variable Speed Cycle. $T_{U_1}$ is the Compressor Turbine driving all the Compressors. $C_1$, $C_2$ and $C_3$, $T_{U_2}$ is the Load Turbine delivering only external Power. $\Delta H_{T_{U_1}}$ and $\Delta H_{T_{U_2}}$, $T_7$ and $T_{11}$, $P_2$, $P_4$ and $P_6$ are Variable.

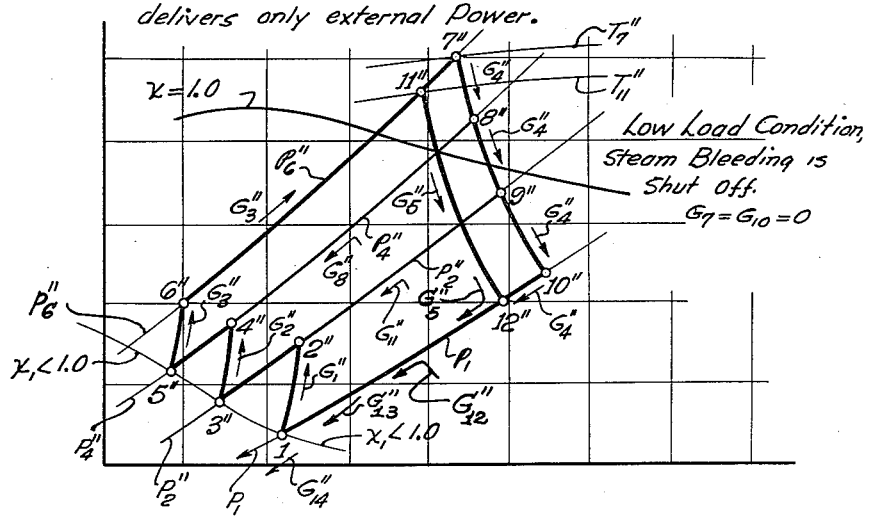
FIG. 45. Variable Speed Cycle. The Compressor Turbine $Tu_1$ drives all Compressors; the Load Turbine $Tu_2$ delivers only external Power.
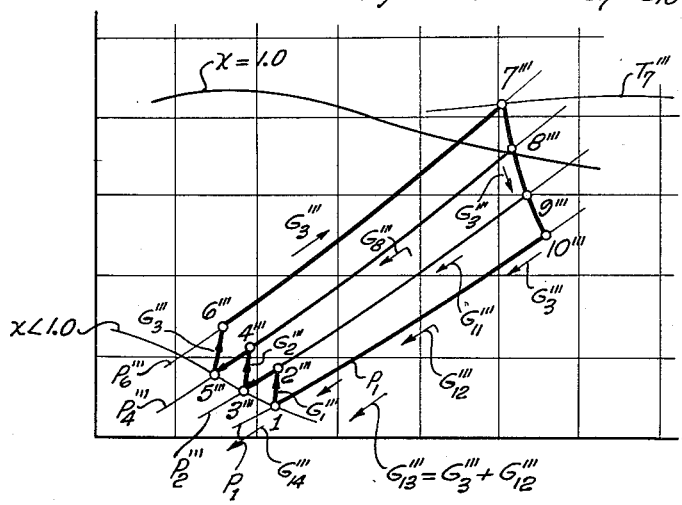
FIG. 46. Variable Speed Cycle Idling Condition $G_7 = G_{10} = 0$

United States Patent Office 2,939,286
Patented June 7, 1960

2,939,286

DYNAMIC STEAM CYCLE

Vladimir H. Pavlecka, Pacific Palisades, Calif., assignor to American Machine & Foundry Company, a corporation of New Jersey Filed Mar. 15, 1957, Ser. No. 646,355

40 Claims. (Cl. 60—73)

This invention relates to dynamic steam cycles and power plants operating in accordance with such cycles. In the disclosed cycles, in their barest essentials, wet steam is compressed by means of a dynamic compressor, then superheated at constant pressure, then expanded to some superheated state to produce useful work, then cooled to the same wet state and dynamically recompressed once more. This cycle has higher thermal efficiency the the Calusius-Rankine cycle in the contemplated region of operation and can be instrumented more easily and at a lower cost than the power plants using the Clausius-Rankine cycle.

In the Clausius-Rankine cycle, water, at some high pressure, is converted into superheated steam which is then expended, to produce useful work, to condenser pressure and temperature. Steam enters the condenser as a wet steam, and it leaves the condenser as water. This water is pumped back into the boiler, thus closing the cycle. The above cycle is the cycle which is used at the present time in all steam power plants, large or small. The Carnot efficiency of this cycle is given by the equation $$\eta_{\text{Carnot}} = \frac{T_{\max} - T_{\min}}{T_{\max}} \quad (1)$$

which is the maximum theoretically efficiency that no cycle ever reaches for reasons which are fully known. All attempts to increases the attainable thermal efficiency have been in the direction of making $T_{\max}$ and $p_{\max}$ as high as possible. The highest thermal efficiency now obtainable is that in the Eddystone steam power plant (Pennsylvania), which has the maximum efficiency of 42.5% at full load. This full load efficiency is obtained at $T_{\max}=1200°$ F. and $p_{\max}=5200$ pounds per square inch. The complexity of such installation and its high initial cost can be realized from reading its description in Paper No. 56-A-165 of ASME, dated August 30, 1956, entitled "Engineering the Eddystone Plant," by J. H. Harlow.

The maximum efficiency of 42.5% at full load can be obtained with the Clausius-Rankine cycle only when the power plant is a very large power plant. For example, the Eddystone plant is the 325 megawatts plant. This is so because it is impossible to utilize steam at 5200 p.s.i. and 1200° F. in a small turbine. Even in the above plant, the superpressure turbine is a very small machine. Superheaters and evaporators also are realizable at such high pressures only when they are of reasonably large size. Medium size plants use $T_{\max}=1000°$ F. and $p_{\max}=1800$ p.s.i. and they have thermal efficiency in the order of 30%-33%. These power plants can have lower capacity, such as 75 megawatts. Power plants of lower capacity use $T_{\max}=700°$ F. and $p_{\max}=800$ p.s.i. and their thermal efficiencies are of the order in 28%-31%.

The invention discloses several versions of a dynamic steam cycle which is capable of attaining higher efficiencies than the Clausius-Rankine cycle when actual implementation of the two cycles is taken into consideration. These higher efficiencies are obtainable with much lower pressures than the pressures currently used with the Clausius-Rankine cycle. Moreover, in the disclosed cycle, the working fluid is steam, as in the Clausius-Rankine cycle, and it is used as a wet steam throughout the compression portion of the cycle, and as a superheated steam throughout the expansion portion of the cycle.

In the Clausius-Rankine cycle, steam is superheated, expanded either to a dry or wet state, is condensed into water, the condensed water is pumped back into a boiler at very high pressure where it is evaporated and the resulting steam is superheated to the desired temperature, thus closing the cycle. The heat of the liquid must be supplied by the boiler, and a larger quantity of heat must be removed by a condenser for converting steam having a quality of 1.0, or slightly lower than 1.0, into water. This lowers the efficiency of the cycle. In the disclosed cycle, superheated steam leaving the last stage of the turbine is not condensed into water but is converted, or cooled, into steam having a quality in the order of .65–.75. This wet steam is then dynamically recompressed in the dynamic compressors in such a manner that it remains as a wet steam after it is compressed. Such dynamic compression can be performed efficiently as long as steam remains wet. The cycle also permits the return of the greater portion of the rejected heat into the cycle, and it is also provided with a regenerative circuit which increases the weight flow of the wet steam in the course of its compression to the maximum pressure, $p_4$, of the cycle. The maximum pressure of the cycle may be in the order of 300–750 pounds per square inch for most applications, while the maximum temperature may be in the order of 800°–1500° F., the higher temperature having a very marked effect on the thermal efficiency of the cycle. For example, with $p_4=440$ p.s.i. and $T_5=1660°$ F. ($T_5$ is the maximum temperature of the cycle), the thermal efficiency is in the order of 38%–39%, while with $p_4=560$ p.s.i. and $T_5=1935°$ R., it is in the order of 46%–50%. It is also possible to obtain higher maximum pressures, $p_4$, with the disclosed cycle by introducing a larger number of compression steps, such as three steps, using three dynamic compressors connected in series. When $p_4$, in such a case, is made in the order of 1500 p.s.i. and the maximum temperature $T_5$ is made equal to 1475° F., then the thermal efficiency will be in the order of 55%–60%. This latter version of the disclosed cycle is suitable for power plants of higher rating. This rating, however, need not be as high as that for the supercritical Clausius-Rankine cycle, the limiting factor being the size, or the dimensions, of the last compression stage in the last compression step compressor. For example, if three serially connected dynamic compressors are used, then the determining compression stage will be the very last compression stage of the third compressor; i.e., the high pressure compressor. Because in the disclosed cycle the weight flow through the third compressor is much larger than through the first compressor (this will become more apparent later), it is possible to envisage power plants which have a rating in the order of 10,000 H.P., which still use three compression steps and three to four reheats. Accordingly, the disclosed cycle is much more versatile in terms of a feasible, readily obtainable minimum rating than the Clausius-Rankine cycle, even for the maximum attainable efficiencies, such as 55%–60% efficiencies. This compares very favorably with the minimum ratings in the order of 300–325 megawatts (using the Eddystone Plant as an example) for the Clausius-Rankine cycle which, even then, has a lower efficiency.

While the disclosed cycle may have wide variations in $p_4$ without drastic effect on efficiency, the Clausius-Rankine cycle inherently is a high pressure cycle for comparable efficiency. In the supercritical cycle, this pressure is 5200 p.s.i. This high pressure produces low efficiency machinery. For example, the high pressure stages of the turbines are less efficient, than are the low pressure stages. The low pressure stages may have an efficiency in the order of 94%–96%, while the high pressure stages may have an efficiency in the order of 60%–70%. High pressures also lower the efficiencies of pumps and produce boilers and ducts having low Reynolds number. Therefore, the machinery for utilizing the heat and the potential energies is more efficient and less expensive when the maximum pressures are lower. The disclosed cycle is capable of producing high efficiencies at moderate pressures (400–1000 p.s.i.) and still higher efficiencies at a pressure in the order of 1500 p.s.i., which is a much lower pressure than 5200 p.s.i. used in the supercritical cycle. The Reynolds number of all components in the disclosed cycle is very high, including steam turbines, dynamic compressors, ducting, heaters (heaters in the disclosed cycle replace the boiler of the Clausius-Rankine cycle), heat recuperators and mixing heat exchangers (used for maintaining constant the quality of wet steam in the course of its dynamic compression). The high Reynolds number and thin walls of the machinery (because of lower pressure) contribute to the higher efficiency and low initial cost and maintenance cost of the machinery required for practicing the cycle. In its simplest form (see the Mollier chart, Fig. 26), steam of $X_1 = .65-.75$ quality and weight flow $G_1$ is compressed through the first step of compression from pressure $p_1$ to pressure $p_2$ in the first dynamic compressor $C_1$. The quality of steam is allowed to increase to some higher value, determined by the compression ratio of compressor $C_1$, but it will remain, as a rule, wet, having a quality in the order of $X_2 \approx .9$. The compressed steam of $X_2 \approx .9$, and under pressure $p_2$ and temperatures $T_2$, is reduced in quality back to $p_1$; i.e., $X_1 \cong .65-.75$, at constant temperature $T_2$ and constant pressure $p_2$ by injecting a superheated steam $G_6$ from one of the turbines and a heated water $G_7$ from a heat exchanger and condenser. This return of the compressed weight flow $G_1$ to quality $X_1$ increases the weight flow from $G_1$ to $G_2$. The weight flow $G_2$ is compressed in the second compressor $C_2$ to pressure $p_4$, temperature $T_4$ and a quality in the order of $X_4$ determined by the compression ratio of the second compressor $C_2$. It is then superheated to temperature $T_5$ at constant pressure $p_4$, and the superheated steam, still having the weight flow $G_2$, is expanded in the first turbine $Tu_1$ to pressure $p_2$ and temperature $T_6$. The partially expanded steam is then divided into two weight flows $G_3$ and $G_6$. The weight flow $G_3$ is reheated to temperature $T_7$ at pressure $p_2$ and then expanded in a second turbine $Tu_2$ to a state $T_8$ and $p_1$. It is then returned, through cooling, to state $p_1$, $T_1$, $X_1$ by injecting water, having a weight flow $G_{10}$, thus increasing the total weight flow from $G_3$ to $G_4$ which is equal to $G_3 + G_{10}$. One part of this wet steam is returned into compressor $C_1$ as the previously mentioned weight flow $G_1$. This closes one part of the cycle at point 1. The remaining portion of the wet steam $G_4$ is returned to a condenser as a weight flow $G_{11}$ where it is condensed into water. One part of the cycle is thus closed at point 1 of the cycle, at which point the weight flow $G_1$ is returned back to the first compressor $C_1$.

It now is necessary to return to that portion of the cycle at which superheated steam leaves the last stage of the first turbine $Tu_1$. It has been stated previously that the weight flow $G_2$, leaving the first turbine $Tu_1$, is divided into two weight flows $G_3$ and $G_6$. The weight flow $G_3$, as stated previously, is reheated and then expanded in the second turbine $Tu_2$. To close the cycle completely, it is necessary to account for $G_6$. $G_6$ is a superheated steam having a pressure $p_2 + \Delta p$ and temperature $T_6$. It is diverted to the input of the second compressor $C_2$, and therefore, it is mixed with the steam leaving the first compressor which has the weight flow $G_1$. The mixing of $G_1$ and $G_6$ in a mixing heat exchanger produces a steam flow $G_1 + G_6$ which may be either a superheated steam or a slightly wet steam having a higher quality than .65–.75. In order to make its quality equal to .65–.75, preheated water from the condenser is injected into the mixing heat exchanger which returns the quality of steam back to the .65–.75 level. This water weight flow is designated as $G_7$. Accordingly, $G_2 = G_1 + G_6 + G_7$. The circuit producing the weight flow $G_2$ will be referred to hereafter as the weight and quality regenerative circuit. This circuit restores the quality to its original level, and it is a regenerative circuit because the weight flow $G_6$ of the superheated steam, which still has heat and potential energies, is returned back into the cycle and is recirculated once more at a higher pressure level $p_2$ than the condenser pressure $p_1$.

The above cycle is applicable either to variable speed or constant speed power plants, and it will be described in connection with two types of variable speed power plants and two types of constant speed power plants using the simplest version of the cycle; i.e., having two compression steps, one reheat step, one weight and quality regenerative circuit and one heat recuperative circuit. For larger rating power plants, the number of the compression steps, reheat steps and the number of the regenerative and recuperating circuits is increased with a marked increase in the thermal efficiency of the cycle. This last version of the cycle will be described at the end of the specification. The above order of description is not in the order of the relative importance of the modified versions of the cycle. Rather, it is in the order of their simplicity so as to facilitate the understanding of the more complex versions of the cycle in the light of the simpler versions which are described in the beginning of this specification.

It is an object of this invention to provide a novel thermodynamic cycle in which an elastic fluid which is in a liquid state at room temperatures and atmospheric pressure, such as water, is used in the cycle, the compression step of the cycle being performed with the fluid having liquid as well as gaseous states throughout the compression step and approaching or only reaching the gaseous state, remaining in gaseous state throughout the expansion step or steps of the cycle, and the weight flows throughout the above steps increasing during the compression step and decreasing during the expansion steps.

It is an additional object of this invention to provide the thermodynamic cycle of the above type in which the increase in the weight flow during the compression step is an inverse function of the decrease in the weight flow during the expansion step.

It is an additional object of this invention to provide a thermodynamic cycle using a working fluid capable of having a change in phase from liquid to gas and from gas to liquid during the operation of the cycle, the additional characteristic of the cycle being that the weight flow of the fluid is maximum in that part of the cycle which has maximum thermodynamic efficiency, and is minimum in the minimum thermodynamic efficiency portion of the cycle.

It is also an object of this invention to provide a novel dynamic steam cycle using a progressively increasing weight flow of working fluid in the compression step of the cycle, a progressively decreasing weight flow in the expansion step of the cycle, relatively low maximum pressures and having thermal efficiencies higher than the efficiencies obtainable with the Clausius-Rankine cycle at any pressure and comparable temperatures, the obtainable efficiencies approaching the ideal Carnot efficiency more closely than the Clausius-Rankine cycle by using maximum weight flow of the working fluid through that portion of the expansion step of the cycle which has maximum thermodynamic efficiency.

It is an additional object of this invention to provide power plants using the dynamic steam cycle of the above type capable of operating at constant and variable speeds with the variations in load.

It is also an object of this invention to provide a novel dynamic steam cycle in which a progressively increasing weight flow of wet steam is dynamically compressed while it remains wet through the compression step; the compressed wet steam is then superheated, a progressively decreasing weight flow of superheated steam is then expended, then cooled to its original state of the wet steam and then recompressed again at substantially constant quality and without being allowed to become a superheated steam during the compression step of the cycle.

It is also an object of this invention to provide a dynamic steam cycle in which wet steam having a weight flow $G_1$ is compressed from state $T_1$ and $p_1$ to a state $T_2$ and $p_2$; the weight flow $G_1$ is then increased to a weight flow $G_2$ having the same pressure $p_2$; the weight flow $G_2$ is then compressed to a state $p_4$ and $T_4$ with the compressed steam still remaining as a wet steam or reaching a saturation point at the end of the compression step; it is then superheated to a state $p_4$ and $T_5$, expanded to a state $T_3$, $p_1$, and cooled back to state $p_1$, $T_1$.

Another object of this invention is to provide a dynamic steam cycle having a plurality of dynamic compression steps of wet steam and a plurality of quality and weight flow regenerative circuits for maintaining constant the wet quality of steam in the course of all compression steps and for progressively increasing the weight flow with each step of compression, the cycle also having a plurality of expansion and reheat steps and at least one heat recuperating circuit on the low pressure side of the cycle.

Still another object of this invention is to provide control systems for power plants utilizing the above cycle and operating either at constant speed or variable speed with the variation in the external load.

The novel features which are believed to be characteristic of this invention, both as to its organization and methods of operation, together with further objects and advantages thereof, will be better understood from the following description given in connection with the accompanying drawings in which several embodiments of the invention are illustrated by way of several examples. It is to be expressly understood, however, that the drawings are for the purpose of illustration only and are not intended as a definition of the limits of the invention.

Referring to the drawings:

Figures 1 through 5 are the Mollier charts for the variable speed power plant;

Figures 6 and 7 are the schematic diagrams of the variable speed power plant;

Figures 8 through 10 are Mollier charts for a modified version of the variable speed power plant;

Figure 11 is a schematic diagram for the second version of the variable speed power plant;

Figures 12 through 15 are the Mollier charts for various types of dynamic compression of wet steam;

Figures 16 through 18 are the Mollier charts for various types of expansion of superheated steam which are feasible with the disclosed dynamic cycle;

Figures 19, 20 and 20A are the schematic diagrams of the first type of the constant speed power plant;

Figures 21 through 23 are the Mollier charts for the first constant speed power plant disclosed in Figures 19 and 20;

Figures 24 and 25 are the schematic diagrams of the second type of constant speed power plant;

Figures 26 through 28 are the Mollier charts for the second type of the constant speed power plant;

Figure 29 is the schematic diagram and Figs. 30, 31 and 32 are the Mollier charts for the third version of the constant speed power plant;

Figure 33 is the schematic diagram and Fig. 34 is the Mollier chart for the fourth version constant speed power plant with two compression steps and three reheat steps;

Figure 35 is the temperature-entropy chart for the power plant shown in Fig. 33;

Figures 36 and 36B are the entropy-temperature charts for the disclosed cycle.

Figure 37 is the schematic diagram and Figs. 38 and 39 are the Mollier charts of the fifth version of the constant speed power plant using two reheats and three compression steps;

Figure 40 is the schematic diagram and Figs. 41 and 42 are the Mollier charts for the sixth version of the constant speed power plant.

Figure 43 is the schematic diagram and Figs. 44, 45 and 46 are the Mollier charts for the third version of the variable speed power plant.

*The first version of the variable speed cycle*

The first version of the variable speed dynamic steam cycle is illustrated in Figs. 1 through 7. The Mollier charts, shown in Figs. 1 through 5, can be understood quite readily from the examination of Fig. 1 alone if one is to restrict such examination only to the enthalpy-entropy changes in the steam. However, for complete understanding of the cycle, it is also necessary to take into consideration the weight flows in various branches of the circuit, which are indicated by arrows in Figs. 1 and 6. The description of Fig. 6 will be given first, and the description of Fig. 1 will follow.

Figure 6:
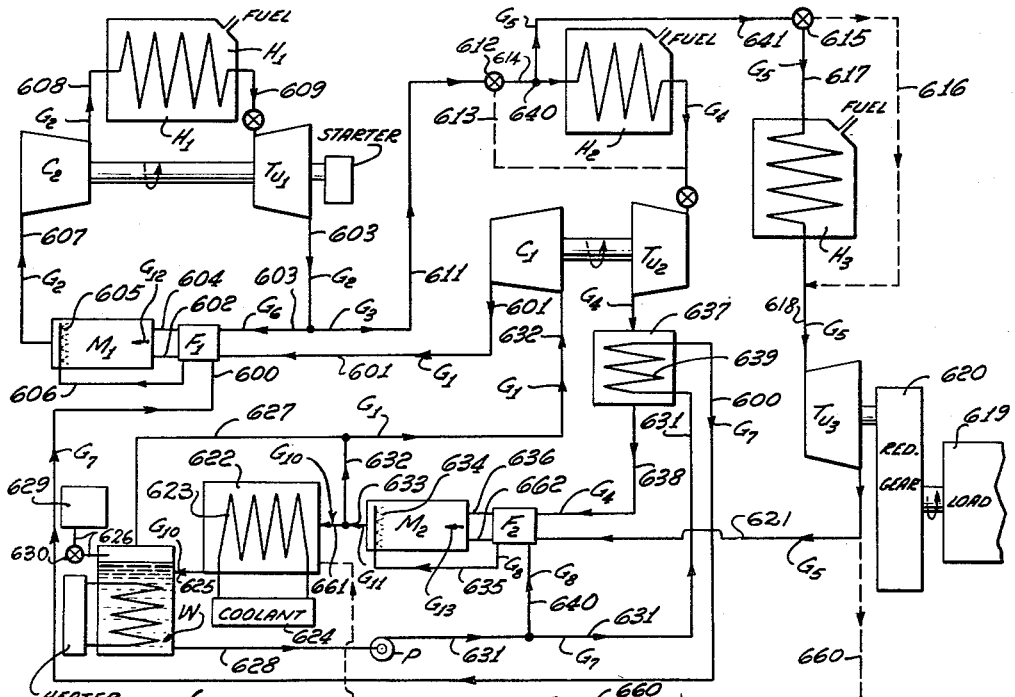

*Schematic diagram of the first version of the variable speed power plant.*—Referring to Fig. 6, the main components of the power plant include two serially connected compressors $C_1$ and $C_2$ driven by two serially connected compressor turbines $Tu_1$ and $Tu_2$ and a load turbine $Tu_3$ connected to the output of the second compressor $C_2$ in parallel with the second compressor turbine $Tu_2$. The entire circuit is a closed loop circuit, the exhaust steam from the turbines $Tu_2$ and $Tu_3$ being returned to the first compressor $C_1$. Steam is used as a working fluid because of its superior thermodynamic characteristics for the purpose at hand. The cycle must include a phase change in the working fluid, and such change is obtainable most readily, at the temperatures and pressures used in the cycle, with steam rather than with any other fluid. Beginning with compressor $C_1$, it discharges into a steam quality regulator $F_1$ through a duct 601. The steam quality regulator $F_1$ also receives superheated steam from the exhaust side of turbine $Tu_1$ through a duct 603 and preheated water from a hot well W through a pump P, a duct 631, a coil 639 of a heat exchanger 637 and a duct 600. The above three input circuits, i.e., ducts 600, 601, and 603, pass through the regulator $F_1$ and leave it through three ducts 606, 602, and 604. Ducts 602 and 604 convey wet steam $G_1$ and superheated steam $G_6$ to a mixing heat exchanger $M_1$, and duct 606 conveys the preheated water $G_7$ into the heat exchanger $M_1$ through a plurality of spray nozzles 605. It is the function of the regulator $F_1$ and exchanger $M_1$ to produce a weight flow $G_2$ of steam in duct 607, having the same quality as the quality of the steam entering compressor $C_1$; i.e., the quality of the steam in duct 632. The reasons for making the two qualities equal will be discussed more in detail in connection with the description of Figs. 12 through 14. As will appear later, such control of quality produces the most efficient compression of steam in the two compressors with maximum weight flow of fluid through the second compressor $C_2$. From the above description, it follows that $$G_2 = G_1 + G_6 + G_7 \qquad (2)$$

The above weight flows are indicated in Figs. 1 through 6 by the arrows in the Mollier charts and by the lead lines connecting the respective weight flow G's to their respective ducts. These weight flows correspond to the flow of steam in pounds per second. For example, $G_1$ is the weight flow to and from compressor $C_1$, $G_2$ is the weight flow through compressor $C_2$, etc.

The quality regulators, such as $F_1$, are known in the art, especially in chemical industry, where they are used for mixing dissimilar gases in fixed, predetermined proportion. In this case, these regulators are used for maintaining constant the quality of steam, for example in duct 607, at, say, .65, by combining the higher quality wet steam from duct 601, the superheated steam from turbine $Tu_1$ and heated water from well W.

The mixing heat exchangers are also known in the art. Exchanger $M_1$ merely acts as a mixing chamber for the fluids injected into it.

The exchanger discharges into a duct 607 connected to the input side of compressor $C_2$. The output side of compressor $C_2$ is connected to a heater $H_1$ through a duct 608. Heater $H_1$ may be a coil in a combustion chamber using coal or oil as fuel, or it may be a coil in a heat exchanger connected to an atomic reactor. Superheated steam leaves heater $H_1$ through a duct 609 and is expanded in a turbine $Tu_1$ which drives compressor $C_2$. Turbine $Tu_1$ discharges into ducts 603 and 611. Duct 603 is connected to regulator $F_1$, while duct 611 is connected to a two-way valve 612 which directs the flow of the superheated steam either into a duct 613 or duct 614. Duct 614 is connected to a two-way valve 615 and to the second heater $H_2$ through a duct 641. Heater $H_2$ conveys the reheated superheated steam to turbine $Tu_3$. The two-way valve 615 is connected on its discharge side to ducts 616 and 617. Valve 615 can direct the steam flow either into duct 616 or duct 617. Duct 617 is connected to the third heater $H_3$ which is connected through a duct 618 to the load turbine $Tu_3$. Turbine $Tu_3$ is connected to an external load 619 through a reduction gear 620. Turbine $Tu_3$ discharges into a duct 621 and then into the second quality regulator $F_2$. An alternative circuit is also indicated by a dotted duct 660 for the exhaust of turbine $Tu_3$ which connects it directly to a condenser 622. Condenser 622 has a coil 623 connected to a source of cold water 624, or other source of cooling medium suitable for converting the superheated steam into water. The condensed water leaves condenser 622 through a duct 625 and enters a hot well W having, besides duct 625, three additional ducts 626, 627, and 628. Duct 626 is connected to a source of make-up water 629 through a regulated valve 630 which maintains constant the water level in well W; duct 628 is connected to pump P; and duct 627, which is used for starting the power plant, is connected to duct 632. Duct 632 is connected to ducts 633 and 661. Ducts 633 and 632 connect the second mixing heat exchanger $M_2$ to compressor $C_1$ and duct 661 connects exchanger $M_2$ to condenser 622. Exchanger $M_2$ is provided with the water-spraying nozzles 634 which are connected to a steam quality regulator $F_2$ through a duct 635. Two additional ducts 636 and 662 also connect regulator $F_2$ to exchanger $M_2$. Regulator $F_2$ receives superheated steam from turbine $Tu_2$ through a heat exchanger 637 and a duct 638. Coil 639 of the heat exchanger 637 is connected to pump P through duct 631 and to regulator $F_1$ through duct 600. The regulator is also connected to hot water well and pump P through ducts 631 and 640 and to the exhaust side of turbine $Tu_3$ through duct 621. This regulator is identical to regulator $F_1$ in its function. It keeps constant the quality of steam entering compressor $C_1$.

Figure 1:
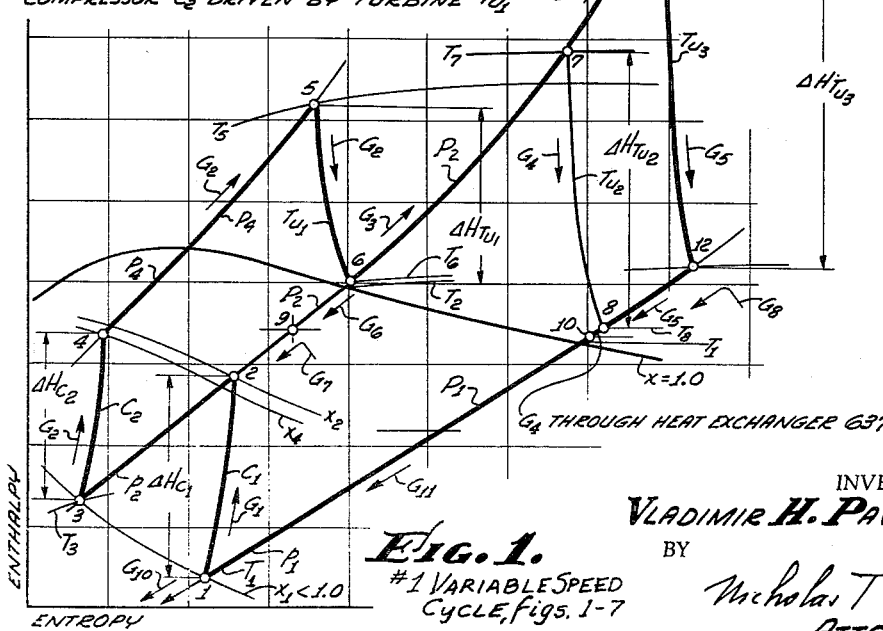

The operation of the power plant of Fig. 6 will be discussed now in connection with the cycle diagrams illustrated in Figs. 1 to 5 and the schematic diagram shown in Fig. 6. Wet steam, having a quality in the order of .65–.75, enters compressor $C_1$ through duct 632. This state of the steam is illustrated by point 1 in Fig. 1. The entire cycle is indicated in Fig. 1 by the points 1–2–3–4– 5–6–7–8–1 and 1–2–3–4–5–6–11–12–1. Steam is polytropically compressed to state 2 in compressor $C_1$ and, after passing through the steam quality regulator $F_1$ and the mixing heat exchanger $M_1$, it leaves $M_1$ at a lower temperature $T_3$ and a lower quality which is equal to the quality of steam at point 1. Therefore, $X_1 = .65$–.75 at point 3. The quality at point 2 may be in the order of .9 if $$\frac{p_2}{p_1} = \frac{1}{.03}$$

It should be noted here that the pressure $p_1$, at the entry into compressor $C_1$ may be in the order of 1 inch of mercury (condenser pressure) while the pressure in the output side of compressor $C_1$ may be in the order of 1 atmosphere. The changes in the conditions of steam from point 2 to point 3 are obtained by discharging part of the superheated steam exhaust from turbine $Tu_1$ into the regulator $F_1$. This is indicated by a weight flow $G_6$. A weight flow $G_7$ of condensed water is also supplied to regulator $F_1$ from hot well W by means of pump P after the temperature of this water has been raised to a higher temperature than $T_1$ in the heat exchanger 637 by the exhaust steam from turbine $Tu_2$. Accordingly, the weight flow of the steam through duct 607, indicated as $G_2$ in Fig. 1, and into compressor $C_2$ is equal to $$G_2 = G_1 + G_6 + G_7 \qquad (3)$$

where $G_6$ is the weight flow of superheated steam from $Tu_1$ to regulator $F_1$; $G_7$ is the weight flow of hot water from well W to regulator $F_1$ and spray nozzles 605.

Therefore, $G_2 \gg G_1$. For example, in one cycle $$G_1 = 1.0 \frac{\text{pound}}{\text{second}}$$

while $$G_2 = 3.2 \frac{\text{pounds}}{\text{second}}$$

in another cycle $G_2 = 2.4$, etc.

The magnitude of $G_2$ is determined by the overall cycle, but more particularly by the position of point 9 in Fig. 1, which indicates the state of steam in the mixing heat exchanger $M_1$ prior to its quenching by water leaving nozzles 605. Therefore, point 9 corresponds to an imaginary state of equalibrium reached by steam leaving turbine $Tu_1$ and steam leaving compressor $C_1$. This equilibrium is not present in the actual plant because of the presence of the nozzles 605 in the same chamber into which water $G_7$ is injected together with the steams $G_1$ and $G_6$. For the same reasons, $G_{13}$ does not exist as such in the actual power plant but it, as well as point 9, are thermodynamic parameters which play a useful role in the overall evaluation of the cycle. The larger the $G_2$ and the higher the $T_5$, the more efficient is the cycle because $$\frac{T_5 - T_3}{2}$$

must be as high as possible to obtain high efficiency, and the weight flow $G_2$ should be also maximum in this leg of the cycle so that a maximum amount of weight flow would be reaching point 5 in Fig. 1 by being raised through the minimum temperature range. The above follows from the equation for the Carnot efficiency which, in this case, becomes $$\eta_{\text{Carnot}} = \frac{T_5 - T_1}{T_5} \qquad (4)$$

$G_2$ enters into the above relationships because it may be shown that the mean temperature of the cycle between points 1–4 is higher if the weight flow $G_2$ is larger through the upper, or second, compression step 3–4 of the cycle, than the weight flow $G_1$ through the lower compression step 1–2. Steam is then again compressed from point 3 to point 4, points 3 and 1 being, as stated previously, on the same quality $X_1$ line and points 2 and 4 being on the quality lines $X_2$ and $X_4$, respectively, which may be the same lines. In general, steam should be dynamically compressed at the lowest quality possible without injury to the blading of the compressors. Quality of .65–.75 is a reasonably safe figure. Compression with low quality requires less work, and therefore, the limit as to quality is a purely dynamic one; i.e., the compressor blading is eroded by the steam having a lower quality than .65, and therefore, this quality is the most practicable from the point of view of the life of the compressor blading. In axial compressors, the low quality steam, such as .65, would produce centrifuging of water toward its outer periphery, and such concentration of water would produce flow distortions, low efficiency of compression, and blade erosions. Therefore, .65 quality can be tolerated in the centrifugal and centripetal compressors, but it must be in the order of .85 with the axial compressors. Therefore, the use of centrifugal or centripetal compressors is more advantageous with this cycle, the centripetal compressor giving the highest compression ratios at the highest efficiency and large weight flows. The quality of steam at point 4 may have any quality, depending upon the compression ratio, but it should be lower than 1.0 for obtaining a more efficient compression and maximum weight flow. This is also true of point 2. The compressed steam is discharged into heater $H_1$ where it is heated from state 4 to state 5, to temperature $T_5$, which may be the maximum temperature in one type of the cycle. The magnitude of this temperature is determined by the type of source of heat used in heater $H_1$. If an atomic heterogeneous reactor is used, the temperature will be about 530° F., with a homogeneous reactor it will be about 1000° F., and in a combustion chamber using oil or coal, it will be about 1500° F. The above temperatures are the steam temperatures for point 5 in Fig. 1 and duct 609 and the input side of turbine $Tu_1$. Prior discussion of the maximum efficiency indicates that it is desirable to have $T_5$, $T_7$ and $T_{11}$ as high as possible. The turbines $Tu_1$, $Tu_2$ and $Tu_3$ can be designed quite readily for the temperatures as high as 1500° F. Higher temperatures have adverse effects on the alloys used for turbine blading, and there is also a possibility of encountering dissociation of steam into hydrogen and oxygen. Therefore, the limiting factor is the temperature which can be used with the known alloys and without encountering dissociation phenomena. The temperature of 1500° F. is sufficiently low so as not to be a factor in the dissociation of steam into hydrogen and oxygen. The temperature of 1500° F. can also be used safely in the turbines, especially when the first stage of the turbine is water-cooled or air-cooled. The entire weight flow $G_2$, flowing through duct 609, is expanded through turbine $Tu_1$ which corresponds to the enthalpy drop 5–6 indicated in Fig. 1. The degree of expansion through turbine $Tu_1$ must be carried out in this cycle up to point 6, Fig. 1, which lies slightly above the pressure line $p_2$ which corresponds to the pressure obtained at the exit from compressor $C_1$. This pressure is indicated by point 2 in Fig. 1. The pressure at point 6 should be slighty higher than at point 2 in order to obtain the pressure gradient between these two points, for obtaining the weight flow $G_6$ from turbine $Tu_1$ to the quality regulator $F_1$. This regulator is connected directly to the output of compressor $C_1$ through duct 601, and therefore, it receives the compressed steam at pressure $p_2$. The amount of steam flowing from turbine $Tu_1$ to regulator $F_1$ is determined by the capacity of compressor $C_2$ rather than duct 603, this latter duct being made sufficiently large so as to supply that part of steam which is necessary to maintain the steam entering compressor $C_2$ of proper quality. The steam quality regulator $F_1$ controls the quality of steam reaching compressor $C_2$ by controlling the amount of flow $G_6$ from turbine $Tu_1$ to exchanger $M_1$. The remaining steam leaving turbine $Tu_1$ flows over duct 611 to the two turbines $Tu_2$ and $Tu_3$, which are connected in parallel with respect to duct 611 and the exhaust of turbine $Tu_1$. When $T_7 = T_{11}$, the division of weight flow $G_3$ between the two parallel circuits $Tu_2$ and $Tu_3$ will be equal, and therefore, $G_4$ will be equal to $G_5$. When $T_{11}$ becomes lower than $T_7$ at part load, then $G_5 > G_4$, the division of the weight flow following the following relationship:

$$\frac{G_4}{G_5} \approx \sqrt{\frac{T_{11}}{T_7}} \qquad (5)$$

Figure 2:
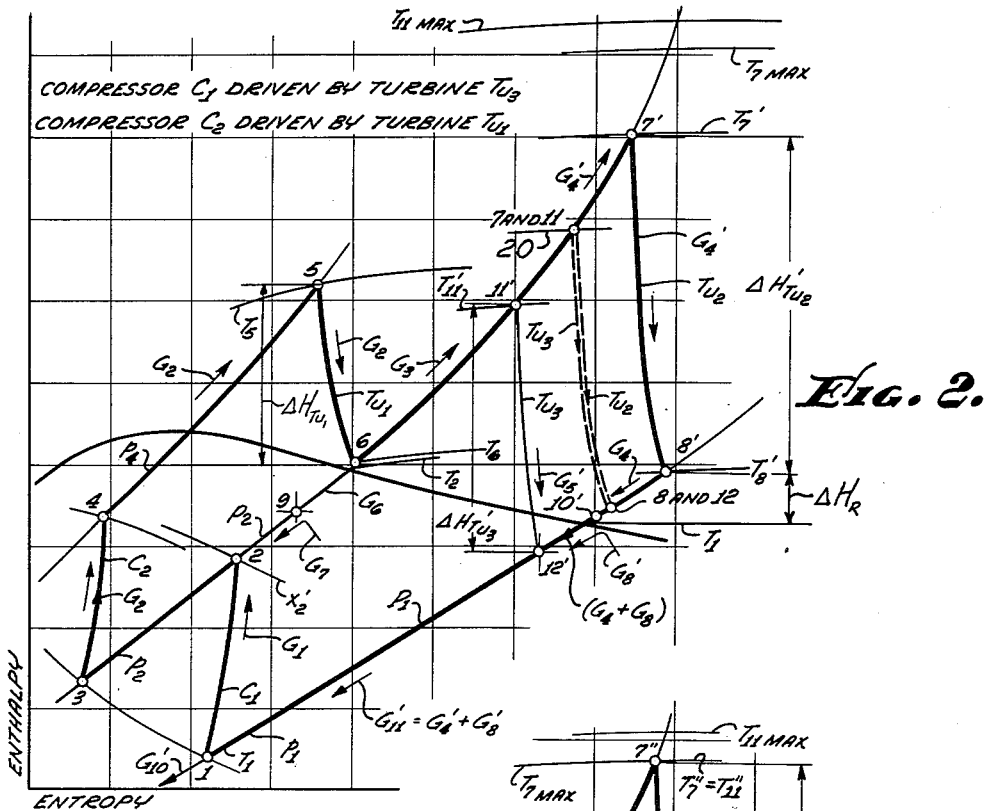

The heaters $H_2$ and $H_3$ may be identical in nature and, therefore, the temperatures produced in the steam after it leaves these heaters may be the same as indicated by $T_{11}$ and $T_7$ in Fig. 2, which lie on the same isothermal line 20. $T_{11}$ may be higher at full load, as indicated in Fig. 1, if the full load operation is transient in nature and turbine $T_{u3}$ can withstand this higher temperature. When $T_{u3}$ must be operated at full load for long periods of time, then the maximum values of $T_7$ and $T_{11}$ will have to be equal. When the temperatures $T_7$ and $T_{11}$ are equal at full load and $G_4$ and $G_5$ are also equal, then the two turbines $T_{u2}$ and $T_{u3}$ are identical to each other in terms of size, number of stages, breathing capacity, etc.

The above type of operating of turbines $T_{u2}$ and $T_{u3}$ represents no more than one convenient mode of operating these turbines, which produces an equal division of weight flow at full load. The division of the weight flow at part load, as will be described more in detail later, is not equal because the temperatures in the heater $H_3$ is lowered. Therefore, there is a greater weight flow through the load turbine $T_{u3}$ than through the compressor turbine $T_{u2}$, the division of flow being in accordance with equation (5). However, the above unequal division of weight flow at part load takes place with steam entering the load turbine $T_{u3}$ at lower $T_{11}$ and lower pressure. Accordingly, the dynamic similarity of the load turbine $T_{u3}$ remains constant. One of the advantages of such a mode of operating $Tu_2$ and $Tu_3$ is that the two turbines are identical to each other. The illustrated cycle, with the higher temperature for the load turbine $Tu_3$, is more efficient than when the temperatures for the load turbine and of the compressor turbine $Tu_2$ are equal. It also will have a higher output at full load and part loads. The disadvantage of such cycle resides in the fact that it requires two different turbines. Turbine $Tu_3$ will require a larger number of stages than turbine $Tu_2$ because $\Delta_{Tu3}$ is larger than $\Delta H_{Tu2}$. $T_{11max}$ may be as high as 1500° F., as mentioned previously, but it would be preferable to operate the load turbine at such temperature only for a relatively short period of time so as to avoid its dimensional deterioration due to creep. Enlargement of the turbine rotor takes place when it is operated at high temperature for a long period of time, such enlargement being a function of temperature and time. When full load operation is encountered over relatively short periods of time, which, for example, is the case in ship propulsion, then the cycle of the type using $T_{11max}$ at full load, shown in Fig. 1, is the better of the two.

The remaining portion of this cycle should be apparent from the prior description of Fig. 6. The only part which needs mentioning is that water entering the mixing heat exchanger $M_1$ through ducts 600 and 606 and nozzles 605 is preheated in the heat exchanger 637 by means of a coil 639 and means of superheated steam leaving turbine $Tu_2$. This gain in heat is indicated by $\Delta H_R$ in Fig. 3. This reheating of water increases the weight flow $G_2$, the thermal efficiency and the specific output of the power plant.

The injection of water $G_7$ and $G_8$ is indicated by the arrows having bent-over portions to indicate that water is injected through the mixers M's and quality regulators F's. The positions of the arrows on the Mollier charts is not thermodynamically accurate: it would be more accurate, from the thermodynamic point of view, to have arrow $G_8$ to enter the cycle at point "1," and arrow $G_6$ at point "3" on the Mollier charts. However, from the point of view of the flow diagram illustrated in Fig. 6, such positioning of the arrows $G_6$ and $G_8$ would not correspond to the ducting illustrated in Fig. 6, therefore an arbitrary decision was made to make the following choice: the positions of these arrows actually shown on all the Mollier charts is that corresponding to the actual ducting rather than the thermodynamically correct plotting of their positions on the Mollier charts. This should be kept in mind in studying the Mollier charts.

Figure 3:
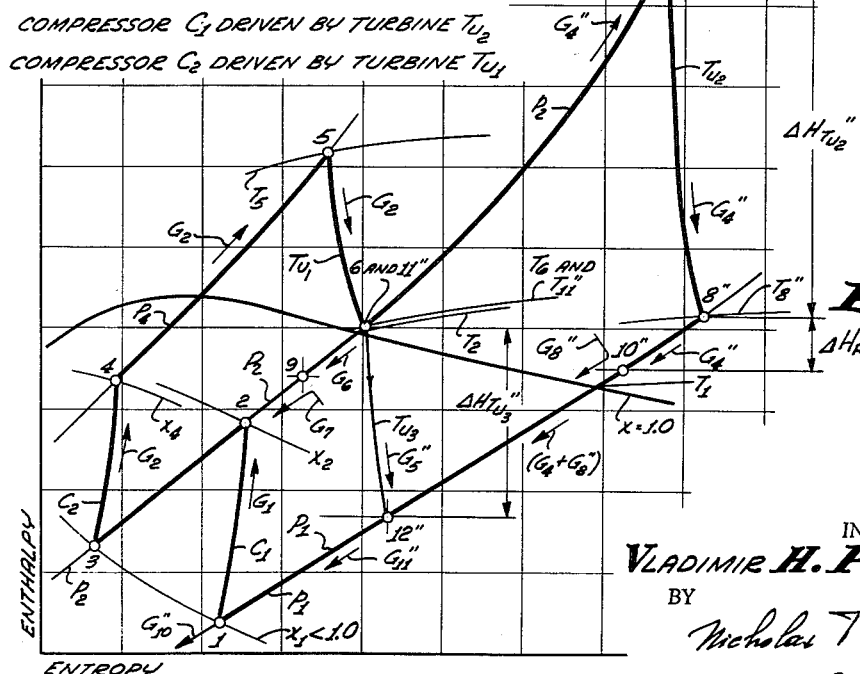

*Control system for the first version of the variable speed power plant.*—The control system for the variable speed power plant is disclosed in Fig. 7. The variable speed power plants are manually controlled, since they are used in ships, locomotives, and other forms of transportation equipment, or in such machines as bulldozers, etc. The illustrated controls are mechanical controls rather than electronic controls. The electronic controls, which are known in the art, are more complex, and for this reason, the principles of the control system can be shown in a simpler manner with the mechanical system. The electronic system, however, is more sensitive and will replace the mechanical system in actual practice. The disclosed system includes a manually controlled valve 700 having a hand wheel 701 mounted on a shaft 702. Shaft 702 has a plurality of bevel gears 703–706 which slide in and out pistons 707–710 for closing or opening cylinders 711–714 to a hydraulic fluid under pressure, such as oil, which is supplied to valve 700 through a duct 715 connected to an oil pump 716 driven by turbine $Tu_1$ through gears 717. Cylinders 711–714 are connected to the respective ducts 720–723. Duct 720 is connected to a cylinder of a needle valve 724 which regulates the amount of fuel reaching heater $H_1$. Valve 724 has a sliding piston 725 within the cylinder. Piston 725 is provided with a seat 726 for the needle 727 which is actuated by an actuator 728 and a temperature-sensitive element 729 mounted in the input duct of turbine $Tu_1$. Piston 725 is provided with a central duct 730 which admits fuel into heater $H_1$. Piston 725 slides up and down on a boss 731 and is held in its upward position by a compression spring 732 against the downward pressure exerted on the flanges of piston 725 by oil introduced into the cylinder by duct 720. Valve 724 controls the temperature $T_5$ of steam entering turbine $Tu_1$ in the manner indicated in Figs. 1–5. This temperature remains constant until $T_{11}''=T_6$ (see Fig. 3), and it is then decreased with the decrease in load, as shown in Figs. 4 and 5. Such control of $T_5$ is obtained as follows: at full load, piston 707 is in a wide open position, as indicated in Fig. 7, and full oil pressure reaches cylinder 733 which depresses piston 725 and puts valve 724 into a wide open position. In order to keep $T_5$ constant at full load, the second control is provided, which includes the temperature-sensitive element 729. Element 729 regulates the position of needle 727 with respect to seat 726. If $T_5$ becomes higher than the desired maximum value, lever arm 735 is rotated counterclockwise around a pivot 736, which shifts piston 737 to the left, as viewed in Fig. 7, which opens a port 738 in a piston 739. This admits oil under pressure from a duct 740, which is connected to duct 715 through valve 700, to an annular space 741, orifices 742, the inner chamber 743 within piston 739, port 738, and a cylinder 744. The oil entering cylinder 744 presses on the piston flanges 745 and shifts piston 739 to the left which partially closes needle valve 724, thus lowering $T_5$. Shifting of piston 739 to the left closes port 738, arresting any further temperature-correcting movement of actuator 728. It is necessary to have actuator 728 because the temperature-sensitive element 729 alone would not be able to maintain $T_5$ constant, as the weight flow $G_2$ varies over wide limits. Therefore, actuator 728 acts, so to speak, as a mechanical means for adjusting the length of the links, extending the range of operation of element 729 by producing a longer range of travel of needle 727 required as the external load varies from full load to the predetermined load illustrated in Fig. 3. It also may be compared to a mechanical memory device which responds to the repeated signals from actuator 729 of one sign; this sign may be either positive or negative. The above-mentioned predetermined load is the load at which $T_6=T_{11}''$, and heater $H_3$ becomes disconnected from the source of heat. When the load decreases still further, actuator 728 will place needle 727 into its extreme upper position and hold it there throughout the remaining portion of the decrease in load (Figs. 3, 4, and 5). However, during this range of part load operation, piston 707 will begin partially to close cylinder 711, thereby reducing the oil pressure in duct 720. The oil pressure will be reduced also in cylinder 733, and spring 732 will move piston 725 in the upward direction, thus partially closing valve 724. Accordingly, valve 724 will respond only to the manual control between the predetermined load and the no-load operating range, and the movement of piston 725 will override the effect of the opening of needle 727.

Since $T_7$ travels up and down with the variations in load (see Figs. 1 through 5), the control system for $T_7$ is similar to that for $T_5$ described above. Therefore, it also includes an actuator 750, a needle valve 751, a temperature-sensitive element 752, and ducts 721 and 753 which furnish oil under pressure from pump 716 for actuating valve 751 and actuator 750. At full load, $T_7$ has an intermediate value shown in Fig. 1; it then increases to $T_{7max}$ and then decreases to $T_7''''$ at no load. Therefore, valve 751 closes completely at no load, with points 6'''' and 7'''' lying on the same temperature line.

The temperature of steam entering the load turbine $Tu_3$ is reduced from $T_{11max}$ to $T_{11}''$, at which point (Fig. 3) $T_{11}''=T_6$. Therefore, no fuel reaches heater $H_3$, and a needle valve 755 is completely closed. The operation of valve 755 requires only a manual control, and this is accomplished by wheel 701 and piston 710 connected to the wheel by the bevel gears 706.

As indicated in Fig. 5, no steam reaches load turbine $Tu_3$ at no load. This is accomplished by means of a shut-off valve 759 which becomes closed when wheel 701 is turned to the no-load position and piston 709 shuts off cylinder 713 and duct 722 from pump 716. The oil under pressure, which becomes trapped in duct 722, drains off back to an oil tank 756 through ducts 757 and 758. Duct 758 is connected to four drain ducts 760–763. The rate of return, or drain flow, is made adjustable by means of four needle valves 765–768, which are connected in series with the respective ducts.

Turbines $Tu_1$ and $Tu_2$ are also provided with shut-off valves 770 and 771, which become partially closed if these turbines exceed maximum safe speed when there is a sudden reduction in external load 769. These valves are only safety devices, operated by the speed governors 780 and 781, which regulate the amount of oil under pressure reaching these valves from tank 756 and pump 716 through valves 783 and 784. These valves will be described more in detail in connection with Fig. 20, where the corresponding valve is numbered as valve 2003.

The variable speed control system, therefore, is a manually-operated system which produces the parameter changes indicated in Figs. 1–5.

*Mollier heat charts for the first version of the variable speed power plant.*—Only a brief description of the charts per se is necessary because of the prior reference to these charts in the course of the description of Figs. 6 and 7. The variable speed-variable power operation is obtained by means of the inverse temperature and inverse flow control between the full load and some predetermined part load at which $T_{11}''$ is equal to $T_6$. This condition is illustrated in Fig. 3. As the load decreases still further, all temperatures $T_5$, $T_{11}$ and $T_7$ decrease in the manner indicated in Figs. 4 and 5, Fig. 5 corresponding to no-load condition. Referring once more to Fig. 1, it illustrates the cycle at full load. $T_{11_{max}}$ is maximum at this load and $T_7$ has some intermediate value which is determined by the magnitude of the heat drop $$\Delta H_{T_{u_2}}$$

required for operating compressor $C_1$.

$$\Delta H_{T_{u_2}}$$

is greater than $\Delta H_{C_1}$ and the weight flow $G_4$ through turbine $T_{u_2}$ is such as to furnish enough power for operating compressor $C_1$ at its rated capacity and speed so as to produce pressure $P_2$ on the output side of this compressor. If it is assumed that the compressors $C_1$ and $C_2$ have the same power requirements, $\Delta H_{C_2}$ will be smaller than $\Delta H_{C_1}$ because of the greater weight flow $G_2$ through compressor $C_2$. Temperature $T_5$ is made lower than temperature $T_7$ because the weight flow $G_2$ is larger than the weight flow $G_4$. This is so because the weight flow $G_2$ is divided three ways; one part, $G_6$, is used in the regenerative circuit $F_1$—$M_1$; the second part $G_4$ is used in turbine $T_{u_2}$, and the third part is used in turbine $T_{u_3}$. The values of $G_4$ and $G_5$ follow the previously mentioned relationship:

$$\frac{G_4}{G_5} \sim \sqrt{\frac{T_{11}}{T_7}} \quad (5)$$

As the external load is made to decrease, $T_7$ is made to increase and $T_{11}$ is made to decrease, until $T_7$ reaches its maximum value $T_{7_{max}}$. This condition is illustrated in Fig. 3. As the external power is made to decrease from full load, $T_{11}$ continuously decreases from its maximum value $T_{11_{max}}$ to the lower temperatures indicated by $T_{11}'$, $T_{11}''$, $T_{11}'''$ in Figs. 2, 3 and 4. At the same time, $T_7$, after reaching its maximum value $T_{7_{max}}$ in Fig. 3, also decreases with the further decrease in load as indicated in Fig. 4, by $T_7'''$. The dotted lines in Fig. 2 indicate that load condition at which $T_7$ and $T_{11}$ are equal to each other, and the dotted lines in Fig. 4 indicate the outline of the cycle when the external load is smaller than the full load and greater than that load which is illustrated in Fig. 2. The locus traveled by $T_7$ is illustrated by a dotted line 400 in Fig. 4. Similar loci are also indicated for $T_5$ and $T_6$ in Fig. 4 by lines 401 and 402. Fig. 5 corresponds to a no-load condition, or idling. All parameters have their minimum values and only heater $H_1$ receives some fuel. Heaters $H_2$ and $H_3$ receive no fuel and, therefore, $T_6''''$ and $T_7''''$ have the same value. Turbine $T_{u_3}$ does not appear on the Mollier chart of Fig. 5 because valve 759 is closed and the load turbine $T_{u_3}$ is standing still.

Examination of Figs. 1–4 discloses that the pressures $p_2$ and $p_4$ remain constant in Figs. 1, 2 and 3. Pressure $p_2$ remains constant because although $$\Delta H_{T_{u_2}}$$

increases with the increase of $T_7$ and reaches its maximum value at $$\Delta H_{T_{u_2}}''$$

in Fig. 3 when $T_7$ reaches its maximum value $T_{7_{max}}$, the weight flow $G_4$ reaches its minimum value in Fig. 3. Therefore, as long as the total momentum and power delivered by turbine $T_{u_2}$ remains constant, $p_2$ will also remain constant. Since the power, $$\Delta N_{T_{u_2}}$$

is equal to $$G_4 \cdot \Delta H_{T_{u_2}}$$

$p_2$ will remain constant as long as the above product remains constant, which is the case in Figs. 1, 2 and 3. The pressure on the output side of compressor $C_2$ is $p_4$ and it remains constant because $p_2$ is constant, $T_5$ is constant, $$\Delta H_{T_{u_1}}$$

is constant and $G_2$ is constant. Both of the above pressures decrease with the further decrease in load because of the decrease in $T_5$, $T_6$, $T_7$ and $$\Delta H_{T_{u_1}} \text{ and } \Delta H_{T_{u_2}}$$

All of the above variations in the parameters are obtained by means of the control system illustrated in Fig. 7 in the manner described previously in connection with the description of Fig. 7.

*The second version of the variable speed cycle*

The first version of the variable speed cycle can be improved by making $T_5$ and $T_{11}$ equal to each other and also equal to the maximum temperature of the cycle when the external load is greater than or equal to the full load. At the same time, $T_6$ is made equal to $T_7$, as illustrated in Fig. 8, and therefore, heater $H_2$, Fig. 11, does not receive fuel and valve 1100 is completely closed. Higher thermal efficiency is obtainable with this cycle because of the higher temperature $T_5$. Because of the higher $T_5$, it now is necessary to adjust the value of $$\Delta H_{T_{u_1}}$$

so that it is equal to the power required for driving compressor $C_2$ and the accessories of the power plant. This $\Delta H_{T_{u_1}}$ is indicated in Fig. 8. It is also indicated there that point 6 of the cycle is no longer on the pressure line $p_2$ but is on a high pressure line $p_6$ because of the increase in $T_5$ as compared to the magnitude of $T_5$ in Fig. 1. The weight flow $G_6$ in this cycle will be smaller than in Fig. 1 because point 13 in Fig. 8 is at a higher temperature than the corresponding point in Fig. 1. Since $T_5$ is also greater, the specific output will likewise be greater in Fig. 8. $\Delta H_{T_{u_3}}$ will also be considerably greater in Fig. 8 than in Fig. 1, and, therefore, the load turbine $T_{u_3}$ will be larger in size than the same turbine in Fig. 1. The compressor turbine $T_{u_2}$ will also be considerably larger, and there will be some increase in the size of $T_{u_1}$ even if $G_1$ remains constant in both cases.

Before proceeding with a further description of this cycle, it should be stated here that Fig. 11 needs no detailed description since it is identical to Fig. 7, with one exception: duct 1105, which corresponds to duct 603 in Fig. 6 in function, now is connected on the input side to an appropriate stage in turbine $T_{u_2}$ which has a pressure equal to $p_2 + \Delta p$. A reference to Fig. 6 indicates that duct 603 is connected to the exhaust side of the first turbine $T_{u_1}$ rather than to the second turbine $T_{u_2}$, which is the case in Fig. 11. The reason for this change is found in Fig. 8, where it is indicated that $p_2 + \Delta p$ now occurs in $T_{u_2}$ and not on the exhaust side of $T_{u_1}$ which is now at a higher pressure $p_6$.

The changes that take place in the cycle with the decrease in load from the overload condition to the full load, part load, and no load conditions are illustrated in Figs. 9 and 10. As the load decreases from that shown in Fig. 8, valve 1100 is opened and heater $H_2$ receives fuel to the extent required to raise the temperature of steam reaching turbine $T_{u_2}$ to some temperature which is between points 6 and 7'' in Fig. 9, while $p_2$ and $p_4$ remain constant. Turbine $T_{u_2}$, which is a single turbine with a steam bleeding outlet, is designated in Fig. 11 as $T_{u_2}$ and $T_{u_4}$ for designating in the corresponding manner the heat changes in Figs. 8 through 10. $\Delta H_{C_2}$, $\Delta H_{C_1}$ and $\Delta H_{T_{u_1}}$ remain constant until the load decreases to the load illustrated in Fig. 9, and therefore, $p_2$ and $p_4$ remain constant. $\Delta H_{Tu_2}$ increases as the load decreases from that shown in Fig. 8 to that shown in Fig. 9. Although $\Delta H_{Tu_2}$ increases because of the increase in $T_7$ from that shown in Fig. 8 ($T_7=T_6$ because valve 1100 is closed) to the maximum value shown in Fig. 9, the weight flows $G_4$, $G_6$ and $G_5$ all decrease. Therefore, turbine $Tu_2$–$Tu_4$ runs at constant speed during this range in load variations. There is a decrease in the weight flows $G_4$, $G_6$, and $G_5$ because $T_7$ increases while $T_{11}$ decreases. The weight flows, or the division of the steam flow $G_2$ into $G_3$ and $G_4$, will follow the following relationship:

$$\frac{G_3}{G_4} \sim \sqrt{\frac{T_7}{T_{11}}} \tag{6}$$

Fig. 9 also indicates, in dotted lines, that condition at which $T_7'=T_{11}'$. This condition may correspond to the full load operation, although the power plant, obviously, can also be operated in the manner indicated in Fig. 8, which may correspond to the full load operation as well. When $T_{11}''=T_6$, valve 1101 becomes fully closed, and no fuel reaches heater $H_3$. Accordingly, heater $H_3$ at this point may be shunted altogether in the manner indicated by the shunting duct 616, which corresponds to the similarly numbered duct in Fig. 6. When the external load decreases still further, it becomes necessary to reduce $T_5$ and $T_7$ at the same time, and such decrease of $T_5$ decreases $T_6$ and $T_{11}$. $T_{11}$ decreases with the decrease in $T_5$ and $T_6$ because heater $H_3$ now does not receive any fuel, and therefore, $T_{6'''}=T_{11'''}$. Since $T_5$ and $T_7$ decrease, $p_2$ and $p_4$ also decrease in the manner indicated in Fig. 10. The paths followed by the points 2, 3, 4, 5, 6, 7, and 13 with the decrease in load are indicated by the dotted lines in Fig. 10, point 2 being connected by the dotted line to point 2''', point 5 to point 5''', etc.

Fig. 10 does not indicate the idling condition since the points 1–2'''–3'''–4'''–5'''–6'''–7'''–8'''–1 indicate that that condition of the cycle when the power plant still delivers a considerable amount of power indicated on the chart by the magnitude of $\Delta H_{Tu_3}'''$. At no load, this heat drop must be equal to zero, and this is accomplished by closing valves 615 and 1101. Valve 1100 also becomes closed and valve 612 is placed in the position so as to make the entire weight flow $G_2$ discharge into turbine $Tu_2$–$Tu_4$ through duct 613. Valve 1102, at no load, is open only to the extent required by the internal load at idling conditions, and the entire Mollier chart at idling condition then becomes the same as that shown in Fig. 5, except that the bleeding of steam into the regenerative circuit will correspond to that indicated in Figs. 8–10.

This second version of the variable speed cycle is more advantageous in several respects than the first version of the variable speed cycle described previously in connection with Figs. 1–7. The second version will have higher thermal efficiency, higher specific output, wider load range, and lower specific weight.

The control system for the second version of the variable speed power plant is identical to that shown in Fig. 7, and, therefore, needs no additional description or illustration. The control system needs no additional elements for controlling the inverse variations in $G_3$ and $G_4$ because these variations take place automatically with the variation or control of $T_7$ and $T_{11}$ in accordance with Equation (6).

From the above description of the two versions of the variable speed cycles, it is obvious that the second cycle is so much more advantageous than the first that the only justification for indicating the first cycle in this description resides in the fact that it is a simpler cycle, thus constituting a good introduction to its more refined version shown in Figs. 8–11.

*Types of steam compression possible with the steam cycle*

Figs. 12 through 15 disclose the types of compression which can be used advantageously with the disclosed steam cycles. In Fig. 12, the compression is obtained along a constant enthalpy line 1200 which joins two constant enthalpy points 1 and 2. The quality of steam decreases as the compression proceeds from point 1 to point 2, and therefore, it is minimum at point 2. The quality of steam at point 2 should never be lower than the minimum quality compatible with the safe operation of the compressor, which means that the percentage of water should be sufficiently low so as to avoid the erosion of the compressor blades. As was mentioned previously, this quality should be in the order of .65 for centrifugal and centripetal compressors, and in the order of .75 or .85 for axial compressors. The quality at point 1 depends on the compression ratio, and its maximum value may be as high as 1.0. The total heat change Q for the compression illustrated in Fig. 8 is given by the equation:

$$Q = \sum \frac{S_1 - S_2}{2}(T_2 - T_1) \tag{7}$$

This heat change should be minimum for reducing the amount of work necessary for obtaining some predetermined compression ratio. From this equation, it follows that line 1200 should have as low an enthalpy reading as possible, and therefore, its position is determined primarily by the position of point 2. The type of compression illustrated in Fig. 12 will require a minimum amount of work because the enthalpy change is equal to zero. However, this type of compression is difficult (but not impossible) to obtain in practice since it will require the injection of water into each stage of the compressor. Such injection of water is difficult to materialize from a mechanical point of view.

The same is also true of Fig. 13 where the compression is obtained along a constant quality line 1300. This type of compression will require more work than that illustrated in Fig. 12 because of the increase in enthalpy from point 1 to point 2. It also will require the injection of water within each compression stage and, therefore, is as difficult to obtain from a purely mechanical point of view as that illustrated in Fig. 12.

The type of compression illustrated in Fig. 14 will require a maximum amount of work because of large enthalpy changes. This is the type of compression illustrated in all the remaining figures. The compression from point 1 to point 2 is obtained in the first compressor $C_1$. The quality of the compressed steam is then brought back to line 1400 by injection of water into steam in the manner described previously, and it is recompressed again from point 3 to point 4 in the second compressor $C_2$. As stated previously, the quality line 1000 may have a minimum value in the order of .65–.75. When low horse power plants are considered, the difference in the amount of work that will be required for obtaining the same compression ratio in Fig. 14 as that in Figs. 12 and 13 is not so marked as to justify the mechanical complexities required by the type of compression illustrated in Figs. 12 and 13.

Fig. 15 is no more than a repetition of the type of compression illustrated in Fig. 14, except that while the total compression in Fig. 14 is obtained in two compressors, it is obtained, in Fig. 15, in three compressors, indicated by the compression steps 1–2, 3–4, and 5–6. The amount of work required in this case is less than that required in Fig. 14, but it requires the use of a larger number of compressors and, therefore, is less advantageous from a mechanical point of view than that illustrated in Fig. 14. Accordingly, the multi-step compression of the type illustrated in Fig. 15 is justified only when large compression ratios are contemplated in large power plants.

It may be stated, in general, that the efficiency of dynamic compression with the increase of pressure imposes a practical limit on the maximum pressure feasible with the disclosed cycles. Such compression becomes inefficient at the pressures which are above 1500 p.s.i. However, this limit for efficient compression does not mean that there is corresponding limit on the maximum rating of power plants; there is no limit to the rating.

*Types of expansion possible with the disclosed cycle*

Figs. 16 through 18 illustrate the types of expansion that are feasible with the disclosed cycles. In Fig. 16, the expansion is performed in two steps, the first step being from point 5 to point 6 and the second expansion being from point 6 to point 8. There is no reheat used in this cycle, and therefore, point 6 and point 7 are located on the same pressure and temperature line. Because of large increase in volume of steam as it expands from point 5 to point 8, it is more convenient, from the point of view of the turbine construction, to perform the expansion in two separate turbines rather than in a single turbine. For this reason, all the disclosed power plants utilize at least two turbines and two steps of expansion. When the compression ratio is low and the maximum temperature $T_5$ is also low, the heat drop from point 5 to point 8 will be small, and the expansion can be carried out in a single turbine directly from point 5 to point 8. This will be the case only in small power plants which will have a much lower efficiency than the power plants where the enthalpy change is large.

Fig. 17 illustrates the expansion in two steps and in two turbines with a reheat between the two turbines, which has already been discussed in connection with Figs. 1 through 7 and 8 through 11. This type of expansion increases the specific output of the power plant, and it also increases its thermal efficiency by approaching more closely the ideal expansion at constant maximum temperature.

Fig. 18 illustrates a multi-step expansion with multiple reheating and, therefore, is merely a multiplication of the type of expansion illustrated in Fig. 17. The number of turbines required corresponds to the number of reheating cycles. The position of point 5 on the Mollier chart determines the number of the reheating cycles that is possible in a given case. The higher the maximum temperature and the higher the compression ratio, which determines the magnitude of $p_4$, the larger the number of the possible reheats. The maximum temperature has a very marked effect on the thermal efficiency on the cycle. The number of reheats also improves the thermal efficiency since the expansion approaches the expansion at constant maximum temperature, which is the type of expansion required by the ideal Carnot cycle.

*Constant speed steam cycle in which all parameters vary Except $\Delta H_{Tu_2}$*

Figs. 19 through 23 illustrate the application of the same steam cycle to the constant speed power plant. In this constant speed version of the cycle, the first compressor $C_1$ is driven by the first turbine $T_{u_1}$, and the second compressor $C_2$ is driven by the second turbine $T_{u_2}$. The meaning of the terms "first" and "second," as they apply to the disclosed cycles, is that they designate the first step of compression or expansion and the second step of compression or expansion, respectively, indicated on the Mollier charts. Therefore, the direction of flow of the working fluid is followed, i.e. the flow of steam.

The description of this power plant will follow the same pattern as that used in connection with description of the variable speed power plant. Its simplified schematic diagram, illustrated in Fig. 19, will be described first; this will be followed with the description of the control system illustrated in Fig. 20, and its operation will be described in connection with the Mollier heat chart illustrated in Figs. 21 and 23. In view of the above type of description, only a very brief description of Fig. 19 is necessary.

*Schematic diagram for the first version of the constant speed power plant.*—Referring to Fig. 19, compressor $C_1$ receives steam of fixed quality through a duct 1935 from exchanger 1929, and it discharges the compressed steam of higher quality into the quality control regulator 1900 through a duct 1901. Regulator 1900 also receives a portion of the exhaust steam from turbine $T_{u_1}$ through duct 1902. Regulator 1900 also receives heated water through duct 1903 from the hot well 1904 which is connected to a pump 1905, a duct 1906, and a heat exchanger 1907 having a coil 1908. The regulator 1900 is connected to a mixing heat exchanger 1911 through ducts 1909 and 1910. The mixing heat exchanger 1911 is provided with a plurality of nozzles 1912 connected to the regulator 1900 over a duct 1913. The exchanger 1911 discharges steam of fixed quality, $X_2$, into compressor $C_2$ through a duct 1914, and compressor $C_2$ discharges into a heater 1915 through a duct 1916. The steam qualities $X_1$ and $X_2$ are the same at the entry into both compressors, as indicated in Fig. 10. Compressor $C_2$ is driven by the second turbine $T_{u_2}$ through a shaft 1917. Duct 1918 conveys the superheated steam to the first turbine $T_{u_1}$ which drives compressor $C_1$ through a shaft 1919. An interceptor valve 1950 is connected in series with duct 1918. The expanded steam leaves the first turbine $T_{u_1}$ through ducts 1902 and 1920. By far the larger portion of the steam flows into a heater 1921 and then over a duct 1922 to the second turbine $T_{u_2}$. An interceptor valve 1923 is inserted in duct 1922. The second turbine $T_{u_2}$ also drives an external load, such as a generator 1924. Steam leaves the second turbine over duct 1925 and then enters the heat exchanger 1907, which it leaves over a duct 1926. It then enters the second steam quality regulator 1927, whereupon it enters duct 1928, a mixing heat exchanger 1929, and a duct 1930. The regulator 1927 is supplied with water from hot well 1904 by pump 1905 through ducts 1906 and 1931, this water being sprayed into the exchanger 1929 by means of nozzles 1932. Part of the steam of fixed quality, $X_1$, enters a condenser 1933 through a duct 1934, and the greater part of it enters a duct 1935 which is connected to the input side of compressor $C_1$. The condenser coil 1936 is connected to a source 1937 of low temperature fluid. Condenser 1933 is connected to the hot well 1904 through a duct 1938. The hot well is connected to a water tank 1939 through a duct 1940 and a regulator valve 1941 which keeps constant the water level 1942 in the hot well 1904. Hot well 1904 is provided with a heat coil 1943, which is used during the starting periods of the power plant. For this purpose, a duct 1944 is also provided, which connects the upper part of the hot well 1904 to duct 1935 anad compressor $C_1$.

Figure 22:
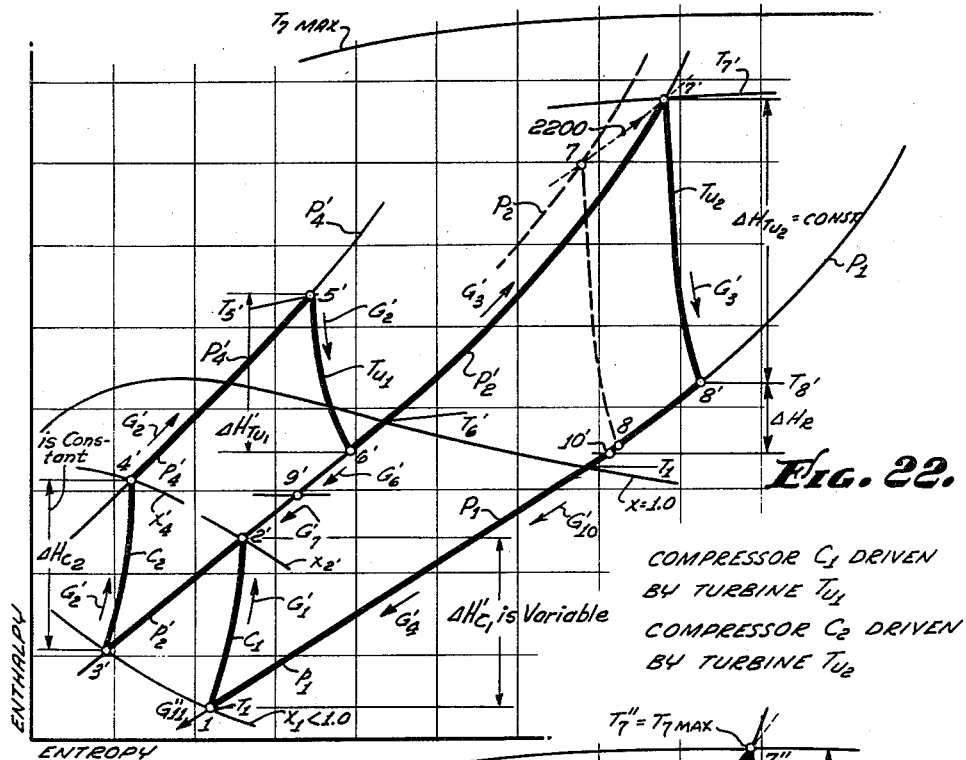
Figure 23:
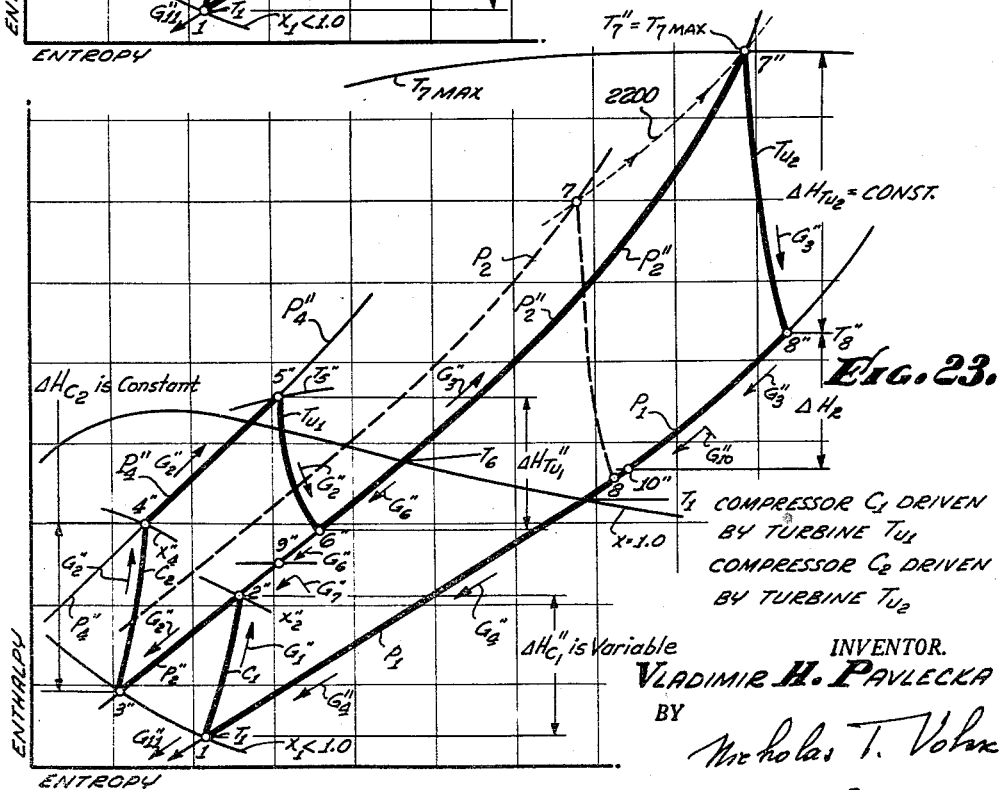

*Mollier heat charts for the first version of the constant speed power plant.*—The Mollier heat charts for the constant speed power plant of the type shown in Figs. 19 and 20 are illustrated in Figs. 21 through 23. The full load chart is illustrated in Fig. 21, and the remaining charts are for the progressively decreasing loads. There are only two turbines $Tu_1$ and $Tu_2$ in Figs. 19–23, and they are connected in series, heater $H_2$ being positioned between the two turbines for reheating the steam. The only possible way of maintaining the constant speed of turbine $Tu_2$ is by maintaining $\Delta H_{Tu_2}$ constant. (This is explained more in detail in connection with the description of Figs. 31–33.) With the power plant disclosed in Figs. 19 and 20, this can be accomplished only by increasing $T_7$ with the decreasing load to the extent necessary to keep $\Delta H_{Tu_2}$ constant and, at the same time, decreasing $G_3$, i.e. the weight flow through the load turbine. When $T_7$ is increased, $T_5$ must be decreased to decrease the weight flow and the power delivered by the load turbine. When the temperature of gases reaching turbine $Tu_1$ is decreased, $\Delta_{Tu_1}$ is also decreased; $p_2$ is also decreased because of the decrease in the speed of $Tu_1$, and therefore, the weight flow in the entire cycle is also decreased. The second compressor $C_2$ is driven by turbine $Tu_2$, and therefore, its compression ratio will remain constant because it is operated at constant speed.

Accordingly, the enthalpy rise $\Delta H_{C_2}$ remains constant throughout the operation of the power plant. However, this does not produce constant $p_4$ and $G_2$, since the position of point 3 changes constantly with any change in load, it being on the lower pressure lines with a decrease in load. Therefore, $p_4$ will also vary as a direct function of the variation in $p_2$. The path followed by point 7 from full load to the minimum load is indicated by the dotted line 2200 in Figs. 22 and 23. This line must be approximately parallel to the constant minimum pressure line $p_1$ which indicates the pressure in the condenser. This pressure for all practical purposes remains constant. With line 2200 being parallel to line $p_1$, the heat drop $\Delta H_{Tu_2}$ through turbine $Tu_2$, which is indicated by line 7–8, will remain constant.

Fig. 23 indicates that $T_7''$ is maximum, and $T_5''$ is minimum at minimum load. Such rise in $T_7$ is offset by the decrease in $T_5$ insofar as the thermal efficiency is concerned, which is maximum when $T_5$ and $T_7$ are approximately equal to each other.

If, at full load, Fig. 21, the temperature of steam entering the compressor turbine $Tu_1$ (i.e., $T_5$) were made equal to $T_7$, the thermal efficiency of the power plant, obviously, would have been higher and the specific output of the power plant also higher than the same quantities for the power plant disclosed in Figs. 19–23. However, as long as turbine $Tu_1$ drives nothing but compressor $C_1$, $\Delta H_{C_1}$ and $\Delta H_{Tu_1}$ must be substantially equal. Therefore, in this version of the constant speed cycle $T_5$ must be lower than $T_7$ because if it were made equal to $T_7$, $\Delta H_{Tu_1}$ would become too large and compressor $C_1$ would operate at an excessive speed. Higher efficiency is obtained in the next version, or second version, of the constant speed cycle, and a still higher efficiency is obtained with the power plant shown in Figs. 29–32, where the circuit is arranged so that it does become possible to make $T_5$ equal to $T_7$ at full load, and both of these temperatures are made equal to the maximum temperature obtainable with the cycle.

*Control system for the first version of the constant speed power plant, Fig. 20.*—The control system for this power plant is illustrated in Figs. 20 and 20–A. Fig. 20–A illustrates valves 2003 and 2004 of Fig. 20 on an enlarged scale. Only the control elements need a description, because the remaining power plant is identical to that illustrated in Fig. 19 and, for this reason, is numbered in Fig. 20 by the same numerals used in Fig. 19. The additional control elements include an oil tank 2000, an oil pump 2001, a speed governor 2002 driven by turbine $Tu_2$, a control valve 2003, an actuator 2004, fuel valves 2005 and 2006, and interceptor valves 2007 and 2008. The interceptor valves are connected to ducts 2009, 2010, and 2011 and, through the control valve 2003, to ducts 2012 and 2013. Duct 2013 is a drain duct, while duct 2012 is a positive pressure duct connected to pump 2001. Turbine $Tu_2$ also includes a maximum temperature control element 2015, which has a temperature-sensitive element 2016 mounted in the input duct of turbine $Tu_2$.

The operation of the control system is as follows: at full load, valve 2005 is wide open and valve 2006 is completely closed, as indicated in Fig. 20. When the external load is reduced, there is a tendency for the load turbine $Tu_2$ momentarily to increase its speed, which rotates lever 2018 around pivot 2031 in a clockwise direction and lever arm 2019 to the left by means of a crank arm 2020 which is rotated at this time around pivot 2028 in a counterclockwise direction. This shifts the actuator valve pistons 2021 and 2022 to the left, as viewed in Fig. 20, with the result that valve 2005 becomes partly closed to the extent determined by the movement of cam 2023, which, in turn, is moved by the actuator 2004 through the link arms 2024, 2025, and 2026 which are pivoted around fixed pivots 2027 and 2028. The function that is performed by the actuator 2004 is to proportion the opening and closing of the valves 2005 and 2006 to the extent required by the external load 1924 connected to the load turbine $Tu_2$. The position of governor 2002 remains the same at constant speed, which means that the position of the pivot 2060 also remains fixed. Yet the control valves 2005 and 2006 must be positioned by this very governor into proper positions, depending upon the external load conditions, and this is accomplished by actuator 2004 which may be called a proportioning actuator. This proportioning is obtained by advancing piston-cylinder member 2002 either to the left or to the right, depending on the position of member 2022 with respect to ports 2033 and 2034 in piston-cylinder member 2022. A working fluid under positive pressure is introduced into an actuator chamber 2035 through a port 2036 which is connected to pump 2001 through ducts 2014 and 2011. The cylinder 2037, which accommodates the piston-cylinder member 2022, is connected to a drain duct 2038 through a duct 2044 when piston 2032 is advanced to the left while piston-cylinder member 2022 remains stationary; port 2039 then becomes connected to the positive pressure port 2034; port 2034 receives fluid under pressure through actuator chamber 2035, which is connected to the high pressure duct 2011 through duct 2014. Fluid under positive pressure is introduced into chamber 2042 through ducts 2011, 2014, port 2036, actuator chamber 2035, port 2034 and port 2039, which is now open, with the result that the piston-cylinder member 2022 moves to the left. At the same time, chamber 2043 becomes connected to the drain duct 2038 through port 2040 and a branch duct 2044 which permits piston-cylinder member 2022 to move to the left. Since piston 2032 remains in a fixed position at this time, such movement of piston-cylinder member 2022 comes to an end. However, lever arm 2025 now has been rotated around a fixed pivot 2027 in a counterclockwise direction in proportion to the time and the extent of governor 2002 remaining in the overspeed condition. Accordingly, the actuator valve 2004 may be regarded as a memory device which rotates the lever arm 2025 in the counter-clockwise direction every time the governor finds itself in the overspeed condition, and it does not rotate the lever arm 2025 in a clockwise direction after the overspeed condition ceases. Actuator 2004 will rotate lever arm 2025 in a clockwise direction, however, every time governor 2002 finds itself in the underspeed condition. The net result of the operation of the actuator 2004 is that it not only will control the momentary positioning of the fuel valves 2005 and 2006, but it also will control their, so-to-speak, long-range settings which must correspond to the heat drop positions of the power plant on the charts in Figs. 21 through 23 on the line 2200, which is the line between points 7, 7' and 7''. For the conditions corresponding to those in Fig. 21, valve 2006 will be either fully or partly open ($G_3$ is maximum, but $T_7$ is minimum) because of the above type of functioning of the actuator 2004, while at point 7'', Fig. 23, valve 2006 will be again either fully open or only partly closed because of the decrease in the weight flow $G_3''$ but increase in $T_7$.

The only remaining portion of the control system that needs description is that which includes interceptor valves 2007, 2008, and the governor actuator control valve 2003. These valves become partially closed if there is a very sudden reduction in load. It becomes necessary to have these interceptor valves in the disclosed system because heaters $H_1$ and $H_2$ have calorific interia and will, therefore, supply heat even when valves 2005 and 2006 close sufficiently so as to reduce the amount of fuel reaching heaters $H_1$ and $H_2$ in response to the sudden reduction in load. Accordingly, if the interceptor valves 2004 and 2008 were not present, the two turbines would be receiving steam at a higher temperature than that required by the reduced load conditions.

Under such conditions, governor 2002 and its pivot 2028 advance to the right, as viewed in Fig. 20, until piston 2047 strikes piston 2048 with the result that piston 2049 is shifted to the right against the pressure of spring 2050 which connects the positive pressure duct 2012 to duct 2011, and oil under positive pressure is introduced into the cylinders 2052 and 2053 of interceptor valves, thus partially closing them to the extent determined by the differential action of the positive pressure of the fluid and the opposing pressure of the springs 2054 and 2055. At the very same time, the drain duct 2013 becomes disconnected from duct 2011 as long as piston 2047 engages piston 2048. When these two pistons become disengaged, because of the return of governor 2002 to its normal position, valves 2007 and 2008 return to their normal open positions. Accordingly, these valves and the mechanism which actuates them may be considered as no more than an overspeed safety device which comes into play only when there is a sudden reduction in the external load.

It should be mentioned here that while the entire control system has been illustrated as being a purely mechanic system which is controlled by a speed governor 2002, there will be many applications, or uses, of the disclosed power plants where such control systems will be found impractical because of the remote location of different elements of the power plant, such as turbines $Tu_1$ and $Tu_2$. In such cases, it will be impractical to operate the valves 2005 and 2006 by means of the lever arms, such as lever arm 2024. When this is the case, the mechanical system can be replaced with the electronic control system which can function very effectively, irrespective of the physical location of the elements of the power plant. Since such systems are known in the art and do not constitute a part of this invention, they need no description.

An additional element which should be mentioned is the temperature-sensitive element 2016 positioned in the input duct of turbine $Tu_2$ which actuates bellows 2015 and link arm 2057, which close valves 2006 and 2005 when the temperature of steam reaching turbine $Tu_2$ exceeds a predetermined safe maximum limit. This maximum temperature safety device now comes into play only in case of the malfunctioning of the remaining control system, and it does not have any effect on the control system otherwise.

*The second version of the constant speed power plant*

*Schematic diagram, Fig. 24.*—In this version of the constant speed power plant, the first compressor $C_1$ is driven by the second turbine $Tu_2$ and the second compressor $C_2$ is driven by the first turbine $Tu_1$. Accordingly, the positions of the two turbines are reversed in this case as compared to their positions in the first version of the constant speed power plant illustrated in Fig. 19. Since the elements used in all the power plants are identical, it will suffice to describe this version of the power plant only briefly in view of the prior description of the variable speed and constant speed power plants illustrated in the prior figures. Steam enters compressor $C_1$ which is driven by turbine $Tu_2$, and after being compressed and returned to the same quality by the quality regulator $F_1$ and the mixing heat exchanger $M_1$, it enters duct 2400, compressor $C_2$, heater $H_1$, turbine $Tu_1$, heater $H_2$, and quality regulator $F_1$ through ducts 2401, 2402, and 2403, respectively. That portion of the steam (weight flow $G_3$) which enters heater $H_2$, follows the following series circuit: turbine $Tu_2$, a duct 2404, a quality regulator $F_2$, a mixing heat exchanger $M_2$, and ducts 2407, 2408, and 2409. Ducts 2408 and 2409 are connected in parallel with respect to duct 2407. Duct 2408 discharges into a condenser 2410 while duct 2409 is connected to compressor $C_1$. The mixing heat exchangers $M_1$ and $M_2$, as well as the quality regulators $F_1$ and $F_2$, are provided with auxiliary ducting which is identical to that illustrated in the prior figures; therefore, these connections need no additional description.

*Mollier charts for the second version of the constant speed power plant, Figs. 26, 27, and 28.*—The Mollier charts for the power plant illustrated in Figs. 24 and 25 are shown in Figs. 26, 27, and 28. Fig. 26 corresponds to the full load condition, Fig. 27 illustrates a part load condition, and Fig. 28 illustrates the minimum load condition. $T_7$ remains constant at all loads, which means that $\Delta H_{Tu_2}$ also remains constant; therefore, $p_2$ remains constant. It also means that the area of the cycle 1–2–7–8–1 remains constant. The regulation of the power output and of the load turbine $Tu_2$, therefore, is obtained in this case solely by regulating the amount of weight flow $G_3$ through the load turbine $Tu_2$, $G_3$ being decreased with the decrease in load. This is obtained by also decreasing $G_2$ and $T_5$ with the decrease in load. At no load, $G_3''=G_2''$ because valve 2415, Fig. 24, is closed and $G_8$ is equal to zero. Therefore, $G_3''$ is not indicated in Fig. 28, but instead it is indicated as $G_2'''$. The compression ratio obtained in compressor $C_1$ remains constant throughout the operating range of the power plant, and therefore, the weight flow $G_1$ through compressor $C_1$ also remains constant. It is possible to vary $G_3$ under the above conditions by decreasing $G_2$, $G_6$, and $G_7$ together with the adjustment of admission valving at the entry to the turbine $Tu_2$. The valving adjustment is necessary because the thermodynamic state at point 7 does not change with the change in the external load, there is only a change in the weight flow $G_3$, and, therefore, the flow area at the entry into the turbine $Tu_2$ has to be changed. This is done by means of valves at the entry into turbine $Tu_2$, which are a usual part of turbine $Tu_2$. The above adjustment of the input valve, known as the partial admission valves in the turbine art, may be compared to the adjustment or matching of the input impedance with the output impedance for obtaining optimum transmission of power in electrical circuits. Since such partial admission valves are a standard equipment on the turbines operating in accordance with the Clausius-Rankine cycle and running at constant speed, this partial admission valve is not illustrated in any of the figures. The amount of water injected into the mixing heat exchanger $M_1$ through ducts 2412, 2413, and nozzles 2414 is represented by the weight flow $G_7$; the amount of steam injected into the mixing heat exchanger $F_1$ is represented by the weight flows $G_6$ and $G_1$. The weight flow $G_1$ remains constant; therefore, the weight flows $G_2$ and $G_3$ are either increased or decreased by simultaneously increasing or decreasing $G_6$ and $G_7$. At no load, $G_6$ is equal to zero, and $G_7$ is reduced considerably because only a very small weight flow of water $(G_7)$ is necessary for restoring the quality of steam at point 2, Fig. 28, to its original quality $X_1$.

This decrease in $G_3$ is also obtained by decreasing $T_5$ with the decrease in load, as illustrated in Figs. 27 and 28. Decrease in $T_5$ decreases $T_6$, and lower $T_6$ has a direct effect on $G_2$ and $G_3$ because of the decrease in the temperature of $G_6$. The decrease in $T_5$ and $G_2$ also produces corresponding decrease in $p_4$ and $\Delta H_{Tu_1}$; therefore, the regulation of the entire power plant is obtained by operating the compressor turbine $C_2$–$Tu_1$ set at the variable speed, variable density, variable temperature, variable weight flow, and variable pressure. At the same time, the compressor-turbine combination $C_1$–$Tu_2$ is operated at constant speed, constant pressure $p_2$, constant weight flow $G_1$ through the compressor with the decrease in load, variable weight flow $G_3$ through turbine $Tu_2$ and constant $\Delta H_{Tu_2}$. Stated more simply, $C_2$–$Tu_1$ operates with all parameters decreasing with the decrease in load, while $C_1$–$Tu_2$, at the same time, operates with all parameters remaining constant, except $G_3$, which decreases with the decrease in load.

*Control system, Fig. 25.*—The control system for such a power plant is illustrated in Fig. 25. Only a brief description of this system is necessary, since its elements are identical to the elements which were described more in detail in connection with the description of the prior control systems. The temperature-sensitive element 2500 in this case must maintain $T_7$ constant, and this is accomplished by connecting it through a lever arm 2501, a link 2502, a lever arm 2503, link arms 2504 and 2505, and lever arm 2506, to a bell crank 2507 which controls the closing and opening of a needle valve 2508. This valve regulates the amount of fuel reaching heater $H_2$. An actuator 2509 performs the same function as the actuator 2004 in Fig. 20. The temperature-sensitive element 2500, therefore, regulates the position of the needle valve 2508 so as to maintain constant the temperature of gases entering the load turbine $Tu_2$.

A speed governor 2512 is connected to a bell crank 2513, link 2514, a lever arm 2515, a link 2516, a bell crank 2517, a piston 2518 of actuator 2519, a link 2520 and a bell crank 2521 and a needle valve 2522. The second piston-cylinder member 2524 of the actuator 2519 is connected to a link 2525 connecting this piston to the bell crank 2517. The operation of this governor-controlled system is to reduce $T_5$ with the decrease in load in the manner indicated in Figs. 26, 27, and 28. When the external load 2530 decreases, governor 2512 moves pivot 2531 to the right, as viewed in Fig. 25. This lifts piston 2518 in piston-cylinder member 2524, which opens ports 2532, thus introducing the working fluid under pressure into chamber 2533 and lifting piston-cylinder member 2524. The upward movement of piston-cylinder member 2524 revolves bell cranks 2517 and 2521 in a clockwise direction, with the result that valve 2522 becomes partially closed to the extent determined by the movement of piston-cylinder member 2524. In this manner, temperature $T_5$ is progressively reduced with the decrease in load. The opposite mode of operation takes place when the load increases, which requires opening of valve 2522. The remaining elements of the control system, such as valves 2540, 2541, and 2542, function in the same manner as valves 2003, 2007, and 2008 in Fig. 20 and, therefore, need no additional description.

The third version of the constant speed cycle

For simplifying the description, the first and the second constant speed cycles have been illustrated for low maximum temperatures, which are the temperatures produced by the low temperature nuclear reactors. Higher temperatures are obtainable with the present day high temperature nuclear reactors, and still higher temperatures are obtainable with other sources of heat, such as oil, gas, and coal. The low temperature cycles are simpler thermodynamically, simpler to implement in practice, simpler to describe and understand and, therefore, were selected for the first part of the specification since the basic principles of the cycle can be grasped more readily with the low temperature cycles. Yet, in practice, the low temperature cycles, obviously, are the least efficient and, therefore, sacrifice efficiency for the simplicity of the apparatus necessary for their practice. Thus, the initial cost is low, but the efficiency is not the best.

In general, as it has been already stated on several occasions, the higher the maximum temperature, the higher the efficiency. The cycle described below is the intermediate temperature cycle because it can very readily utilize higher temperatures than the first and the second versions of the constant speed cycle which are inherently low temperature cycles. The low temperatures may be in the order of 550° F.–700° F., the intermediate temperatures may be in the order of 700° F.–1100° F., and the high temperature cycles are in the 1100° F.–1500° F. range. It should be noted here that insofar as the maximum temperature of 1500° F. is concerned, it is limited by the presently available metallic alloys used in the turbines. The air-cooled turbines have already been successfully operated at 2200° F. and it is obvious that higher temperatures will become attainable with still further development of the alloys. Accordingly, insofar as the maximum temperature of the cycles is concerned, the main limitation is the metallurgical limitation rather than the thermodynamic limitation. The description of the high temperature cycles will follow the description of the intermediate temperature versions.

The intermediate temperature cycle, shown in Figs. 29 through 32, is an adaptation of the second version of the constant speed cycle illustrated in Figs. 24 through 28. The basic features of the two versions, the second and the third, are identical; i.e., $\Delta H_{C_1}$, $\Delta H_{Tu_2}$, $G_1$, $p_2$, and $T_7$ are maintained constant, and all other parameters decrease with the decrease in load. The above is identical to what is shown in Figs. 26, 27, and 28. Therefore, the only difference resides in the point of tapping, or connecting, the regenerative circuit to the expansion step of the cycle for obtaining the weight flow $G_6$, as is explained more in detail below.

As the temperatures $T_5$ and $T_7$ are made higher in this cycle as compared to the temperatures used in the low temperature cycles, the heat drops $\Delta H_{Tu_1}$ and $\Delta H_{Tu_2}$ increase. The heat rises $\Delta H_{C_1}$ and $\Delta H_{C_2}$ were made equal to the corresponding heat rises in the low temperature cycles for obtaining a more intelligible comparison between the low and the intermediate cycles. The increase in the heat drops $\Delta H_{Tu_1}$ and $\Delta H_{Tu_2}$ can also be used for increasing $p_2$ and $p_4$.

When this alternative version of the cycle is used, the number of reheats between the first and the last expansions will have to be increased in the manner indicated in the high temperature version of the cycle, illustrated in Figs. 33–35 and 36–38, for the most advantageous closing of the cycle. Such optimum closing of the cycle means maximum thermal efficiency, maximum specific output and maximum pressure $p_4$; i.e., the maximum pressure which can be obtained efficiently with several dynamic compressors connected in series with each other. No critical pressures are contemplated because such pressures (5000 p.s.i.) offer only limited thermodynamic advantages; quite on the contrary, it is the region on the Mollier chart which is least advantageous for the disclosed cycle. It is more advantageous to obtain the gains in efficiency and specific output by increasing the maximum temperatures, if such increase is permitted, by the alloys used in the turbines, rather than by an increase in pressure which produces very small and inefficient expansion stages in the turbines.

Figure 32:
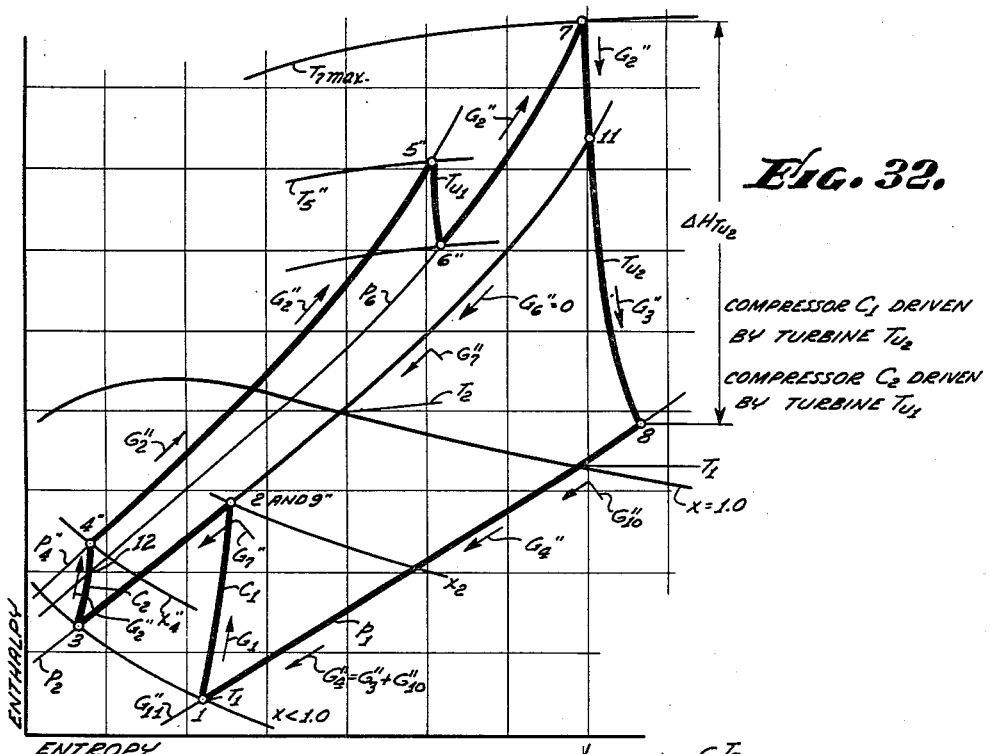
Figure 31:
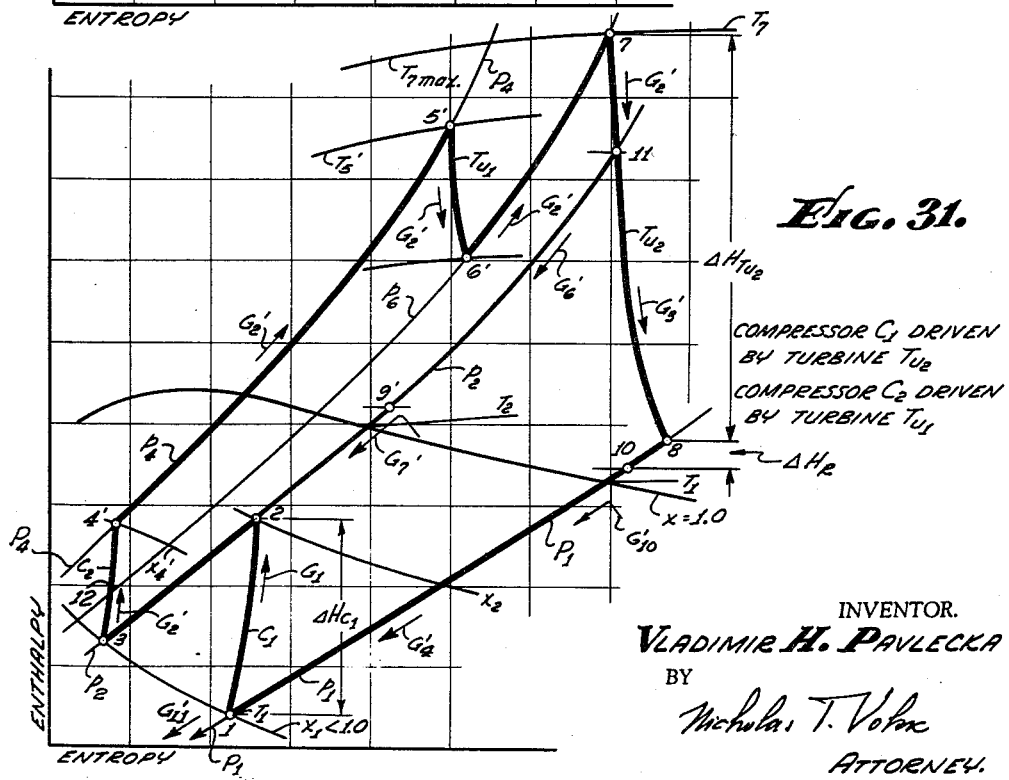

Referring to Fig. 29, the first difference between this schematic diagram and that shown in Fig. 24 is that turbine $Tu_2$ now discharges into a heat recuperator 2910, while in Fig. 24 this heat recuperator has been omitted because temperature $T_8$ in Fig. 24 is so low that no heat recuperation is feasible. The second and last difference is that turbine $Tu_2$ now is provided with a steam bleeding outlet connected to a duct 2903. In Fig. 24, the regenerative circuit, including regulator $F_1$ and the mixing heat exchanger $M_1$, is connected to the exhaust side of turbine $Tu_1$ because $\Delta H_{Tu_1}$ is substantially smaller in Fig. 24 than it is in Fig. 29. Another change that has taken place is illustrated in the Mollier charts but is not discernible in Fig. 29 even though it is a significant change: all the increase in $\Delta H_{Tu_1}$ has been transferred, so-to-speak, to the load turbine $Tu_2$ since the heat drop through $Tu_1$ must remain equal (neglecting losses) to $\Delta H_{C_2}$. Therefore, $Tu_1$ in Fig. 29 is of the same physical size as $Tu_1$ in Fig. 24, but $Tu_2$ is larger in Fig. 29 than in Fig. 24 because of the increase in $\Delta H_{Tu_2}$. If one is to assume that $G_1$ is the same in Figs. 24 and 29, then $G_2$ in Figs. 29–32 can be made considerably larger because the temperature $T_{11}$ in Figs. 30–32 is considerably higher than $T_6$ in Figs. 26–28. However, a better procedure to follow in the course of the design of the power plant using the intermediate temperature cycle is the one in which the increase in $G_2$ is not directly proportional to the increase in temperature but is smaller. For example, if the magnitude of $G_2$ in the low temperature cycle is in the order of 1.5–2.5 pounds per second, the magnitude of $G_2$ for the intermediate temperature cycle may be either the same (1.5–2.5) or only slightly higher, such as, say 1.8–2.8 or 3.0. Since the temperature of the weight flow $G_6$ now is higher (it is equal to $T_{11}$ vs. $T_6$ in the low temperature cycle) less steam will be required to produce a comparable increase in $G_2$. Therefore, $G_6$ will be smaller in this cycle than $G_6$ in the low temperature cycle. The specific output will be higher and the thermal efficiency will be in the order of 43% while the efficiency for the low temperature cycle may be in the order of 23%.

The position of point 11 in Figs. 30–32 is determined in the same manner as the position of point 2 in Fig. 26, the two points lying on the same pressure line $p_2$.

Figs. 31 and 32 illustrate the changes in the cycle as the load decreases. In Fig. 32, $G_6=0$; therefore, valve 2901 is closed. The load control in these cycles is obtained primarily through the decrease of $T_5$, $G_2$, $G_3$, $G_6$, $p_4$, $\Delta H_{C_2}$ and $\Delta H_{Tu_1}$.

The cycle of the type illustrated in Figs. 29–32 has been described in connection with a constant speed power plant. Its teachings are also applicable to the variable speed power plant illustrated in Fig. 1, in which case the area of the cycle 1–2–3–12–6–7–8–1 will decrease because of the decrease in $\Delta H_{Tu_2}$, with the decrease in load, as shown in Figs. 1–5.

*High temperature cycle*

Figs. 33, 34, and 35 illustrate the cycle in which the maximum temperature is in the order of 1100° F.–1500° F. This cycle requires either two or three reheats for the optimum closing of the cycle. To obtain two additional reheats, turbine $Tu_1$ of the prior cycles now has been replaced with two turbines $Tu_1$ and $Tu_2$ which drive compressor $C_2$. Compressor $C_2$ is identical in rating to compressor $C_2$ in the prior figures. Compressor $C_2$ is of the same size as before, so long as $p_4$ and $\Delta H_{C_2}$ remain constant in all the figures. This, of course, is not mandatory, and the above parameters were made equal in all the cases merely for a more convenient comparison of the respective cycles with each other. The load turbine $Tu_2$ of the prior cycles now has been replaced with two turbines $Tu_3$ and $Tu_4$ which drive compressor $C_1$ and a load 3300. Two additional heater coils 3301 and 3302 are provided for obtaining the additional reheats. Coil 3301 is placed between the turbines $Tu_1$ and $Tu_2$, and coil 3302 is placed between turbines $Tu_3$ and $Tu_4$. The remaining elements and connections of the power plant in Fig. 33 are identical to those in Figs. 24 and 29 and need no additional description. The principles of the control system shown in Fig. 25 are directly applicable to Figs. 33, 34, and 35; therefore, illustration of the control system is not necessary. Only a brief description of Fig. 34 is necessary, since the basic principles of this figure are identical to those used in the prior figures. Wet steam is compressed from state $p_1$, $T_1$ to state $p_2$, $T_2$ in compressor $C_1$. The weight flow through compressor $C_1$ is equal to $G_1$ pounds per second. The regenerative circuit $F_1$–$M_1$ increases this weight flow by adding a weight flow $G_6$ of superheated steam and a weight flow $G_7$ of preheated water. Preheating of this water takes place in a heat exchanger 3310, Fig. 33, which receives the expanded steam from the exhaust side of turbine $Tu_4$. The state of this steam is indicated by point 13 in Fig. 34. It has a temperature $T_{13}$ which is sufficiently high so as to make heat recuperation possible in this case. The recuperated heat is indicated in Fig. 34 by the heat drop $\Delta H_R$ which corresponds to the enthalpy change between points 13 and 14.

The compressed wet steam has a higher quality at point 2 than at point 1, the constant qualities being designated by the constant quality lines $X_1$, $X_2$, and $X_4$. Steam at point 2 is returned from the quality line $X_2$ back to the quality line $X_1$ after it is mixed with the weight flows $G_7$ and $G_6$. It enters compressor $C_2$ at point 3 as a weight flow $G_2$. It is compressed to pressure $p_4$ in compressor $C_2$, and it leaves compressor $C_2$ having a quality $X_4$ which may be either higher or lower than the quality $X_2$, depending on the compression ratio in compressor $C_2$ as compared to the compression ratio in compressor $C_1$. In the illustrated example, $\Delta H_{C_1}$ is larger than $\Delta H_{C_2}$; therefore, $X_4 < X_2$. After leaving compressor $C_2$ at pressure $p_4$, the compressed steam is superheated to temperature $T_5$, expanded in turbine $Tu_1$ to state $T_6$, $p_7$ reheated in heater $H_3$ to state $T_7$, $p_7$; expanded in turbine $Tu_2$ to state $T_8$, $p_{10}$, reheated in heater $H_2$ to state $T_{10}$, $p_{10}$, expanded in turbine $Tu_3$ to state $T_{11}$, $p_2$, reheated in heater $H_4$ to state $T_{12}$, $p_2$, and finally expanded in turbine $Tu_4$ to state $T_{13}$, $p_1$. It is then returned to compressor $C_1$ after passing through the heat exchanger 3310, where the heat drop $\Delta H_R$ is transferred back into the circuit by heating the weight flow $G_7$ of water which is used in the mixing heat exchanger for restoring the quality of steam back to quality $X_1$. The weight flows $G_6$ and $G_7$ are used in the regenerative circuit $F_1$–$M_1$ in the same manner as before.

Fig. 35 illustrates the above cycle on the temperature-entropy chart. It is believed that this chart is self-explanatory in view of the given description of Fig. 34, since this description also applies to Fig. 35. This figre has been included primarily to indicate the features of the cycle on the temperature-entropy chart, which is also true of Fig. 36. Fig. 36 is applicable to all the cycles having two steps of compression and one reheat step 6–7. In Fig. 36, the useful work obtained with the cycle is that defined by the points 1–2–3–4–4'–5–6–7–8–8'–1. The rejected heat is represented by the area 1–9–10–3–2–1. This area is relatively large, as it appears on the chart. It should be remembered, however, that this area does not represent the total rejected heat but only the heat contained in a unit of weight flow of steam. Since the weight flow $G_7$ is relatively small as compared to $G_1$ and $G_2$, the total heat loss, or the total rejected heat, is smaller in this cycle than in the Clausius-Rankine cycle because the greater part of steam is returned into the cycle at point 1 while it is still a wet steam and some of the steam, i.e., $G_6$, is used in the regenerative circuit without being condensed into water. The heat of compression is also used in the cycle through the increase of the weight flow $G_2$.

The effect that this increase in the weight flow $G_2$ produces on the thermodynamic efficiency of the cycles is discussed more in detail below in connection with Figures 36a and 36b, where it is pointed out that much higher efficiencies are obtainable due to the fact that the maximum flow in the cycle takes place in that portion of the cycle which also has maximum efficiency. It also is pointed out below that the cycle, from point to point, does not have constant efficiency, but some of its phases have much higher efficiency than the remaining phases. Accordingly, the only way that one can possibly obtain the maximum efficiency is by having the maximum flow coincide with the maximum efficiency portion of the cycle.

Figure 36A:
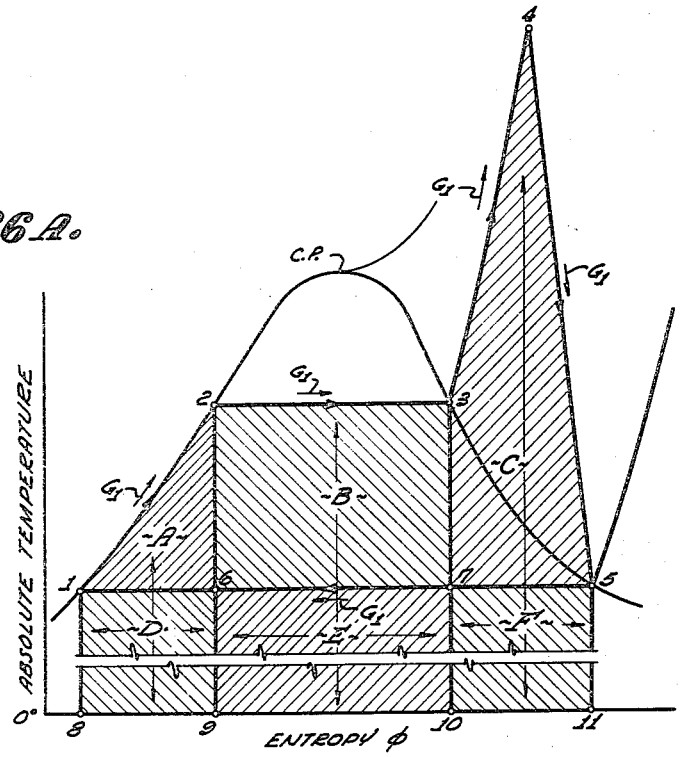
Fig. 36A is the same chart for the Clausius-Rankine cycle.

Referring to Figure 36a, it illustrates the temperature-entropy chart of the conventional Clausius-Rankine cycle where the entire steam flow, upon the completion of the expansion step, is condensed and returned back into the cycle by pumps. Accordingly, the weight flow $G_1$ throughout the cycle remains constant, as illustrated in Figure 36a. The efficiency of the respective portions A, B and C of this conventional Clausius-Rankine cycle are given below:

The thermal efficiency of part "A" is:

$$\eta_A = \frac{\text{"}A\text{"}}{\text{"}D\text{"}} \text{ or } = \frac{(1\text{--}2\text{--}6\text{--}1)}{(1\text{--}2\text{--}6\text{--}9\text{--}8\text{--}1)} \tag{8}$$

This portion of the cycle has a very low efficiency because the "A" area (1–2–6–1) is small as compared to area (1–6–9–8–1) indicating the rejected heat.

The thermal efficiency of part "B" is:

$$\eta_B = \frac{\text{"}B\text{"}}{\text{"}E\text{"}} \text{ or } = \frac{(2\text{--}3\text{--}7\text{--}6\text{--}2)}{(2\text{--}3\text{--}7\text{--}10\text{--}9\text{--}6\text{--}2)} \tag{9}$$

The efficiency of this portion of the cycle is better, or numerically higher, than that of part "A", because "B" is greater for each increment of entropy than "A" for the same increment of entropy, but still relatively low. This is the reason why the Clausius-Rankine cycle is being constantly advanced to the "C.P.", critical point on the curve, and up, beyond this point, by increasing the maximum pressure of the cycle, to enlarge the area "B," while the rejected heat area (6–7–10–9–6) remains unchanged. Obviously, to improve $\eta_B$ significantly, it would require extremely high pressures, as indicated on the chart. The Eddistone plant, in its quest for higher efficiency, has reached the well nigh ballistic pressure of 5200 pounds per square inch.

The thermodynamic efficiency of part "C" is:

$$\eta_C = \frac{"C"}{"F"} \text{ or } = \frac{(3-4-5-7-3)}{(3-4-5-11-10-7-3)} \quad (10)$$

This portion of the cycle is high, because area "C" is quite large with respect to the rejected heat area.

The overall efficiency of the Clausius-Rankine cycle is:

$$\eta_0 = \frac{1}{\frac{1}{\eta_A} + \frac{1}{\eta_B} + \frac{1}{\eta_C}} \quad (11)$$

from which it follows that $$\frac{1}{\eta_A}$$

will always be large and its influence on the $\eta_0$ will be (and is), considerable, no matter how high $\eta_B$ and $\eta_C$ may be. This is a matter of great importance because it is inherent in the Clausius-Rankine cycle that the weight flow $G_1$ remains constant throughout all the portions "A," "B" and "C" of the cycle, and, therefore, there is no hope of ever reaching significantly higher efficiencies with this type of cycle. This constant weight flow $G_1$ is indicated in Figure 36a by a plurality of arrows $G_1$ following all the individual steps of the cycle. It is to be understood that the constant weight flow $G_1$, of course, implies, or refers to, the cycle operating at constant load. $G_1$ varies with the load, but this discussion applies to any weight flow, however large or small, at any given instant because the weight flow in this cycle is a series flow and, therefore, is exactly the same in all parts of the cycle at any given instant.

Figure 36B:
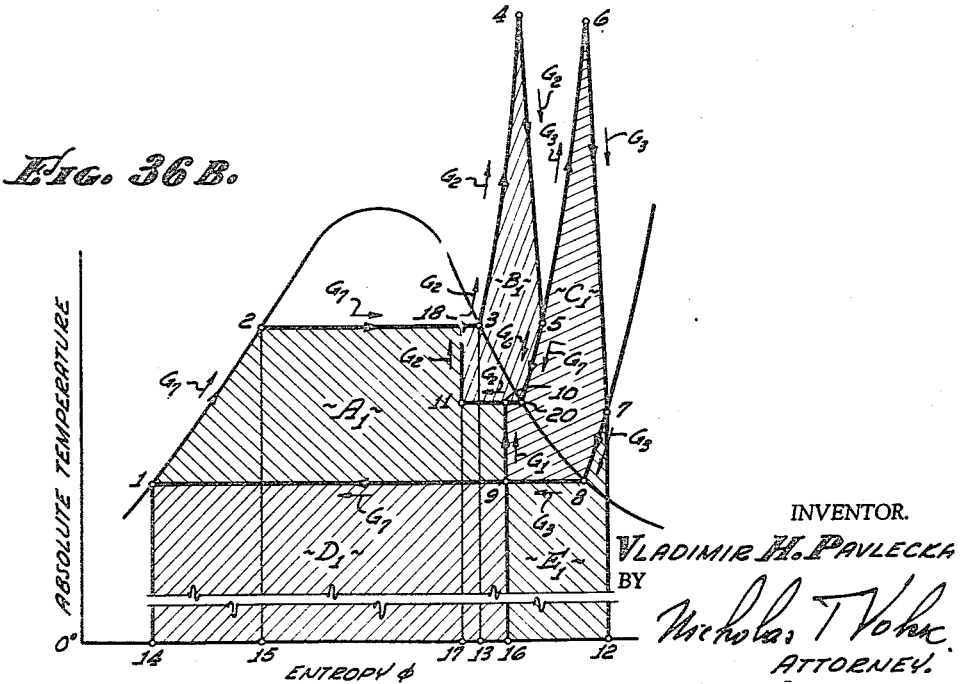

Repeating the same type of discussion and comparison for the dynamic steam cycle (D.S.C.) disclosed here, which is illustrated in Figure 36b (this figure is a repetition of Figure 36, but on an enlarged scale), in D.S.C., area "A₁" is smaller in Fig. 36b than in Fig. 36a because the weight flow $G_7$ is raised only to pressure $p_4$, as is the case in Fig. 36a, and, which is even more important, it is used for only a small fraction, $G_7$, of the total, or maximum, mass flow $G_2$ at point "3." Therefore, the effect of low $\eta_A$ on the overall $\eta_0$ is reduced to a very large extent because only a small part of the mass flow operates over this portion of the cycle, and the area of this portion is made smaller.

The effect of the part "A" on the overall efficiency $\eta_0$ is the function of the ratio of $G_7$ as compared to $G_2$, and this ratio may be as low as $$\frac{G_7}{G_2} \approx \frac{1}{10} \quad (12)$$

in the D.S.C.

It should be noted here before proceeding with the discussion of the remaining portion of the cycle, that the weight flow $G_{10}$ of water is used for cooling and restoring the expanded steam, having weight flow $G_3$, back to its original quality in the regulator $F_2$–$M_2$. This weight flow is returned into the cycle by a pump which raises the pressure of this water from pressure $p_1$ to pressure $p_1 + \Delta p_1$ for enabling this water to enter, or return, into the cycle at point 1, which is at pressure $p_1$. The cycle of this water, as it appears in Fig. 36B, is 1–9–9′–1. It introduces only a minor loss in the cycle, as illustrated by its small area. This weight flow need not be raised to pressure $p_2$, pressure $p_1 + \Delta p_1$ is entirely adequate for the purpose. The above means that the cycle, normally, will have two water pumps, rather than one, as illustrated in all the figures for simplifying the flow diagrams.

The area "B₁" is the area of the highest mass flow in the entire cycle and it can be seen, from Figure 36B, that this portion of the cycle will be a very efficient portion because the ordinates of the area "B₁" are much larger than the ordinates of the area A₁. Moreover, the area E₁ of the rejected heat below "B₁," is again used by only a small portion $G_3$ of the total mass flow $G_2$.

The area "C₁" also has large ordinates which are comparable to the ordinates of the B₁ area. This portion of the cycle has a reduced, but still high, mass flow $G_3$ and, therefore, will have a beneficial effect on the overall efficiency.

Figures 36a and 36b thus graphically illustrate the reasons for the high thermal efficiency of the D.S.C. They may be summarized as follows:

(1) D.S.C. condenses only a small amount of steam into water; the condensation takes place only to the extent required for obtaining proper control of steam quality during the compression step of the cycle and for cooling the expanded steam $G_3$. The first weight flow is equal to $G_7$, for example, in Figure 33. The low saturation region is very inefficient in all steam cycles. Since the weight flow $G_7$ is very small as compared to $G_2$, $G_7$ has no significant influence on the overall efficiency of the cycle. Therefore, the effect of the least efficient low saturation area "A₁" in Figure 36b has been reduced to an absolute practicable minimum. As to the weight flow $G_{10}$, it has already been pointed out that it has no significant effect on the efficiency of the cycle.

(2) The least efficient area of the cycle has a smaller area A₁ in the D.S.C. as compared to the corresponding area A in the Clausius-Rankine cycle due to the fact that the weight flow $G_7$ is raised only to an intermediate pressure $p_2$ and not to the maximum pressure $p_4$ of the cycle; however, what is more important, is that $G_7$ is approximately 0.1 of $G_1$ in Fig. 36A, according to Equation 12.

(3) The D.S.C. operates with the highest mass flows in the superheated region, which is a region of the highest thermal efficiency (areas B₁ and C₁ in Figure 36B).

(4) The area of the rejected heat in the D.S.C. is about the same as in the Clausius-Rankine cycle, and may be even larger, as is shown in Figure 36b, but since only a small fraction of the total mass flow operates in this area, unlike that in the Clausius-Rankine cycle, all ($G_2$), or almost all ($G_3$) mass flows operate only in the most favorable regions.

*The second version of the high temperature cycle*

The second version of the high temperature cycle is illustrated in Figs. 37, 38, and 39. The difference between this cycle and the preceding cycle, Figs. 33–35, is in the use of three compression steps and only two reheats.

Such cycle is indicated for larger power plants, but its minimum rating may be much smaller than a feasible minimum rating for the supercritical cycle which requires power plants in a 300 megawatt class. Power plants using three steps of compression and two steps of reheating, illustrated in the above figures, are feasible with power plants of 5 or 10 megawatts. The limiting factor is the size of the last stage of the compressor and the first stages in turbine $Tu_1$ which must have workable dimensions from the point of view of manufacture and operation, the small stages becoming very inefficient because the Reynolds number becomes very small.

The advantages of such cycles over cycles with one reheat and two compression steps are, higher efficiency and higher specific output. The multi-step cycle may be used either for variable speed or constant speed power plants in the same manner as the cycles with the two compression steps and one or more reheat steps. Since high rating power plants in the majority of cases, or uses, are constant speed power plants, the illustrated cycle is for constant speed operation. The variable speed type of operation will be described at the end of this description by using the same figures for its description.

The Mollier charts, shown in Figs. 38 and 39, will be described first, with the description of the schematic diagram following. Fig. 38 illustrates a full load cycle and Fig. 39 illustrates the changes in the cycle as the load decreases to some predetermined minimum load or a low output. The useful output of the cycle can be reduced still further by diminishing the weight flows $G_4$, $G_5$, $G_7$, and $G_8$ by partially closing or fully closing the valves 3700, 3701, 3702, and 3703 in the regenerative circuits shown in Fig. 37. The Mollier chart for this type of operation is not shown in Figs. 38 and 39 since it would have unduly complicated these figures. However, the above should be quite obvious to those skilled in the art in the light of what is shown and the given description.

Referring once more to Fig. 38, the compression is performed in three steps 1–2, 3–4, and 5–6 in the three serially connected compressors $C_1$, $C_2$, and $C_3$. The corresponding compressions are $p_1$, $p_2$, $p_4$, and $p_6$, $p_1$ being the condenser pressure. The above type of compression corresponds to that shown in Fig. 15. The weight flow in the first compressor is $G_1$, $G_2$ in the second compressor, and $G_3$ in the third compressor. The above weight flows are equal to:

$$G_1 = G_{11} - G_{12}$$
$$G_2 = G_1 + G_8 + G_7 \qquad (13)$$
$$G_3 = G_2 + G_5 + G_4$$

The weight flow $G_3$, after being raised to pressure $p_6$, is superheated to temperature $T_7$. It is then expanded in turbine $Tu_1$ to temperature $T_8$ and pressure $p_8$, the degree of expansion being determined by the power required for driving compressor $C_3$ by means of turbine $Tu_1$ and any accessories driven by $Tu_1$. Since the weight flows through $C_3$ and $Tu_1$ are equal, $\Delta H_{Tu_1}$ is larger than $\Delta H_{C_3}$ to the extent required by the losses and the auxiliary equipment. The superheated steam at point 9 is expanded to point 10, the position of which is determined by pressure $p_4 + \Delta p$, $\Delta p$ being that small increment of pressure which is required to overcome losses. This pressure $\Delta p$ is not indicated in any of the figures and will not be taken into consideration in the claims because of its negligible value. This expansion takes place through the second compressor turbine $Tu_2$ which drives compressors $C_1$ and $C_2$. $\Delta H_{Tu_2}$ is smaller than the sum of $\Delta H_{C_1} + \Delta H_{C_2}$ because $G_3 > G_1$ and also $G_3 > G_2$, the relationship determining the above values being $$\Delta H_{Tu_2} G_3 = \Delta H_{C_1} G_1 + \Delta H_{C_2} G_2 \qquad (14)$$

if the losses are neglected.

At full load, $H_3$ does not receive any fuel; therefore, the weight flow $G_6$ of steam at point 10 and 11 (the two points coincide) is expended through turbine $Tu_3$ to a state 12 which has pressure $p_2 + \Delta p$. The remaining portion of flow $G_3$ is diverted into compressor $C_3$ as a weight flow $G_4$. It is mixed with $G_2$ and then with a preheated water, having a weight flow $G_5$, in the mixing heat exchanger $M_1$, Fig. 37.

At point 12, the weight flow $G_6$ is divided into two weight flows $G_9$ and $G_7$. $G_9$ is expanded to pressure $p_1$ in the second half of turbine $Tu_3$ which is designated as turbine $Tu_4$.

The remaining portion of Fig. 38 should be self-evident from the prior description of the similar diagrams.

In the disclosed cycle, the speed is maintained constant by maintaining $\Delta H_{Tu_3, Tu_4}$ constant and varying $G_6$ and $G_9$ as a direct function of the load. This follows from the equation for power, $\Delta N$, which is:

$$\Delta N = G \Delta H \qquad (15)$$

and, in this case, $$\Delta N_o = G_6 \cdot \Delta H_{Tu_3} + \Delta H_{Tu_4} \cdot G_9 \qquad (16)$$

where
$\Delta N_o$ is the useful power output.
It also may be stated here that $$\Delta H = \sum \frac{c^2}{2g} \qquad (17)$$

where
$c$ is the velocity of "through flow" through each stage;
$g$ is the acceleration of gravity.

If $c$ is constant, the peripheral velocity, $U$, is also constant since $U$ and $c$ are two sides of the velocity triangle. $\Delta H_{Tu_3 \, \& \, Tu_4}$ is maintained constant, as indicated by a dotted line between the points 11 (and 10) and 11''. This dotted line is the locus of the constant heat drop as it is made to travel with its base along the condenser pressure line $p_1$ from point 13 to points 13', 13'', etc.

The variable speed operation of this power plant may be obtained in a variety of ways. For example, all temperatures may be reduced in proportion to the reduction in load. The weight flows $G_2$ and $G_3$ may be controlled together with the temperatures, which will also reduce the pressures $p_2$, $p_4$, and $p_6$ with the decrease in load.

*Schematic diagram, Fig. 37.*—The schematic diagram of this version of the high temperature power plant should be apparent in view of the description of the prior power plants using the same elements. All the compressors $C_1$, $C_2$, and $C_3$ are connected in series, and the turbines $Tu_1$, $Tu_2$, and $Tu_3$–$Tu_4$ are also connected in series. The first two compressors $C_1$ and $C_2$ are driven by the second turbine $Tu_2$; the third compressor $C_3$ is driven by the first turbine $Tu_1$, and the load 3705 is driven by the third turbine $Tu_3$–$Tu_4$ which has a duct 3706 connected to that stage of this turbine which has a steam pressure equal to $p_2 + \Delta p$; i.e., the pressure obtained on the output side of the first compressor $C_1 + \Delta p$. The two regenerative circuits $F_2$–$M_2$ and $F_3$–$M_3$ are identical to the regenerative circuits described previously. The first regenerative circuit $F_2$–$M_2$ is connected between the first and the second compressors $C_1$ and $C_2$, and the second regenerative circuit $F_3$–$M_3$ is connected between the second and third compressors $C_2$ and $C_3$. The steam quality control circuit $F_1$–$M_1$ reduces the temperature of steam reaching it at a temperature corresponding to point 16'' in Fig. 39 and leaving it at temperature $T_1$.

*Dynamic steam cycles having a single compressor turbine and a single load turbine*

In the cycles disclosed thus far either one or a plurality of compressor turbines are used for driving the compressors; and, in some of the circuits, a load turbine is also used for driving one or more compressors. The cycle also may be arranged so that only a single compressor turbine is used for driving all of the compressors and the load turbine is used solely for producing the external power. This type of arrangement produces a power plant having a wide power range and it also has certain thermodynamic and operational advantages. Also, the control system which is necessary for implementing this type of power plant is simpler than the control systems obtainable with the power plants in which the load turbine is used not only for delivering the external power but also for operating either one or more compressors.

Figure 40:
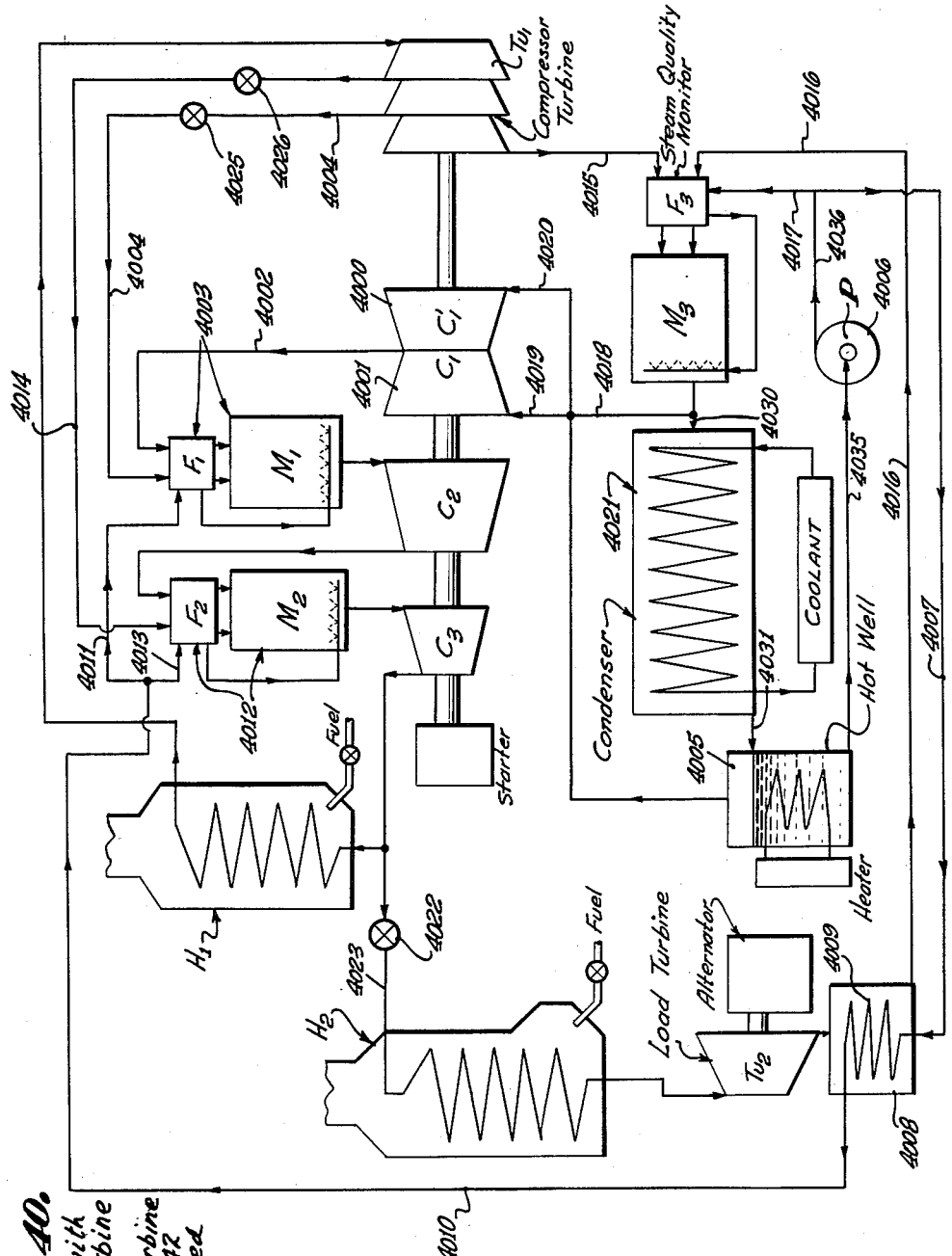

The constant speed cycle of the above type is illustrated in Figs. 40–42. The compressor turbine cycle is 1–2–3–4–5–6–7–8–9–10–1 and the load turbine cycle is 1–2–3–4–5–6–11–12–1. Fig. 41 illustrates the Mollier chart for the full load at which time the compressor turbine has a maximum temperature $T_{7_{max}}$ and the superheated steam entering the compressor turbine $Tu_1$ is expanded to a wet state illustrated by point 10. It is then returned to its original state at point 1 in the same manner as in the prior power plants. Points 8 and 9 indicate the points at which some of the expanded steam is returned to the regenerative circuits as weight flows $G_7$ and $G_{10}$.

Referring to Figure 40, the compressor turbine $Tu_1$ drives three compressors $C_1$-$C_1'$, $C_2$ and $C_3$. Compressor $C_1$-$C_1'$ has two parallel compressors 4000 and 4001 which discharge through a duct 4002 into a regenerative circuit 4003. This circuit is identical to the previously described regenerative circuits using a quality control regulator $F_1$ and the mixing heat exchanger $M_1$ and, therefore, needs no additional description. It receives compressed steam through a duct 4002 from compressor $C_1$-$C_1'$, a superheated steam from turbine $Tu_1$ over a duct 4004, and condensed water from hot well 4005 over ducts 4035, 4036, 4007, 4010 and 4011, pump 4006, and, a heat exchanger 4008 provided with a coil 4009. The second compressor discharges into the second regenerative circuit 4012 which is also provided with a quality control regulator $F_2$ and a mixing heat exchanger $M_2$. Hot water is supplied from the hot well 4005 through a duct 4013 and superheated steam is supplied through a duct 4014 which is connected to an appropriate stage in the compressor turbine $Tu_1$. Compressor $C_3$ discharges into heaters $H_1$ and $H_2$ and these heaters are connected, respectively, to the compressor turbine $Tu_1$ and the load turbine $Tu_2$. The load turbine as well as the compressor turbine discharge into the third quality control circuit, including regulator $F_3$ and a mixing heat exchanger $M_3$. The compressor turbine $Tu_1$ is connected to $F_3$ through a duct 4015 and the load turbine is connected to $F_3$ over a duct 4016. Condensed water is supplied to the regulator $F_3$ over a duct 4017. After the quality of the steam has been returned to its original state $X_1$, part of this steam is conveyed to compressor $C_1$ over ducts 4018, 4019 and 4020. The remaining part of the steam is conveyed to a condenser 4021 through a duct 4030, and from the condenser to the hot well 4005 through a duct 4031. A shut-off valve 4022 is provided in a duct 4023 for disconnecting the load turbine $Tu_2$ from compressor $C_3$ at no load.

The Mollier charts for this power plant are illustrated in Figs. 41 and 42. Fig. 41 corresponds to the full load condition, while Fig. 42 corresponds to the part load condition. The temperature $T_7$ of the steam entering the compressor turbine is maximum at full load. The load turbine receives steam at temperature $T_{11}$, which is lower than $T_7$. The remaining portion of Fig. 41 needs no additional description because of the prior description and the description of similar charts.

Fig. 42 illustrates the changes in the cycle which take place when the power plant is operated at constant speed. The full load temperature $T_{11}$ is increased to the maximum temperature $T_{11}'$ and the full load temperature $T_7$ is decreased to temperature $T_7'$. Temperatures $T_{11}'$ and $T_7'$ are the no load or minimum load temperatures. Since $\Delta H_{Tu_1}$ decreases, all the pressures such as $p_2$, $p_4$, and $p_6$, also decrease, but $\Delta H_{Tu_2}$ remains constant. Accordingly, when this cycle is used as a constant speed cycle, the control of the output power is obtained by reducing $T_7$, increasing $T_{11}$ and also by reducing all of the weight flows, the density and pressure of the steam flowing through the entire cycle.

Although Figures 41 and 42 illustrate the Mollier charts for the constant speed cycle, it should be apparent that this type of power plant can also be used very readily as a variable speed plant in which case the previously described variable speed cycles would apply. For example, a variable speed cycle could be obtained by making $T_5$ and $T_7$ maximum at full load and reducing both of these temperatures simultaneously with the decrease in load or reducing $T_5$ only and then reducing $T_7$ together with the reduction of $T_5$ in the manner described previously in connection with the description of Figures 9, 10 and 11.

Another version of the variable speed power plant and its Mollier charts is illustrated in Figures 43, 44, 45 and 46. In this case $T_{11}$ is maximum at full load and $T_7$ has some lower value which is determined by the required magnitude of $\Delta H_{Tu_1}$ for producing the required compression ratios in the compressors. As the load decreases, $T_7$ is increased and $T_{11}$ is decreased in the manner indicated in Figs. 44 and 45 with the concomitant decrease in all parameters. The no-load condition is illustrated in Fig. 46 at which time no steam reaches turbine $Tu_2$ and the temperature $T_7$ of the steam reaching the compressor turbine is reduced to that minimum value $T'_7{''}$ which is necessary for operating the power plant at no-load condition. Since $\Delta H_{Tu_1}$ now has a minimum value, the power plant is operating at the lowest sustaining speed. When the external load is quite low, such as that illustrated in Fig. 45, valves 4305 and 4306, Fig. 43, are closed and no steam bleeding takes place. Therefore, $G_7$ and $G_{10}$ are equal to zero and only water injection is used for returning the compressed steam to its original quality $X_1$. These water weight flows are indicated as $G_8$ and $G_{11}$ on the Mollier charts.

The schematic diagram of the variable speed power plant needs no detailed description because it is identical to that in Fig. 40 with two modifications: the heat exchanger 4008 has been eliminated and replaced by a heat recuperator 4301 which recovers some of the heat from the flue gases produced in heater $H_1$. The second change relates to a valve 4300 which is connected in series with a duct 4302 connected to the input side of the compressor turbine $Tu_1$ and an identical valve 4303 is connected in series with a duct 4304. Valve 4303 is closed at no load, and valve 4300 is operated only when a very sudden reduction in load is required. Valves 4305 and 4306, which are in series with the respective steam bleeding circuits, are normally open, and are closed when the external load is quite low, such as that shown in Fig. 45.

Figure 44:
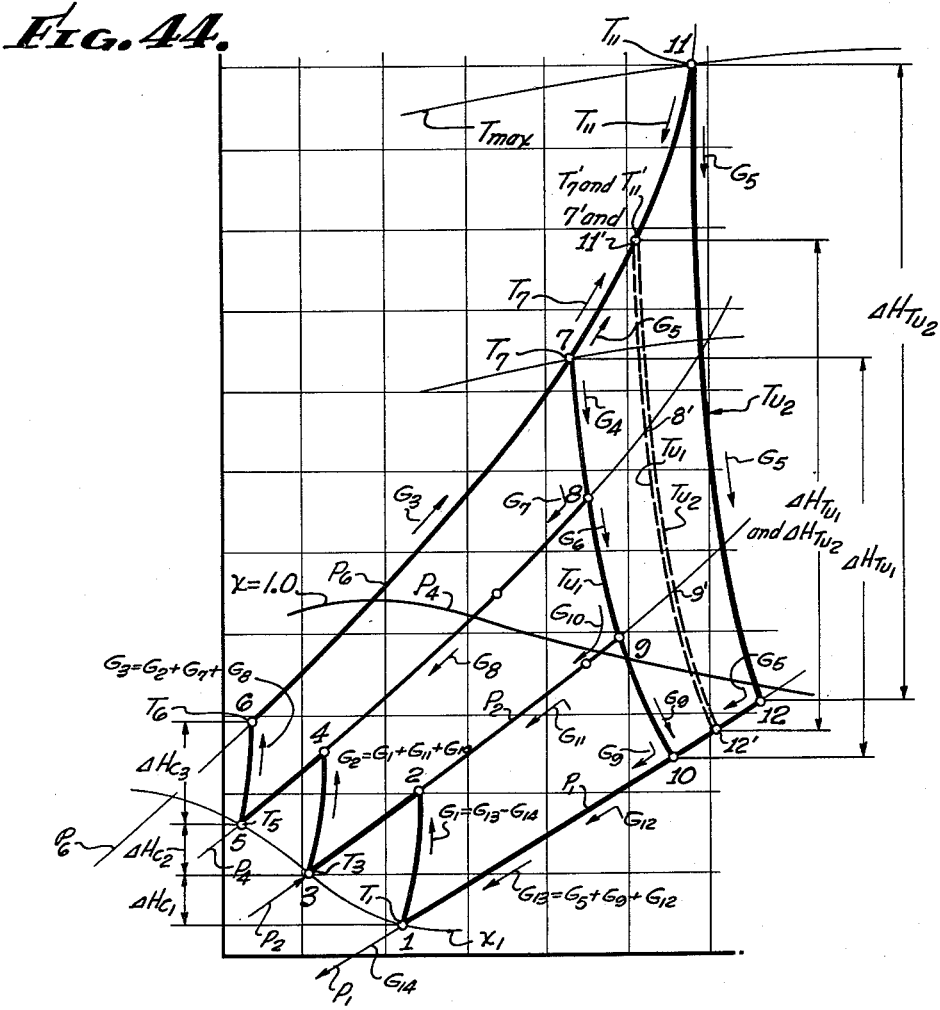

Reverting once more to Fig. 44, points 7', 11', 8', 9' and 12' indicate some intermediate load condition when $T_7'=T_{11}'$. As the load decreases still further, $T_7$ reaches a maximum value equal to $T_{max}$. This maximum temperature isothermal line is indicated in Fig. 44 but no Mollier chart is given in the drawings for indicating that condition when $T_7''=T_{max}$ and, at the same time, $T_{11}''$ is approximately equal to that value of $T_7$ which is illustrated in Fig. 44. In other words, the above part load condition can be very readily visualized by stating that the two heat drops $\Delta H_{Tu_1}$ and $\Delta H_{Tu_2}$ exchange their places in Fig. 44 in order to produce the above part-load condition. When the temperature $T_7$ is increased from the value indicated in Fig. 44 to $T_{7max}$, the heat flow into the heater $H_1$ in Fig. 43 remains constant while the weight flow $G_4$ has been decreasing in relation to the weight flow $G_5$ because of the decrease in $T_{11}$. Therefore, the increase in $T_7$ during this transition from the full load (Fig. 44) to that load when $T_7$ reaches its maximum value $T_{7max}$ is not due to the decrease in heat supplied to heater $H_1$ but is due to the decrease in $G_4$. The decrease in $G_4$ may be a two-fold decrease: it decreases because of the decrease in $T_{11}$ and the concomitant relative increase in $G_5$ and, secondly, there may be a decrease in the absolute value of $G_4$ if the increase in $\Delta H_{Tu_1}$ does not counterbalance completely the decrease in $G_4$.

In both circuits, Figs. 40 and 43, steam bleeding is performed by using only the compressor turbine $Tu_1$ and there is no bleeding from the load turbine $Tu_2$. Therefore, the entire weight flow $G_5$ is expanded through the load turbine. Therefore, the external output is equal to $$\Delta N_o = \Delta H_{Tu_2} \cdot G_5 \qquad (18)$$

While there is a range in the load variation in the variable speed power plant described above when heater $H_1$ receives a constant amount of heat (between $T_7$ and $T_{7max}$) and the amount of heat supplied to heater $H_1$ is decreased thereafter with the decrease in load, the amount of heat supplied to heater $H_2$ decreases continuously with the decrease in load. Therefore, the fuel, or heat input into heater $H_2$ is decreased at a fixed rate with the decrease in load until it is equal to zero at no load. The heat inputs into $H_1$ and $H_2$ are both decreased at a fixed ratio with respect to each other until the no-load condition only after $T_7$ becomes equal to $T_{7max}$.

In the constant speed cycle illustrated in Figs. 41 and 42, the heat inputs into both heaters $H_1$ and $H_2$ are decreased with the decrease in load, both heat inputs being mutually inter-related at all loads at a preset program or ratio with respect to each other.

It may be noted that the heat recuperation has been replaced with a heat economizer 4301 in the variable speed cycle. This is due to the fact that points 10 and 12 are now in the wet steam region, below the line $X=1.0$, due to large enthalpy drops through the two turbines. The above does not apply to the constant speed power plant, Figs. 41–42, and there is a heat recuperation at the heat exchanger 4008, because point 12 is in the wet region only at relatively high loads and is in the superheat region thereafter, as indicated in Fig. 42. The above conditions, obviously, may vary, depending upon the type of cycle, or, rather, the range of temperatures, pressures, weight flows, etc. selected for the operation of the power plant, and, therefore, heat exchangers may be replaced with the heat economizers even in the constant speed cycles.

No control systems are illustrated for the cycles indicated in Figs. 40–46 since the teachings of the described control systems are also applicable to these cycles.

The invention thus discloses dynamic steam cycles and power plants for practicing these cycles. All cycles include a dynamic compression circuit including at least two serially connected compressors $C_1$ and $C_2$; the dynamic compression circuit may also include a larger number of serially connected dynamic compressors. Wet steam enters the compression circuit having temperature $T_1$, quality $X_1$, weight flow $G_1$ and pressure $p_1$, and it leaves the compression circuit as compressed steam having temperature $T_x$, quality $X_x$, weight flow $G_x$ and pressure $p_x$. This is the terminology that will be used in at least some of the claims. It is necessary to resort to this terminology (suffix $x$) in the claims because all of the parameters describing the steam leaving the compression circuit may have a wide range of values, as stated in the specification, depending upon the type of cycle selected for any given specific use. The maximum pressure $p_x$ may have wide variations, depending upon the number of the compression steps and the compression ratios of the selected compressors.

If $p_x$ (maximum pressure in the cycle) may have wide limits indicated in the specification, it inescapably follows that $T_x$ and $G_x$ may also have relatively wide limits because both are functions of $p_x$ for a given useful output. Although, as indicated in the specification and on all the Mollier charts, the quality of steam leaving the compression circuits, as a rule, should be in the order of .85–.95, the above, obviously, does not mean that the cycles will be rendered inoperative if $X_x$ is made equal to, say, .8 or 1.0. In one case, i.e. .8, it would means excessive erosion of blading since the initial quality will have to be lower than .65, and in the second case, i.e. 1.0, it would merely mean lower efficiency of the power plant. The same type of terminology, and for the same reasons, will also be used, at least in some of the claims, for describing the expansion circuit which includes, for the reasons stated previously, at least two turbines. All of the expansion circuits have steam bleeding for increasing the weight flows, $G_2$, $G_3$ through $G_x$, through the compression circuits, but these steam bleeding circuits at times are not in use, as indicated in Figs. 40–46. The claims also will recite the connections between the expansion circuit, such as circuit 5–6–7–8 in Fig. 1, and the regenerative circuit, such as $F_1$ and $M_1$ in Fig. 6. This circuit is connected "between" compressors $C_1$ and $C_2$, which means that it is connected in series with, or between, the output portion (duct 601) of compressor $C_1$ and the input portion of compressor $C_2$ (duct 607). Throughout the specification, it has been stated that the point at which the regenerative circuit $F_1$–$M_1$ is connected to the expansion circuit (point 6 in Fig. 1) should have a slightly higher pressure than the pressure at point 2 in Fig. 1 by the amount $\Delta p$, where $\Delta p$ is that increment in pressure which is required to overcome the duct losses (ducts 603 and 611 in Fig. 6) and the loss encountered at the entry into the quality regulator $F_1$–$M_1$. This $\Delta p$ is, therefore, necessary to produce a positive pressure gradient between the points 6 and 2 in Fig. 1. In reciting this connection and describing the position of point 6 in the expansion circuit in the claims, the following terminology shall be used, at least in some of the claims: "a connection between the first regulating means ($F_1$–$M_1$, Fig. 1) and the first expansion circuit (circuit 7–8, Fig. 1, which includes turbines $Tu_1$ and $Tu_2$ and heater $H_2$, Fig. 6), said connection being at the pressure point within said first steam expansion circuit Corresponding (it is the point having pressure $p_2+\Delta p$ in Figs. 1 and 6) to the pressure of steam between the first and the second compressors," etc., which is pressure $p_2$. The word "Corresponding," therefore, shall mean the pressure expressed by $p_2+\Delta p$. Although the quality regulating circuits were illustrated as the flow-metering devices $F_2$ and mixing heat exchangers $M_2$, Fig. 1, etc., the circuit will function also if the above elements are replaced with a condenser, although, admittedly, the regulation of such condenser may be more difficult than the control of the preferred embodiments.

Accordingly, the invention is not limited to any specific apparatus, since the disclosed cycles and methods can be practiced with a variety of apparatus, as stated in the specification.

In concluding the description of the cycle, it is proper to say that the merits of the cycle, obviously, reside in the dynamic compression step of the cycle which enables one to obtain the maximum flows in the most efficient portion of the cycle, and the minimum flows in the least efficient portions of the cycle. Even with this fundamental advantage of the cycle, and the elimination of the losses produced by the complete condensation and subsequent evaporation of the Entire flow in the Clausius-Rankine cycle, the success of the cycle, in large measure, depends on one's ability to compress efficiently the wet steam in the compression step, or leg, of the cycle. It has been mentioned previously that axial flow compressors are not suitable for this purpose because they would act as centrifuges for suspended-in-steam water particles. Therefore, only the centrifugal flow compressors or the centripetal flow compressors remain as suitable compressors. The breathing capacity of the centrifugal flow compressors is very limited and this limitation alone practically precludes their use in the disclosed cycles. There is an additional very serious limitation insofar as the centrifugal flow compressors are concerned, and that is their low isentropic thermodynamic efficiency which is in the order of 75% to 83% as compared to the efficiencies of 78% to 87% of the axial flow compressors, the axial flow compressors being unacceptable because of the centrifuging effect. Therefore, the only compressor that remains is the centripetal flow compressor, either of contra-rotatable or single rotation type. Fortunately, this compressor satisfies very well the requirements of the cycle: it is capable of having extraordinarily large breathing capacity; the nature of the flow through the compressor follows the classical flow pattern without centrifuging the liquid phase of the working fluid; it retains high efficiency over a remarkably wide range of operation, which is just the opposite of the other two compressors, and, above all, it is capable of having isentropic thermodynamic efficiency of 97.5%. The efficiency of 97.5% is the actual, experimentally obtained efficiency of these compressors. Accordingly, the centripetal flow compressors make the actual implementation of the disclosed cycles a very simple, practical and inexpensive reality.

The disclosed cycle and its instrumentation with the centripetal flow dynamic compressors and centrifugal flow turbines—which are the two most efficient dynamic machines—makes it especially suitable for use in connection with the atomic energy reactors of any type. Two outstanding factors make this cycle by far the best for this purpose: First, its very high thermodynamic efficiency, and, secondly, the superheated dry steam is non-radioactive and, therefore, the superheated steam from the reactor can enter directly into the first turbine without any danger of radioactive contamination of the turbo-machines and their ducting. To date the atomic energy reactors use conventional Clausius-Rankine cycle which was developed many decades ago for use in connection with reciprocating steam engines and such cycle is, if not totally, then at least very poorly suited for dynamic turbomachines. The Dynamic Steam Cycle disclosed here, on the other hand, is based on turbomachines of today, and, by itself, when used in the atomic energy extraction of power, will realize such savings in terms of initial cost and continuous economy of operation due to increased efficiency, so as to make the atomic energy power plants immediately competitive with the conventional power plants. It also follows that the power plants using conventional fuels can simplify their instrumentation with the decrease in cost, and raise their operating efficiencies by using the Dynamic Steam Cycle, since the disclosed cycle is not predicated on any specific type of fuel. The non-radioactive properties of dry steam, however, make this cycle well-nigh indispensible insofar as the atomic energy power plants are concerned. This, too, has been the case insofar as the conventional power plants using organic fuels are concerned, because, after many decades of experimentation with other media, such as mercury and other gases such as air, no other medium has been found which possesses all the thermodynamic and the physio-chemical advantages of water and superheated steam. The disclosed cycle, however, brings up-to-date the use of this old and excellent medium in a manner avoiding its total condensation since such condensation becomes totally inexcusable with the advent of the dynamic centripetal flow compressors.

What is claimed as new is:

1. A steam power plant using steam as a working fluid, said power plant comprising a series circuit including a dynamic steam compression circuit and a first steam expansion circuit, said steam compression circuit including at least first and second serially connected dynamic compressors and said first expansion circuit including at least first and second serially connected steam turbines, a first heater included in said series, said first heater receiving compressed steam from said second compressor and discharging superheated steam into said first turbine, a second heater included in said expansion circuit, said second heater being connected between said first and second turbines, a first steam quality regulating means included in said compression circuit and being connected between said first and second compressors, said first regulating means conveying an compressed steam from the first compressor to the second compressor, a duct connection between said first regulating means and said first expansion circuit, said duct connection being at the pressure point within said first steam expansion circuit which has the pressure corresponding to the pressure of steam between the first and the second compressors, said connection conveying some of the superheated steam from said first expansion circuit into said first means, a second steam quality regulating means connected between the exhaust side of the last turbine in said first expansion circuit and the input side of the first compressor, serially connected condenser and a hot well; a duct connecting the output side of said second regulating means to said condenser, and duct connections between said hot well and said first and second regulating means, said last duct connections having means for injecting condensed water from said hot well into said first and second regulating means.

2. The steam power plant as defined in claim 1, which also includes a heat exchanger connected between the exhaust side of said last turbine and the input side of said second quality regulating means; said heat exchanger also having a connection with said hot well and with said first regulating means for transferring some of the heat from the steam—passing through the heat exchanger from said last turbine to said second regulating means—to the water conveyed from said hot well and injected into said first regulating means.

3. The steam power plant as defined in claim 1, which also includes a second expansion circuit connected in parallel with that portion of the first expansion circuit which includes the second turbine, said second expansion circuit including serially connected heater and a turbine, said last-mentioned heater receiving a partially expanded steam from said first turbine and said last-mentioned turbine discharging expanded steam into said second regulating means.

4. A steam power plant comprising a compression circuit including at least serially connected first compressor, a first steam quality regulating means and a second compressor; an expansion circuit including at least two steam turbines, each turbine having an input side and an exhaust side, a heater connected on the input side of each turbine, duct means connecting said heaters to the output side of said second compressor, a second steam quality regulating means, input and discharge duct means connecting the input side of said second regulating means to the exhaust side of said expansion circuit and the discharge side to the input side of said first compressor, respectively; serially connected condenser, hot well and a pump, said discharge duct means also connecting said condenser to the discharge side of said second control means, duct means connecting the output side of said pump to said first and second steam quality regulating means; and duct means connecting that portion, or point, of the expansion circuit to said first steam quality regulating means whose pressure corresponds to the steam pressure in said first regulating means.

5. In a dynamic steam cycle including dynamic compression of wet steam, superheating, expansion and cooling of a first portion to its original quality and condensing of the second portion into water, the method of increasing the thermodynamic efficiency of said cycle which includes the step of increasing the weight flow in the compression, superheating and expansion portions of the cycle by injecting at least a portion of said water in the course of the compression of said wet steam.

6. The dynamic steam cycle as defined in claim 5 which also includes the additional step of injecting the remaining portion of said water into the steam upon its expansion for cooling said steam and returning it to its original quality.

7. The dynamic steam cycle as defined in claim 5 or 2 which also includes the additional step of further increasing said thermodynamic efficiency by diverting a minor portion of the superheated steam upon its partial expansion into the dynamic compression step of the cycle for further increasing the weight flow in the wet and superheated steam portions of the cycle.

8. A steam power plant comprising a compression circuit having a plurality of serially connected dynamic compressors including a first dynamic compressor receiving wet steam of quality $X_1$, an expansion circuit having a plurality of steam turbines, a heater connected in series with said expansion circuit on the input side of each turbine; a first steam quality regulating means, duct means serially connecting said first regulating means between the exhaust side of the expansion circuit and the input side of the first compressor, said first regulating means returning the received steam to said wet quality $X_1$; and steam quality regulating means between each preceding and succeeding compressors in said compression circuit for returning the quality of steam, entering each of said last-mentioned regulating means, back to said quality $X_1$ and thereafter discharging the wet steam into the respective succeeding compressor.

9. The steam power plant as defined in claim 8, which also includes steam condensing means connected to the first steam quality regulating means for receiving a portion of the wet steam leaving said first regulating means, and a connection between all of said regulating means and said condensing means for injecting water into each regulating means.

10. The steam power plant as defined in claim 8 in which each steam quality regulating means, except the first regulating means, is also connected to that portion of the expansion circuit which has a steam pressure corresponding to the pressure of the steam entering the respective regulating means from the respective compressor.

11. A steam power plant using steam as a working fluid, said power plant incuding a compression circuit, an expansion circuit connected in series loop with said compression circuit, said compression circuit having dynamic means for compressing wet steam entering said compression circuit, first means for increasing the weight flow and for regulating the quality of steam flowing through said compression circuit in the course of its compression, duct means connecting said first means in series with said compression circuit and in shunt with said expansion circuit, and steam quality regulating means connecting the exhaust side of the expansion circuit and the input side of the compression circuit, said regulating means receiving steam from said expansion circuit and returning only a portion of the wet steam produced by said regulating means back to the input side of said compression circuit.

12. The power plant defined in claim 11 which also includes a condenser connected to the output side of said regulating means for receiving the remaining portion of said wet steam and, thereafter, condensing it into water, a hot well receiving the condensed water from said condenser, a pump connected to said hot well, and duct connections between the output side of said pump and said first means and said regulating means for injecting some of said water into said first means and said regulating means for maintaining constant the quality of steam leaving said first means and said regulating means.

13. A steam power plant comprising an "n" number of serially connected dynamic compressors including at least the first and the last compressors, said "n" number being greater than one, said first compressor receiving wet steam having a weight flow $G_1$ and quality $X_1$ smaller than 1.0, a $(n-1)$ number of steam quality regulating and flow-increasing means, one means being connected between each preceding compressor and a corresponding succeeding compressor for regulating the quality of steam and progressively increasing the weight flow of steam in the course of its dynamic compression by said compressors from $G_1$ to $G_x$, first and second heaters connected to the output side of the last compressor, a compressor turbine conected to the output side of said first heater, a load turbine connected to the output side of said second heater, second steam quality regulating means connected with its input side to the exhaust sides of said turbines and with its output side to said first compressor, said second regulating means discharging a portion of wet steam having said weight flow $G_1$ back to the input side of said first compressor, a condenser means also connected to the output side of said second regulating means for receiving the remaining portion of said steam and condensing it into water, and means for injecting said water into all of said regulating means.

14. A dynamic steam cycle including the steps of dynamically compressing a weight flow $G_1$ of wet steam of quality $X_1<1$ from pressure $p_1$ and temperature $T_1$ to pressure $p_x$ and temperature $T_x$; restoring the quality of steam back to quality $X_1$ and increasing the weight flow during its compression by injecting water and superheated steam into said stream in the course of its compression; superheating, at constant pressure $p_x$, the compressed steam from temperature $T_x$ to a superheat temperature $T_y$; expanding said superheated steam to pressure $p_1$ and temperature $T_z$, cooling the expanded steam from temperature $T_z$ back to its original temperature $T_1$ and quality $X_1$, dynamically recompressing the weight flow $G_1$ of the cooled steam again to said pressure $p_x$ and temperature $T_x$, condensing the remaining portion of the cooled steam into water, and injecting said water back into the steam while it is undergoing said compressing.

15. A dynamic steam cycle including the steps of dynamically compressing wet steam having the initial weight flow $G_1$, pressure $p_1$ and temperature $T_1$; controlling the quality and increasing the weight flow of the wet steam in the course of its compression by injecting controlled amounts of water and a first portion of a partially expanded superheated steam for obtaining a weight flow $G_2$ of compressed steam having a pressure $p_x$ and temperature $T_x$ upon the completion of the compression portion of the cycle; superheating the weight flow $G_2$ of said compressed steam to a temperature $T_y$; partially expanding the entire weight flow $G_2$ of the superheated steam; reducing said weight flow $G_2$ by diverting said first portion of the partially expanded superheated steam back to the compression portion of said cycle; reheating and then expanding the remaining portion of the superheated steam to pressure $p_1$; extracting a portion of the heat contained in the expanded steam by preheating said water; cooling said remaining portion of the expanded steam to temperature $T_1$; diverting the weight flow $G_1$ from the cooled steam back to said compression portion of the cycle; condensing the remaining weight flow of the cooled steam into water; and returning said water into the compression portion of said cycle as the injected water.

16. A dynamic steam cycle including the steps of dynamically compressing a weight flow $G_1$ of wet steam having a quality $X_1$ from pressure $p_1$ to pressure $p_n$, progressively increasing the weight flow of said steam by regulating its quality in the course of its compression by injecting an injection water and superheated steam into said weight flow $G_1$ for obtaining maximum weight flow $G_n$ of compressed steam having pressure $p_n$, superheating the compressed steam, expanding the superheated steam from pressure $p_n$ to pressure $p_1$, cooling the expanded steam to its original quality $X_1$, and dynamically recompressing the weight flow $G_1$ of the cooled steam.

17. The dynamic steam cycle as defined in claim 16 which includes the additional step of condensing into water the remaining weight flow of the cooled steam of quality $X_1$, preheating the condensed water by means of the expanded steam, and using said preheated water as said injection water.

18. The dynamic steam cycle as defined in claim 16 which also includes the additional step of recuperating a portion of the heat contained in the expanded steam by preheating the water injected into the weight flow $G_1$ of the steam in the course of its compression.

19. The dynamic steam cycle as defined in claim 16 which includes the additional step of expanding the entire weight flow $G_n$ from said pressure $p_n$ to a lower pressure $p_m$; dividing, thereafter, said weight flow $G_n$ into weight flows $G_p$ and $G_l$, expanding the weight flow $G_p$, and injecting the weight flow $G_l$ as said superheated steam into said weight flow $G_1$ in the course of the compression of said weight flow $G_1$.

20. The dynamic steam cycle as defined in claim 16 which includes the additional step of performing said compressing in a plurality of the dynamic compression steps, and increasing said weight flow $G_1$ at the completion of each compression step except the last step.

21. The dynamic steam cycle as defined in claim 16 which includes the additional step of performing said expanding in a plurality of steps; and diverting a portion of the expanded steam, at least at the completion of some of the expansion steps, as said injected superheated steam for increasing said weight flow $G_1$.

22. A dynamic steam cycle including the steps of compressing wet steam having the initial quality $X_1$, weight flow $G_1$, pressure $p_1$ and temperature $T_1$ to pressure $p_2$ temperature $T_2$, and quality $X_2$ greater than quality $X_1$, mixing the compressed steam with a water weight flow $G_7$ and a superheated steam having a weight flow $G_6$ and pressure $p_2+\Delta p$ for obtaining a wet steam weight flow $G_2$, compressing said weight flow $G_2$ to pressure $p_4$ and temperature $T_4$, superheating the compressed weight flow $G_2$ to temperature $T_5$ and pressure $p_4$, partially expanding the superheated steam to temperature $T_6$ and pressure $p_6$ which is greater than $p_2$; dividing the partially expanded steam having the weight flow $G_2$ into two parallel streams having weight flows $G_4$ and $G_3$; expanding the weight flow $G_4$ to said pressure $p_2$ without reheating, whereby said weight flow $G_4$ has the initial temperature $T_7=T_6$; dividing the weight flow $G_4$ into a weight flow $G_5$ and said weight flow $G_6$; expanding the weight flow $G_5$ to said pressure $p_1$ and mixing said weight flow $G_6$ with said weight flow $G_1$; reheating the weight flow $G_3$ to a temperature $T_{11}$; and expanding the reheated steam to said pressure $p_1$.

23. The dynamic steam cycle as defined in claim 22 which also includes the steps of progressively decreasing $T_{11}$ to a temperature $T_{11}''$ with the decrease in power from a full load to an intermediate load until said $T_{11}''$ is equal to $T_6$, thereby eliminating the reheating step of said weight flow $G_3$, and simultaneously progressively increasing $T_7$ to a temperature $T_7''$ in the course of the decrease in said power to said intermediate load.

24. The dynamic steam cycle as defined in claim 22 which also includes the step of making $G_3$ equal to zero when no external power is delivered by said cycle.

25. The dynamic steam cycle as defined in claim 23 which also includes the additional step of decreasing $T_5$, $T_7''$, $p_2$, $p_4$, and all the weight flows with a further decrease in said load.

26. The dynamic steam cycle as defined in claim 23 which includes the additional step of varying the weight flows $G_3$ and $G_4$ in accordance with the relationship $$\frac{G_3}{G_4} \sim \sqrt{\frac{T_7'}{T_{11}'}}$$

where $T_7'$ and $T_{11}'$ are the instantaneous decreased values of $T_7$ and $T_{11}$.

27. A dynamic steam cycle including the steps of dynamically compressing a weight flow $G_1$ of wet steam, having a quality $X_1$, from pressure $p_1$ to pressure $p_2$; injecting a weight flow $G_7$ of water and a weight flow $G_6$ of superheated steam into the weight flow $G_1$ after its compression to said pressure $p_2$ for increasing its weight flow from $G_1$ to $G_2$, regulating the amount of said injection to the extent required by the return of the compressed steam back to said quality $X_1$, dynamically compressing said weight flow $G_2$ from pressure $p_2$ to pressure $p_4$, superheating said weight flow $G_2$ to a temperature $T_5$, expanding said weight flow $G_2$ to the pressure corresponding to said pressure $p_2$, separating said weight flow $G_2$ upon its expansion to said pressure $p_2$ into a weight flow $G_3$ and said weight flow $G_6$ for using said weight flow $G_6$ for said injecting; expanding said weight flow $G_3$ to pressure $p_1$, returning the expanded steam to quality $X_1$, dividing thereafter the weight flow $G_3$ into said weight flows $G_1$ and $G_7$, returning said last-mentioned weight flow $G_7$ into the compression portion of the cycle, condensing said weight flow $G_7$ into water, and using the condensed water for said injecting.

28. The dynamic steam cycle as defined in claim 27 which includes the additional step of regulating the amount of external power delivered by said cycle by decreasing said $T_5$ with the decrease in load.

29. The dynamic steam cycle as defined in claim 27 which includes the additional steps of reducing said temperature $T_5$ and all the weight flows with the decrease in the external power delivered by said cycle.

30. The dynamic steam cycle as defined in claim 27 which includes the additional steps of reheating said weight flow $G_3$ to a temperature $T_7$ prior to its expansion, decreasing said temperature $T_5$ with the decrease in the external power delivered by said cycle, and simultaneously increasing $T_7$ to the extent required to keep $\Delta H_{Tu2}$ constant with the decrease in said power, said $\Delta H_{Tu2}$ being the heat drop obtained through the expansion of said weight flow $G_3$.

31. The dynamic steam cycle as defined in claim 30 which also includes the additional step of decreasing all the weight flows as a function of the decrease in said power.

32. The dynamic steam cycle as defined in claim 27 which includes the additional steps of reheating said weight flow $G_3$ to a temperature $T_7$ prior to its expansion, and decreasing all the weight flows and $T_5$ while maintaining constant said $T_7$ with the decrease in the external, useful power furnished by said cycle.

33. A dynamic steam cycle including the steps of dynamically compressing wet steam through a plurality of compression steps in a plurality of serially connected dynamic compressors; beginning the compression of said wet steam with a weight flow $G_1$ having a quality $X_1$; successively increasing the weight flows in the succeeding compressors by injecting superheated steam and water into the steam at the conclusion of each compression step except the last step and before its entry into the respective next, or succeeding, compressor; superheating said steam upon its exit from the last compressor; expanding the superheated steam through a plurality of expansion steps; reheating except the last expansion step the superheated steam after each expansion step at least at some operating stages of said cycle; cooling the finally expanded steam to its original wet state having the quality $X_1$; recompressing the weight flow $G_1$ of the cooled steam; condensing into water the remaining portion of the cooled steam, and returning said water into the cycle as the water injected into the steam between and before the compression steps of said cycle.

34. The dynamic steam cycle as defined in claim 33 which also includes the additional step of recuperating a portion of the heat contained in the finally expanded steam prior to its cooling by preheating the water used for successively increasing the weight flows.

35. The dynamic steam cycle as defined in claim 33 which includes the additional steps of regulating the degree, or the amount, of injection of the superheated steam and water into the steam, before its entry into the respective successive compressors, so as to make the quality of the steam entering the respective compressors equal to $X_1$.

36. The dynamic steam cycle as defined in claim 33 which includes the additional step of diverting the appropriate, controlled amounts of the partially expanded superheated steam back to the input sides of all the compressors, except the first compressor, for obtaining the injected superheated steam used for successively increasing said weight flows.

37. The dynamic steam cycle as defined in claim 33 which includes at least first, second and third compression steps; at least first, second and third expansion steps, and first and second reheat steps, using the power derived from the first expansion step for producing the third compression step, using the power derived from the second expansion step for producing the first and the second compression steps, and using the power derived from the third expansion step as the useful, external power derived from said cycle.

38. The dynamic steam cycle as defined in claim 37 which includes the additional steps of simultaneously decreasing the temperatures of the superheated steam entering the first and the second steps of expansion with the decrease in said external power, and simultaneously increasing the temperature of the steam entering the third step of expansion with the decrease in said external power.

39. The dynamic steam cycle as defined in claim 38 which includes the additional step of increasing the temperature of the steam entering the third step of expansion with the decrease in said external power to the extent so as to maintain constant the heat drop, $\Delta H_3$, of steam through said third step of expansion irrespective of the variations in said external power.

40. The dynamic steam cycle as defined in claim 38 which includes the additional steps of decrasing, with the decrease in the external power, the weight flows of steam through the second and third steps of compression and all the steps of expansion by decreasing the weight flows of the respective injected steam and water.

References Cited in the file of this patent

UNITED STATES PATENTS

| | | |
|---|---|---|
| 1,128,834 | Aspinwall | Feb. 16, 1915 |
| 1,601,384 | Vianello | Sept. 28, 1926 |
| 2,319,995 | Keller | May 25, 1943 |

FOREIGN PATENTS

| | | |
|---|---|---|
| 489,865 | France | Nov. 5, 1918 |